US012557119B2

(12) United States Patent
Seok et al.

(10) Patent No.: US 12,557,119 B2
(45) **Date of Patent: *Feb. 17, 2026**

(54) METHOD FOR TRANSMITTING PHYSICAL DOWNLINK CONTROL CHANNEL AND DEVICE FOR SAME IN WIRELESS COMMUNICATION SYSTEM

(71) Applicant: WILUS INSTITUTE OF STANDARDS AND TECHNOLOGY INC., Gyeonggi-do (KR)

(72) Inventors: Geunyoung Seok, Gyeonggi-do (KR); Kyungjun Choi, Gyeonggi-do (KR); Minseok Noh, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/610,271

(22) Filed: Mar. 20, 2024

(65) Prior Publication Data

US 2024/0237027 A1 Jul. 11, 2024

Related U.S. Application Data

(63) Continuation of application No. 18/098,074, filed on Jan. 17, 2023, now Pat. No. 11,956,802, which is a
(Continued)

(30) Foreign Application Priority Data

Jul. 17, 2020 (KR) ........................ 10-2020-0089232
Aug. 1, 2020 (KR) ........................ 10-2020-0096481

(51) Int. Cl.
*H04W 72/232* (2023.01)
*H04L 5/00* (2006.01)

(52) U.S. Cl.
CPC ......... *H04W 72/232* (2023.01); *H04L 5/0053* (2013.01)

(58) Field of Classification Search
CPC ........................... H04W 72/232; H04L 5/0053
See application file for complete search history.

(56) References Cited

U.S. PATENT DOCUMENTS 11,290,220 B2 * 3/2022 Farag .................... H04L 1/1861
11,956,802 B2 * 4/2024 Seok .................. H04W 72/232
(Continued)

FOREIGN PATENT DOCUMENTS

CN 110121914 8/2019
CN 111149407 5/2020
(Continued)

OTHER PUBLICATIONS

Extended European Search Report dated Aug. 30, 2024 for European Patent Application No. 21 842 947.0.
(Continued)

*Primary Examiner* — John D Blanton
(74) *Attorney, Agent, or Firm* — WOMBLE BOND DICKINSON (US) LLP

(57) ABSTRACT

A method, which is performed by a terminal, for receiving a Physical Downlink Control Channel (PDCCH) in a wireless communication system comprises the steps of: receiving, from a base station, configuration information about a first control resource set (CORESET); receiving, from the base station, configuration information about a second CORESET; receiving, from the base station, a first PDCCH
(Continued)

transmitted on the first CORESET; and receiving, from the base station, a second PDCCH transmitted on the second CORESET.

18 Claims, 43 Drawing Sheets

Related U.S. Application Data continuation of application No. PCT/KR2021/009291, filed on Jul. 19, 2021.

(56) References Cited

U.S. PATENT DOCUMENTS

| | | | | |
|---|---|---|---|---|
| 12,267,833 | B2 * | 4/2025 | Sun | H04W 72/1273 |
| 2010/0275083 | A1 * | 10/2010 | Nam | H04W 72/20 714/E11.131 |
| 2016/0192333 | A1 | 6/2016 | Wang et al. | |
| 2018/0192405 | A1 * | 7/2018 | Gong | H04L 1/0075 |
| 2018/0279268 | A1 | 9/2018 | You et al. | |
| 2019/0150183 | A1 * | 5/2019 | Aiba | H04W 24/10 370/336 |
| 2019/0253308 | A1 * | 8/2019 | Huang | H04B 7/0695 |
| 2019/0313400 | A1 * | 10/2019 | Farag | H04L 5/0055 |
| 2019/0313455 | A1 * | 10/2019 | Guey | H04W 74/006 |
| 2020/0053580 | A1 * | 2/2020 | Bagheri | H04L 5/006 |
| 2020/0100248 | A1 * | 3/2020 | Kim | H04W 48/12 |
| 2020/0196346 | A1 * | 6/2020 | Khoshnevisan | H04L 1/08 |
| 2020/0260416 | A1 * | 8/2020 | Kim | H04B 7/088 |
| 2021/0006376 | A1 * | 1/2021 | Cirik | H04L 1/1861 |
| 2021/0234640 | A1 * | 7/2021 | Cirik | H04L 1/1854 |
| 2021/0352580 | A1 * | 11/2021 | Zhou | H04W 52/0209 |
| 2021/0360667 | A1 * | 11/2021 | Moon | H04L 5/0035 |
| 2021/0391955 | A1 * | 12/2021 | He | H04L 5/0053 |
| 2021/0392625 | A1 * | 12/2021 | Lin | H04W 72/23 |
| 2022/0007371 | A1 | 1/2022 | Kyung et al. | |
| 2022/0053468 | A1 | 2/2022 | Chen | |
| 2022/0104122 | A1 * | 3/2022 | Maleki | H04W 52/0216 |
| 2022/0124686 | A1 * | 4/2022 | Lee | H04L 5/0094 |
| 2022/0159733 | A1 * | 5/2022 | Cirik | H04L 5/0092 |
| 2022/0167383 | A1 * | 5/2022 | Aiba | H04L 5/0053 |
| 2022/0294591 | A1 * | 9/2022 | Liu | H04L 5/0053 |
| 2022/0394601 | A1 * | 12/2022 | Zhang | H04L 1/1893 |
| 2023/0030756 | A1 * | 2/2023 | Zhang | H04L 5/0051 |
| 2023/0047603 | A1 * | 2/2023 | Kim | H04L 5/0035 |
| 2023/0085345 | A1 * | 3/2023 | Li | H04W 72/23 370/329 |
| 2023/0120035 | A1 * | 4/2023 | Taherzadeh Boroujeni | H04L 1/0072 370/329 |
| 2023/0156743 | A1 | 5/2023 | Seok et al. | |
| 2023/0217460 | A1 * | 7/2023 | Zhang | H04B 7/06952 370/329 |
| 2024/0089064 | A1 * | 3/2024 | Cirik | H04W 72/23 |
| 2024/0237027 | A1 * | 7/2024 | Seok | H04W 72/232 |
| 2024/0314808 | A1 * | 9/2024 | Seok | H04L 1/0072 |

FOREIGN PATENT DOCUMENTS

| | | |
|---|---|---|
| JP | 7607983 | 1/2025 |
| KR | 10-2020-0020272 | 2/2020 |
| WO | 2018/167958 | 9/2018 |
| WO | 2019/099435 | 5/2019 |
| WO | 2019/215932 | 11/2019 |
| WO | 2020/093016 | 5/2020 |
| WO | 2020/145609 | 7/2020 |
| WO | 2021/156790 | 8/2021 |
| WO | 2021/227037 | 11/2021 |
| WO | 2022/002250 | 1/2022 |
| WO | 2022/015125 | 1/2022 |

OTHER PUBLICATIONS

International Search Report for PCT/KR2021/009291 mailed on Nov. 8, 2021 and its English translation from WIPO (now published as WO 2022/015125).

Written Opinion of the International Searching Authority for PCT/KR2021/009291 mailed on Nov. 8, 2021 and its English translation from WIPO (now published as WO 2022/015125).

Vivo, Guangdong Genius: "Discussion on functionality for coverage recovery", 3GPP TSG-RAN WG1 Meeting #101, R1-2003433, e-Meeting, May 16, 2020, pp. 1-7.

Huawei, HiSilicon: "DL channels and signals in NR unlicensed band", 3GPP TSG RAN WG1 Meeting #99, R1-1911864, Reno, USA, Nov. 9, 2019, pp. 1-17.

Qualcomm Incorporated: "Multi-TRP Enhancements", 3GPP TSG-RAN WG1 Meeting #98, R1-1909272, Prague, Czech Republic, Aug. 17, 2019, pp. 1-32.

Huawei, HiSilicon: "PDCCH repetition for URLLC", 3GPP TSG RAN WG1 Meeting #92bis, R1-1803658, Sanya, China, Apr. 7, 2018, pp. 1-9.

Office Action dated Dec. 25, 2023 for Japanese Patent Application No. 2023-503003 and its English translation provided by Applicant's foreign counsel.

NTT Docomo, Inc: "Enhancements on multi-TRP/panel transmission", 3GPP TSG RAN WG1 #98, R1-1909201, Prague, CZ, Aug. 17, 2019, pp. 1-38.

Nokia, Nokia Shanghai Bell: "Remaining details on search space", 3GPP TSG RAN WG1 #92bis, R1-1804761, Sanya, China, Apr. 6, 2018, pp. 1-16.

Notice of Allowance dated Nov. 21, 2023 for U.S. Appl. No. 18/098,074 (now published as U.S. 2023/0156743).

Final Office Action dated Jul. 31, 2023 for U.S. Appl. No. 18/098,074 (now published as U.S. 2023/0156743).

Office Action dated Apr. 11, 2023 for U.S. Appl. No. 18/098,074 (now published as U.S. 2023/0156743).

Office Action dated May 27, 2024 for Japanese Patent Application No. 2023-503003 and its English translation provided by Applicant's foreign counsel.

Office Action dated Dec. 4, 2024 for Indian Patent Application No. 202327008126.

Office Action (1st) dated Mar. 18, 2025 for Chinese Patent Application No. 202180055033.4 and its English translation provided by Applicant's foreign counsel.

Office Action (1st) dated Apr. 3, 2025 for Korean Patent Application No. 10-2022-7041365 and its English translation provided by Applicant's foreign counsel.

Huawei et al.: "Feature Summary of Enhancements on Multi-TRP/Panel Transmission", 3GPP TSG RAN WG1 Meeting #99, R1-1913299, Reno, USA, Nov. 26, 2019, pp. 1-88.

Office Action dated Apr. 22, 2025 for U.S. Appl. No. 18/610,266.

Office Action (1st) dated May 15, 2025 for European Patent Application No. 21 842 947.0.

Office Action (1st) dated Sep. 9, 2025 for Japanese Patent Application No. 2024-216395 and its English translation provided by Applicant's foreign counsel.

* cited by examiner (a) UE assumes first PDCCH of repetition 4

(b) UE assumes second PDCCH of repetition 2 first PDCCH of repetition 4 second PDCCH of repetition 2

PDSCH (a) UE assumes first PDCCH of repetition 4

(b) UE assumes second PDCCH of repetition 2 first PDCCH of repetition 4 second PDCCH of repetition 2 slot(s) applying dynamic SFI (a) UE assumes first PDCCH of repetition 4

(b) UE assumes second PDCCH of repetition 2 first PDCCH of repetition 4 second PDCCH of repetition 2 slot(s) for reference DL resource base CORESET#0
base CORESET#1
base CORESET#2
base CORESET#3
symbol
0 1 2 3 4 5 6 7
PRB

METHOD FOR TRANSMITTING PHYSICAL DOWNLINK CONTROL CHANNEL AND DEVICE FOR SAME IN WIRELESS COMMUNICATION SYSTEM

CROSS-REFERENCE TO RELATED APPLICATIONS

This application is a continuation of U.S. patent application Ser. No. 18/098,074 filed on Jan. 17, 2023, which is a continuation of PCT International Application No. PCT/KR2021/009291, which was filed on Jul. 19, 2020, and which claims priority under 35 U.S.C 119 (a) to Korean Patent Application No. 10-2020-0089232 filed with the Korean Intellectual Property Office on Jul. 17, 2010, and Korean Patent Application No. 10-2020-0096481 filed with the Korean Intellectual Property Office on Aug. 1, 2010. The disclosures of the above patent applications are incorporated herein by reference in their entirety.

TECHNICAL FIELD

The present specification relates to a wireless communication system and, more specifically, to a method for transmitting a physical downlink control channel and an apparatus therefor.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beamforming, hybrid that beamforming combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative coordinated multi-points (COMP), communication, interference cancellation, and the like are being made. In addition, in the 5G system, hybrid FSK and QAM modulation (FOAM) and sliding window superposition coding (SWSC), which are advanced coding modulation (ACM) schemes, and filter multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE OF INVENTION

Technical Problem

The present specification is to provide a method for transmitting a physical downlink channel in a wireless communication system and an apparatus therefor.

Solution to Problem

The present specification provides a method for transmitting a physical downlink channel in a wireless communication system.

The present specification relates to method for receiving a physical downlink control channel (PDCCH) in a wireless communication system, the method being performed by a terminal and including: receiving configuration information about a first control resource set (CORESET) from a base station; receiving configuration information about a second CORESET from the base station; receiving a first PDCCH transmitted on the first CORESET from the base station; and receiving a second PDCCH transmitted on the second CORESET from the base station, wherein the first PDCCH and the second PDCCH are each repeatedly transmitted from the base station, and first downlink control information (DCI) included in the first PDCCH and second DCI included in the second PDCCH are identical to each other.

In addition, in the present specification, a method performed by a terminal further includes: receiving configuration information about a first search space from the base station; and receiving configuration information about a second search space from the base station, wherein the first search space is associated with the first CORESET, and the second search space is associated with the second CORESET, the first search space and the second search space are resources on different time domains, and the first PDCCH is received on the first search space, and the second PDCCH is received on the second search space.

In addition, in this specification, the method performed by a terminal further includes transmitting, to the base station, HARQ-ACK information about one of the first PDCCH and the second PDCCH, wherein the HARQ-ACK information corresponds to HARQ-ACK information about a PDCCH transmitted on a search space of a lower index among an index of the first search space and an index of the second search space.

In addition, in the present specification, the method performed by a terminal further includes: receiving, from the base station, a third PDCCH on a third search space; and transmitting, to the base station, HARQ-ACK information about one of the first PDCCH, the second PDCCH, and the third PDCCH, wherein the third PDCCH includes third DCI different from the first DCI and the second DCI, and when the third search space overlaps with one of the first search space and the second search space, the HARQ-ACK information is HARQ-ACK information about a PDCCH transmitted on a search space of the lowest index among the indexes of the overlapping search spaces.

In addition, in the present specification, a terminal for receiving a physical downlink control channel (PDCCH) in a wireless communication system includes a transceiver; and a processor configured to control the transceiver, wherein the processor is configured to: receive configuration information about a first control resource set (CORESET) from a base station; receive configuration information about a second CORESET from the base station; receive a first PDCCH transmitted on the first CORESET from the base station; and receive a second PDCCH transmitted on the second CORESET from the base station, and wherein the first PDCCH and the second PDCCH are each repeatedly transmitted from the base station, and first downlink control information (DCI) included in the first PDCCH and second DCI included in the second PDCCH are identical to each other.

In addition, in the present specification, the processor is configured to: receive configuration information about a first search space from the base station, and receive configuration information about a second search space from the base station, wherein the first search space is associated with the first CORESET, and the second search space is associated with the second CORESET, the first search space and the second search space are resources on different time domains, and the first PDCCH is received on the first search space, and the second PDCCH is received on the second search space.

In addition, in the present specification, the first PDCCH and the second PDCCH are configured at the same aggregation level (AL).

In addition, in the present specification, the first CORESET and the second CORESET are resources on different time-frequency domains.

In addition, in the present specification, the first CORESET and the second CORESET are resources on the same time-frequency domain.

In addition, in the present specification, the first PDCCH and the second PDCCH are included in the same slot and repeatedly transmitted.

In addition, in the present specification, the first PDCCH and the second PDCCH are repeatedly transmitted on different slots.

In addition, in the present specification, the first DCI and the second DCI are each independently decoded.

In addition, in the present specification, the first DCI and the second DCI are combined with each other and decoded.

In addition, in the present specification, the configuration information about the first search space includes information about a periodicity of the first search space, the configuration information about the second search space includes information about a periodicity of the second search space, and the periodicity of the first search space and the periodicity of the second search space are identical to each other.

In addition, in the present specification, the type of the first search space and the type of the second search space are identical to each other, and the type of the first search space and the type of the second search space are one of a common search space and a UE specific search space.

In addition, the present specification relates to a method for transmitting a physical downlink control channel (PDCCH) in a wireless communication system, the method being performed by a base station and including: transmitting configuration information about a first control resource set (CORESET) to a terminal; transmitting configuration information about a second CORESET to the terminal; transmitting a first PDCCH on the first CORESET to the terminal; and transmitting a second PDCCH on the second CORESET to the terminal, wherein the first PDCCH and the second PDCCH are each repeatedly transmitted to the terminal, and first downlink control information (DCI) included in the first PDCCH and second DCI included in the second PDCCH are identical to each other.

Advantageous Effects of Invention

The present specification is to enhance the reliability of PDCCH reception by allowing a terminal to receive the same DCI through a plurality of PDCCHs.

Advantageous effects obtainable in the present specification are not limited to the above-mentioned advantageous effects, and other advantageous effects not mentioned herein may be clearly understood by a person skilled in the art to which the present disclosure pertains from the following description.

BRIEF DESCRIPTION OF DRAWINGS

FIG. 35 illustrates a method of indexing CCEs in a frequency-first manner according to an embodiment of the present disclosure.

FIG. 37 illustrates PDCCH candidates based on CCE indexed in a frequency-first manner according to an embodiment of the present disclosure.

BEST MODE FOR CARRYING OUT THE INVENTION

Figure 1:
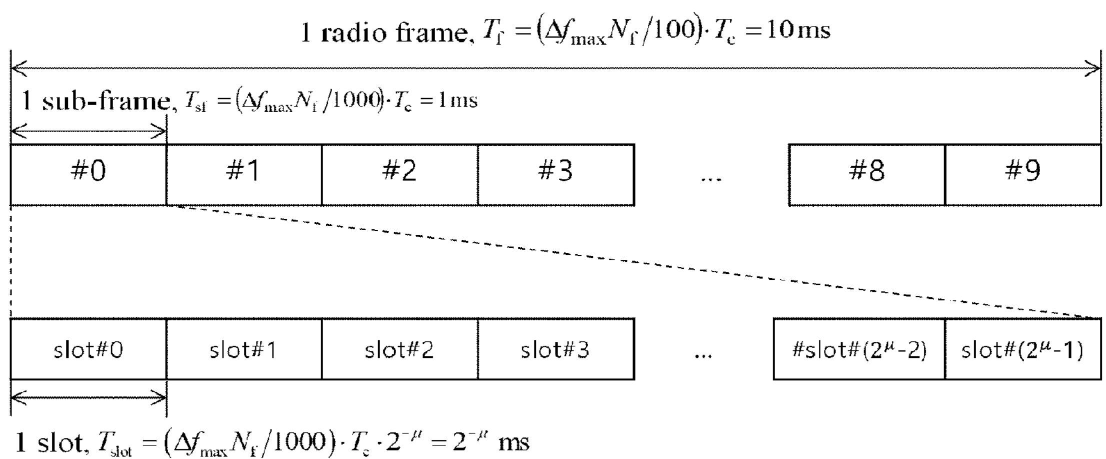
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the present disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified in this specification, a base station may refer to a next generation node B (gNB) as defined in 3GPP NR. Furthermore, unless otherwise specified, a terminal may refer to a user equipment (UE). Hereinafter, in order to facilitate understanding of the description, each content is separately divided into embodiments and described, but each of the embodiments may be used in combination with each other. In the present disclosure, the configuration of the UE may indicate configuration by the base station. Specifically, the base station may transmit a channel or signal to the UE to configure an operation of the UE or a parameter value used in a wireless communication system.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100$)*T). In addition, the wireless frame includes 10 subframes (SFs) having equal sizes. Herein, $\Delta f_{max}=480*10^3$ Hz, $N_f=4096$, $T_c=1/(\Delta f_{ref}*N_f,ref)$, $\Delta f_{ref}=15*10^3$ Hz, and $N_{f,ref}=2048$. Numbers from 0 to 9 may be respectively allocated to 10 subframes within one subframe. Each subframe has a length of 1 ms and may include one or more slots according to a subcarrier spacing. More specifically, in the 3GPP NR system, the subcarrier spacing that may be used is $15*2^\mu$ kHz, and p can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
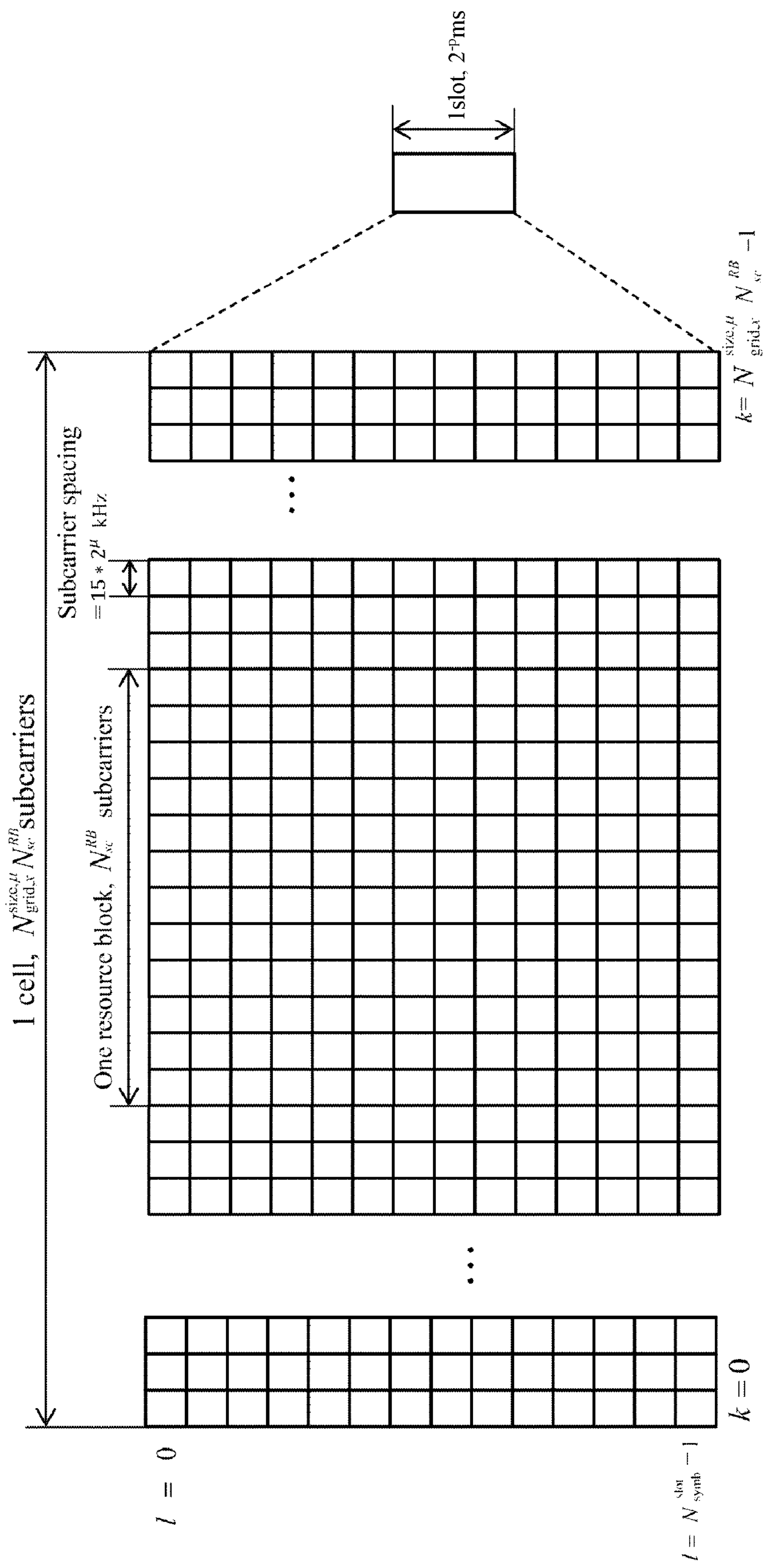
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,u}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent p (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and 1 may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56~255 | Reserved | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
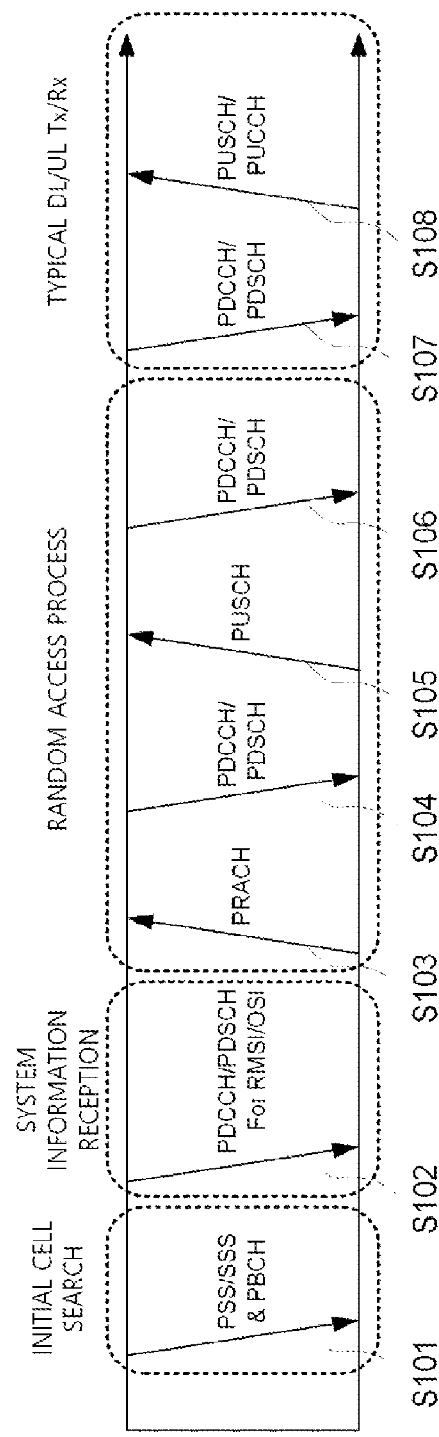
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Here, the system information received by the UE is cell-common system information for the UE to properly operate at the physical layer in Radio Resource Control (RRC), and is referred to as remaining system information (RSMI) or system information block (SIB) 1.

When the UE initially accesses the base station or does not have radio resources for signal transmission (when the UE is in RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. During the random access process, the UE may obtain UE-specific system information necessary for the UE to properly operate at the physical layer in the RRC layer. When the UE obtains UE-specific system information from the RRC layer, the UE enters the RRC_CONNECTED mode.

The RRC layer is used for message generation and management for control between a UE and a radio access network (RAN). More specifically, in the RRC layer, the base station and the UE may perform broadcasting of cell system information, delivery management of paging messages, mobility management and handover, measurement report and control thereof, UE capability management, and storage management including existing management necessary for all UEs in the cell. In general, since the update of the signal (hereinafter, referred to as RRC signal) transmitted from the RRC layer is longer than the transmission/reception period (i.e., transmission time interval, TTI) in the physical layer, the RRC signal may be maintained unchanged for a long period.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4A:
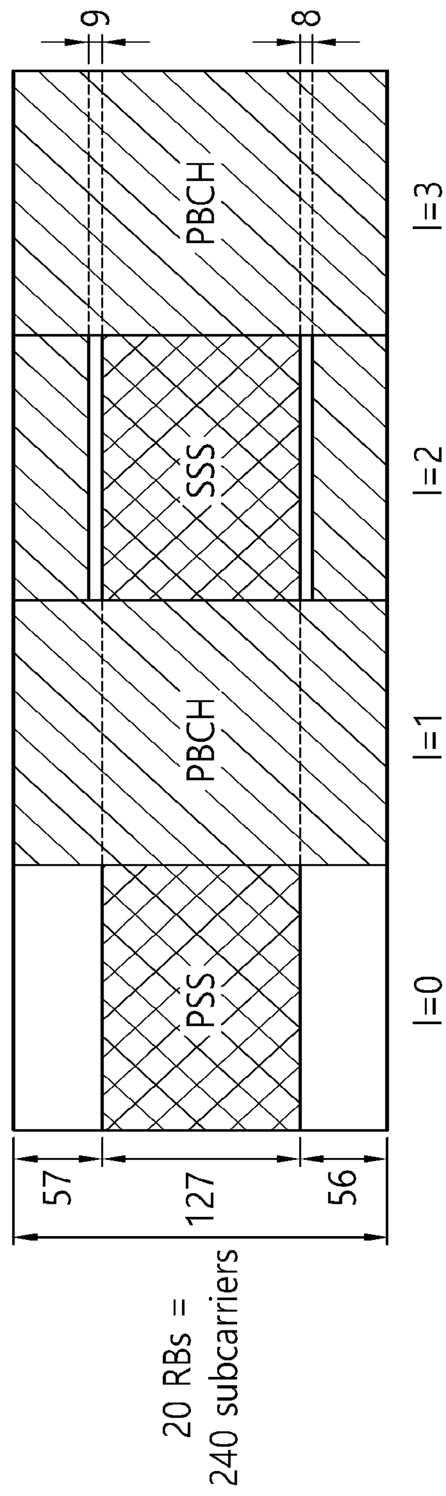
FIG. 4 illustrates an SS/PBCH block for initial cell access in a 3GPP NR system.
Figure 4B:
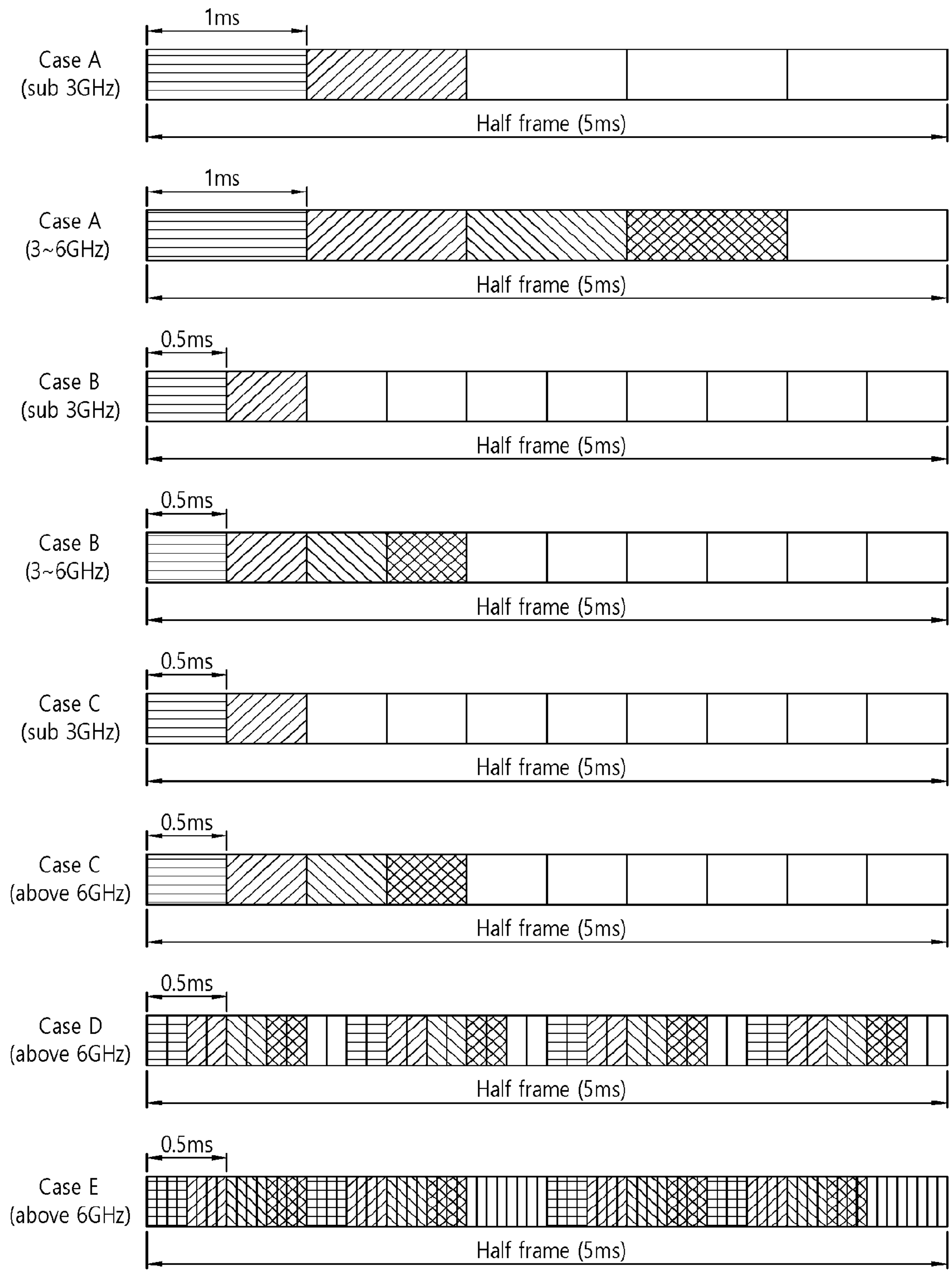

FIGS. 4*a* and 4*b* illustrate an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity NcellID of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4*a*, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4*a* and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
| | 2 | 48, 49, . . . , 55, 183, 184, . . . , 191 |
| PBCH | 1, 3 | 0, 1, . . . , 239 |
| | 2 | 0, 1, . . . , 47, 192, 193, . . . , 239 |
| DM-RS for PBCH | 1, 3 | 0 + v, 4 + v, 8 + v, . . . , 236 + v |
| | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = \left(n + 43N_{ID}^{(2)}\right) \bmod 127$$

$$0 \le n < 127$$

Here, $x(i+7)=(x(i+4)+x(i)) \bmod 2$ and is given as, $$[\,x(6)\ \ x(5)\ \ x(4)\ \ x(3)\ \ x(2)\ \ x(1)\ \ x(0)\,] = [\,1\ \ 1\ \ 1\ \ 0\ \ 1\ \ 1\ \ 0\,]$$

Further, the sequence $d_{SSS}(n)$ of the SSS is as follows.

$$d_{SSS}(n) = [1 - 2x_0((n + m_0) \bmod 127)][1 - 2x_1((n + m_1) \bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

$$x_0(i + 7) = (x_0(i + 4) + x_0(i)) \bmod 2$$

Here, $x_1(i+7)=(x_1(i+1)+x_1(i)) \bmod 2$ and is given as, $$[\,x_0(6)\ \ x_0(5)\ \ x_0(4)\ \ x_0(3)\ \ x_0(2)\ \ x_0(1)\ \ x_0(0)\,] = [\,0\ \ 0\ \ 0\ \ 0\ \ 0\ \ 0\ \ 1\,]$$

$$[\,x_1(6)\ \ x_1(5)\ \ x_1(4)\ \ x_1(3)\ \ x_1(2)\ \ x_1(1)\ \ x_1(0)\,] = [\,0\ \ 0\ \ 0\ \ 0\ \ 0\ \ 0\ \ 1\,]$$

A radio frame with a 10 ms length may be divided into two half frames with a 5 ms length. Referring to FIG. 4*b*, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
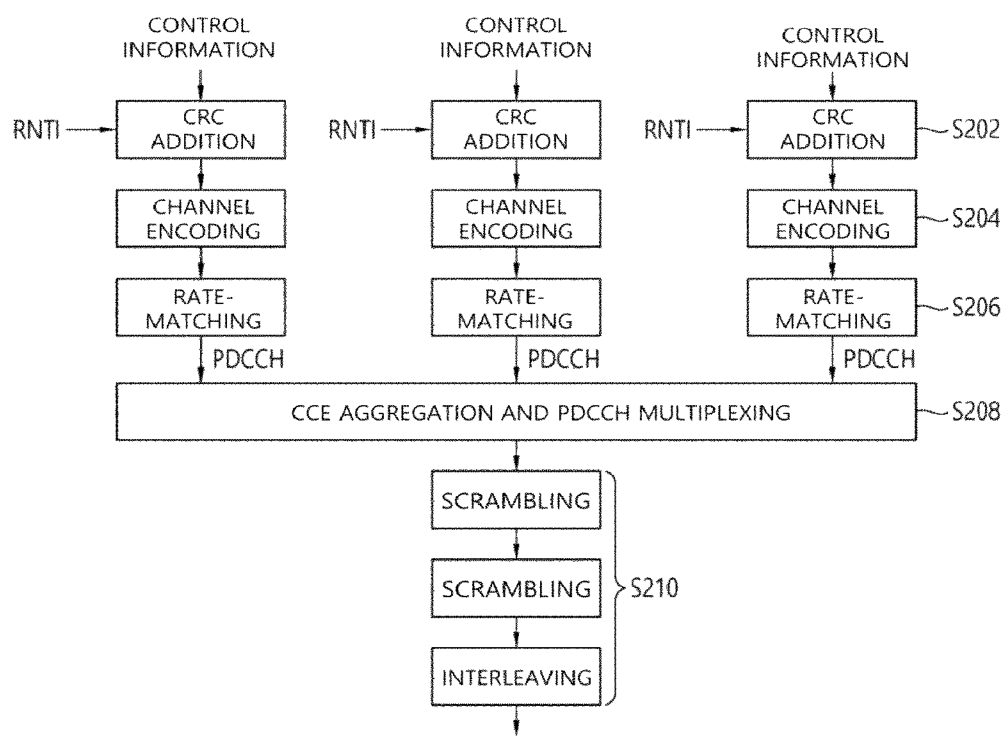
FIG. 5*a* and FIG. 5*b* illustrate a procedure for transmitting control information and a control channel in a 3GPP NR system.
Figure 5B:
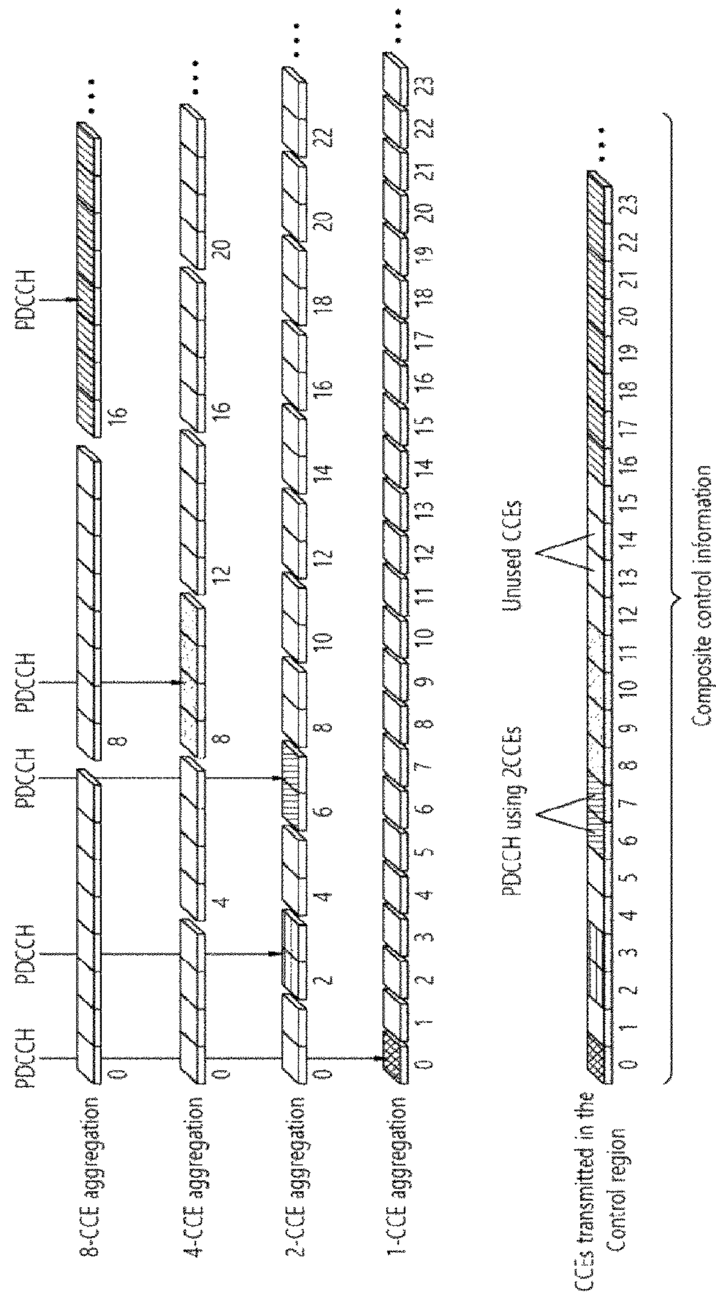

FIGS. 5*a* and 5*b* illustrate a procedure for transmitting control information and a control channel in a 3GPP NR system. Referring to FIG. 5*a*, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5*b* is a diagram related to a CCE aggregation level and the multiplexing of a PDCCH and illustrates the type of a CCE aggregation level used for one PDCCH and CCE(s) transmitted in the control area according thereto.

Figure 6:
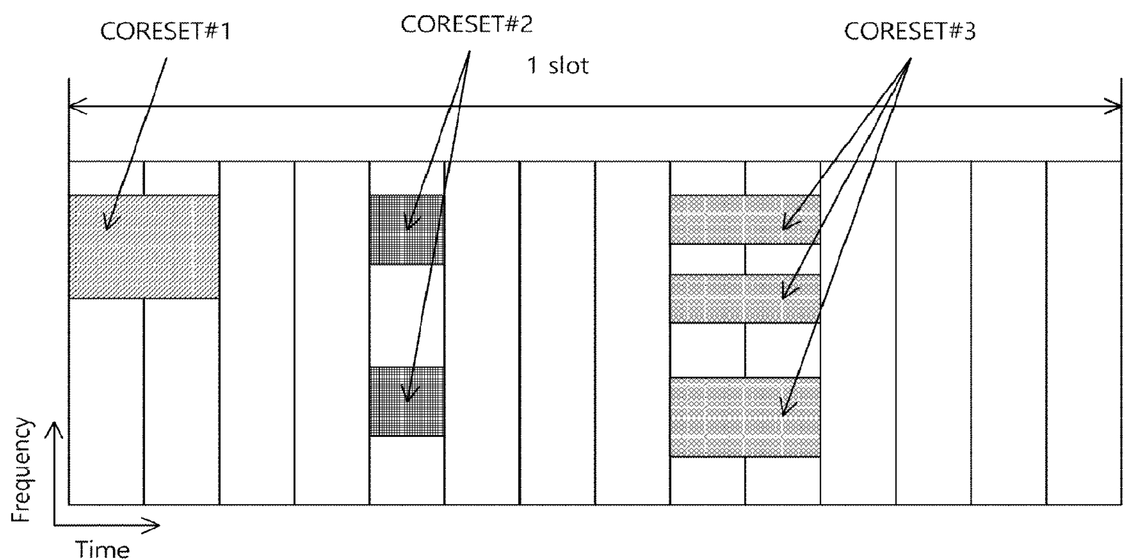
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
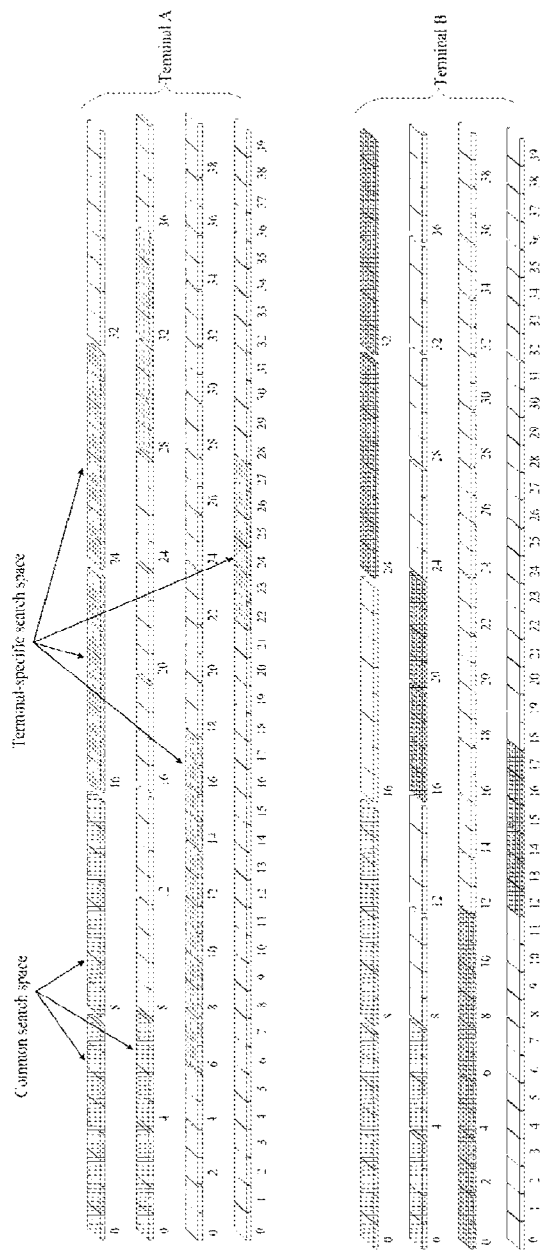
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).

- Scheduling Request (SR): Information used for requesting a UL UL-SCH resource.
- HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.
- Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of transmitting 1-bit or 2-bit HARQ-ACK information or SR. PUCCH format 0 can be transmitted through one or two OFDM symbols on the time axis and one RB on the frequency axis. When PUCCH format 0 is transmitted in two OFDM symbols, the same sequence to the two symbols may be transmitted through different RBs. In this case, the sequence may be a cyclic shift (CS) sequence from the base sequence used for PUCCH format 0. Through this, the UE can obtain a frequency diversity gain. Specifically, the UE may determine a cyclic shift (CS) value $m_{cs}$ according to the $M_{bit}$ bit UCI ($M_{bit}$=1 or 2). In addition, a sequence in which a base sequence of length 12 is cyclically shifted based on a predetermined CS value $m_{cs}$ may be mapped to 1 OFDM symbol and 12 REs of 1 RB and transmitted. When the number of cyclic shifts available to the UE is 12 and $M_{bit}$=1, 1 bit UCI 0 and 1 may be mapped to two cyclic shifted sequences having a difference of 6 cyclic shift values, respectively. In addition, when $M_{bit}$=2, 2 bits UCI 00, 01, 11, and 10 may be mapped to four cyclic shifted sequences in which the difference in cyclic shift values is 3, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}=1$, may be BPSK-modulated. The UE may modulate UCI, which is $M_{bit}=2$, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , $d(M_{symbol}-1)$. Here, $M_{symbol}$ may be $M_{bit}/2$. Through this, the UE may obtain a frequency diversity gain. More specifically, $M_{bit}$ bit UCI ($M_{bit}>2$) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}>2$) with π/2-Binary Phase Shift Keying (BPSK) or QPSK to generate a complex valued symbol d(0) to $d(M_{symb}-1)$. Here, when using π/2-BPSK, $M_{symb}=M_{bit}$, and when using QPSK, $M_{symb}=M_{bit}/2$. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the UE may perform transmission/reception using a bandwidth less than or equal to the bandwidth of the carrier (or cell). To this end, the UE may be configured with a bandwidth part (BWP) consisting of a continuous bandwidth of a portion of the bandwidth of the carrier. A UE operating according to TDD or operating in an unpaired spectrum may receive up to four DL/UL BWP pairs for one carrier (or cell). In addition, the UE may activate one DL/UL BWP pair. A UE operating according to FDD or operating in a paired spectrum may receive up to 4 DL BWPs on a downlink carrier (or cell) and up to 4 UL BWPs on an uplink carrier (or cell). The UE may activate one DL BWP and UL BWP for each carrier (or cell). The UE may not receive or transmit in time-frequency resources other than the activated BWP. The activated BWP may be referred to as an active BWP.

The base station may indicate an activated BWP among the BWPs configured by the UE through downlink control information (DCI). The BWP indicated through DCI is activated, and other configured BWP(s) are deactivated. In a carrier (or cell) operating in TDD, the base station may include a bandwidth part indicator (BPI) indicating the BWP activated in the DCI scheduling the PDSCH or PUSCH to change the DL/UL BWP pair of the UE. The UE may receive a DCI scheduling a PDSCH or a PUSCH and may identify a DL/UL BWP pair activated based on the BPI. In the case of a downlink carrier (or cell) operating in FDD, the base station may include a BPI indicating the activated BWP in the DCI scheduling the PDSCH to change the DL BWP of the UE. In the case of an uplink carrier (or cell) operating in FDD, the base station may include a BPI indicating the activated BWP in the DCI scheduling the PUSCH to change the UL BWP of the UE.

Figure 8:
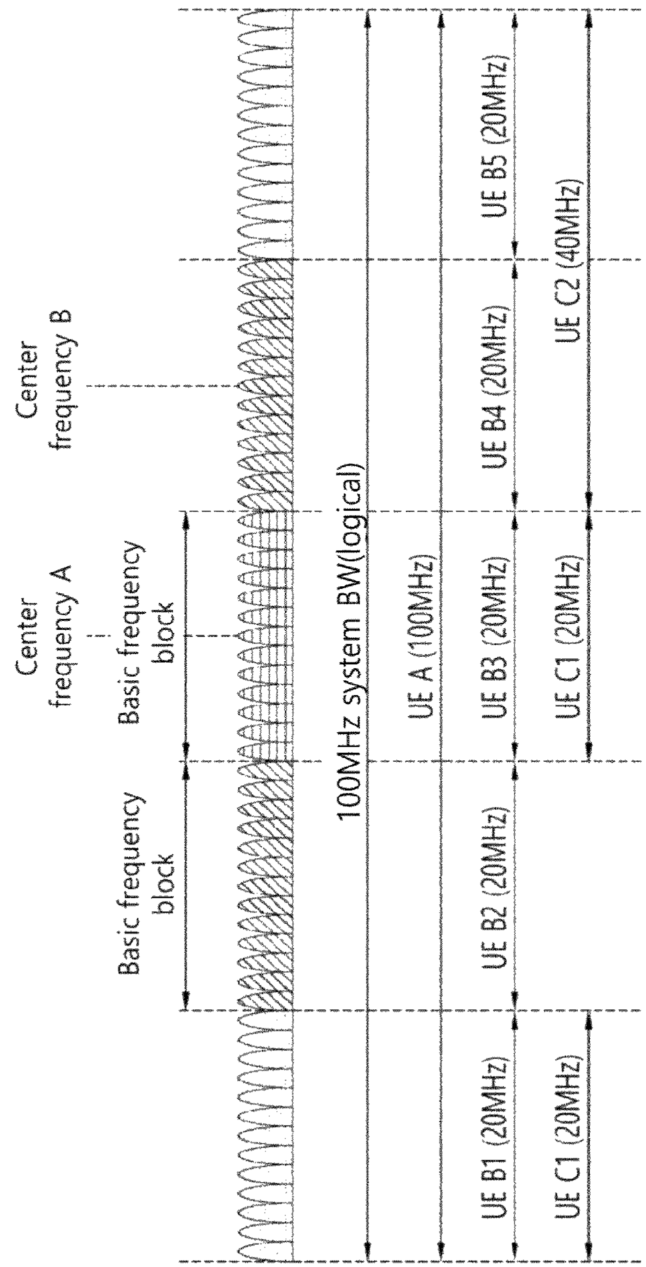
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
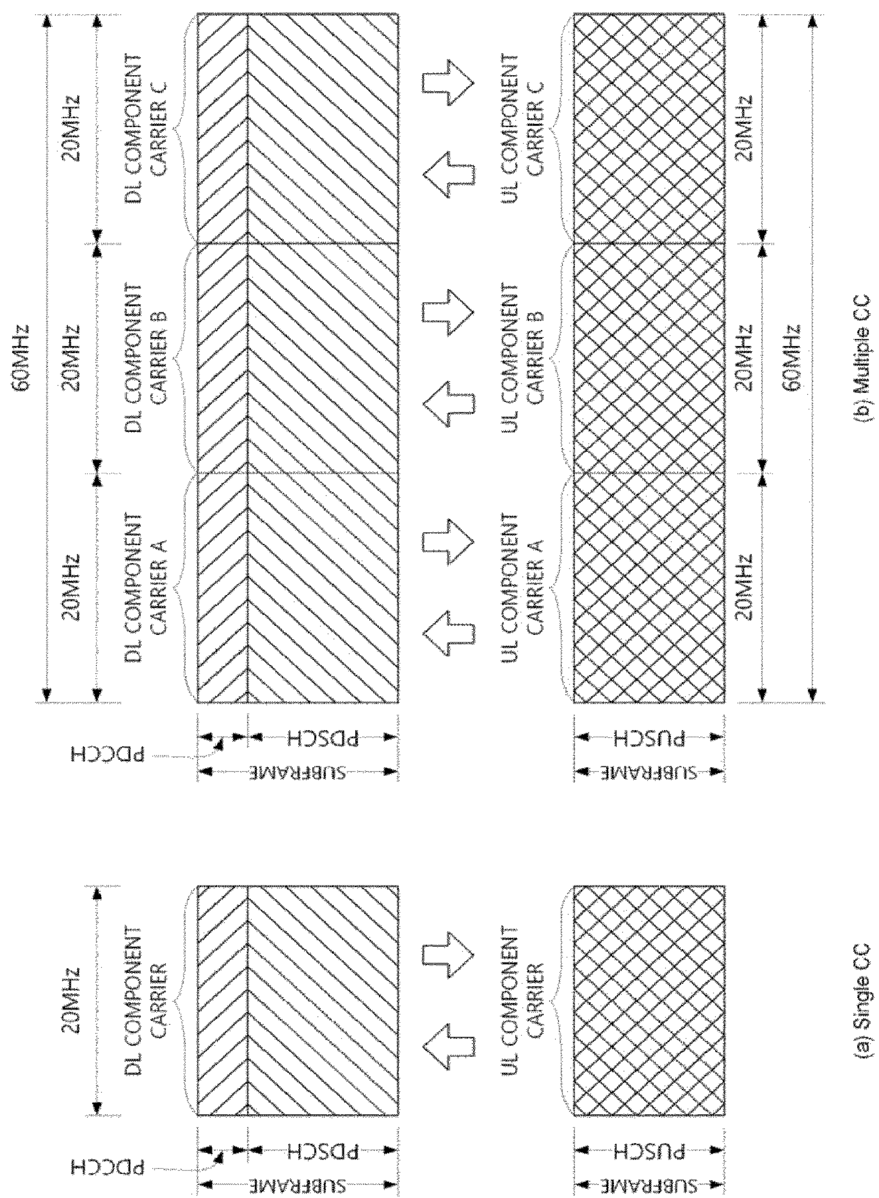
FIG. 9 is a diagram for explaining signal carrier communication and multiple carrier communication.

FIG. 9 is a drawing for explaining signal carrier communication and multiple carrier communication. Particularly, FIG. 9(*a*) shows a single carrier subframe structure and FIG. 9(*b*) shows a multi-carrier subframe structure.

Referring to FIG. 9(*a*), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(*b*), three 20 MHz component carriers (CCs) can be aggregated into each of UL and DL, so that a bandwidth of 60 MHz can be supported. Each CC may be adjacent or non-adjacent to one another in the frequency domain. FIG. 9(*b*) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
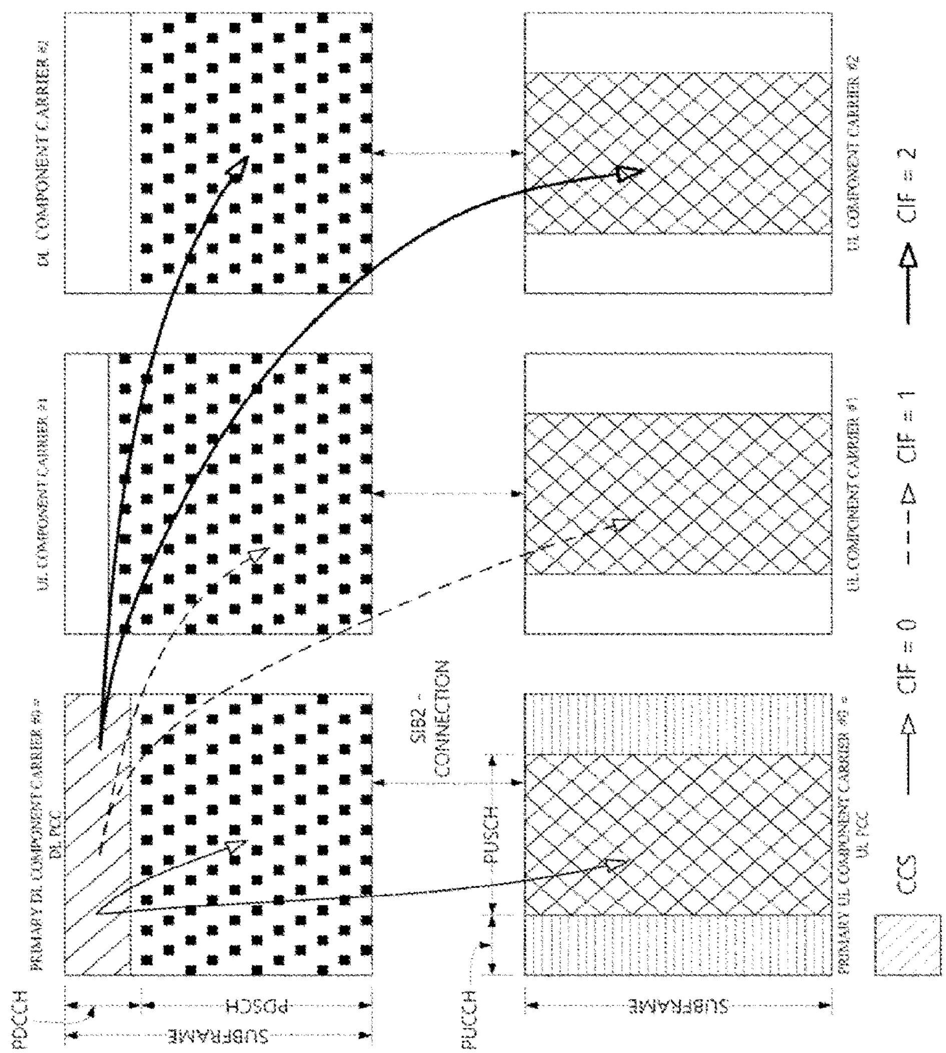
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
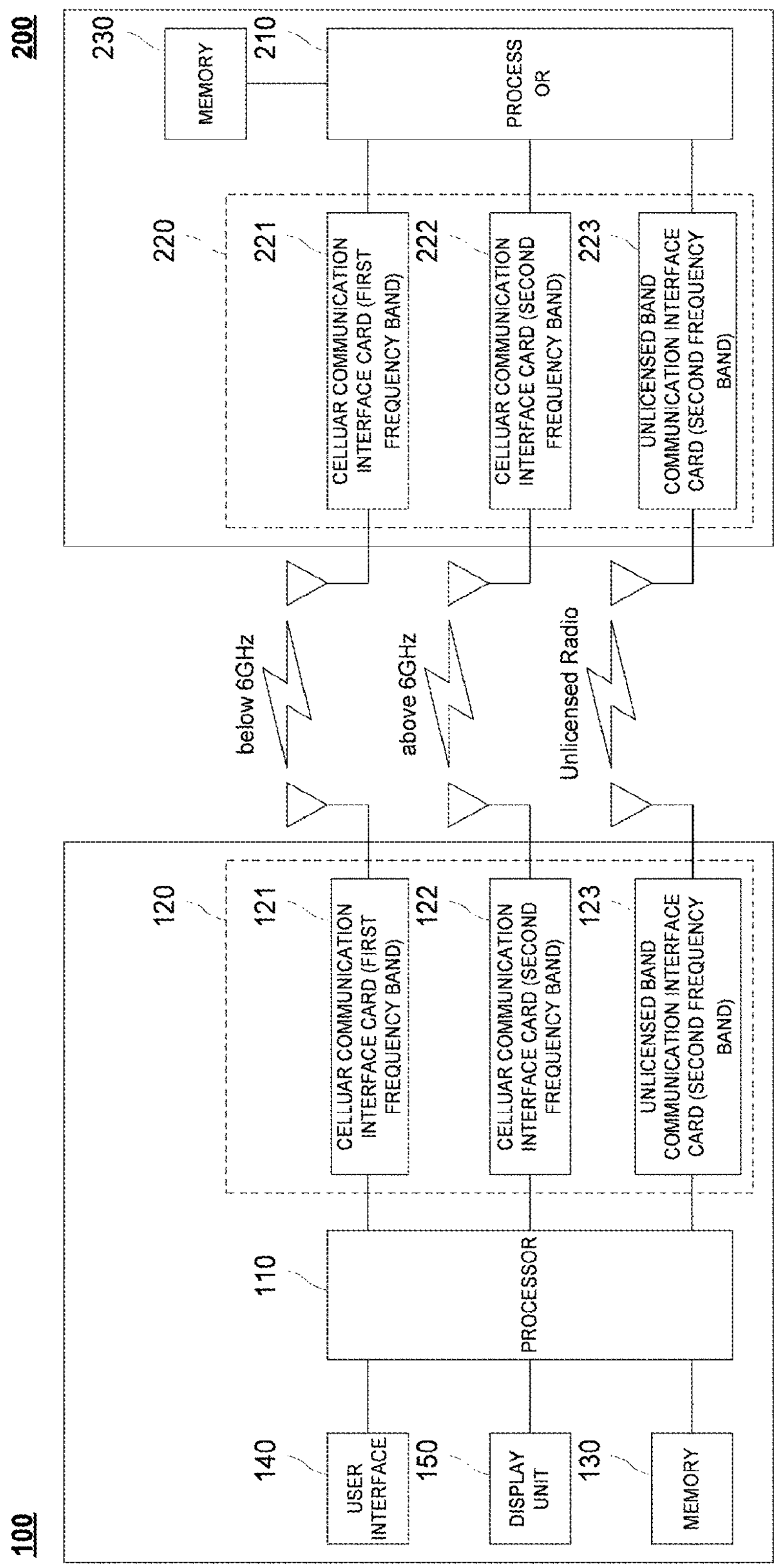
FIG. 11 is a block diagram showing the configurations of a UE and a base station according to an embodiment of the present disclosure.

FIG. 11 is a block diagram showing the configurations of a UE and a base station according to an embodiment of the present disclosure.

In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

The UE may receive a physical downlink control channel (PDCCH) transmitted from the base station. The UE may receive information such as a control resource set (CORESET) or a search space to receive the downlink control channel from the base station.

The control resource set may include information on a frequency domain in which a physical downlink control channel should be received. Specifically, the base station may provide information on the control resource set to the UE. Here, the information on the control resource set may include an index and the number of consecutive symbols of a physical resource block (PRB) or PRB sets from which the UE should receive a physical downlink control channel. Here, the number of consecutive symbols may be one of 1, 2, and 3.

A search space may include time information for receiving a set of PRBs indicated by the control resource set. Specifically, the base station may provide information on the search space to the UE. Here, the information on the search space may include at least one of a periodicity and an offset. Here, the periodicity and the offset may be configured in units of slots, sub-slots, symbols, or symbol sets, or slot sets. Information on the search space may include a CCE aggregation level (AL) received by the UE, the number of PDCCHs monitored by the UE for each CCE aggregation level, a search space type, a DCI format monitored by the UE, and RNTI information.

The CCE aggregation level may have at least one of 1, 2, 4, 8, and 16. The UE may monitor the PDCCH in the same number of CCEs as the value of the CCE aggregation level.

The search space may be divided into two types. Specifically, the type of search space may be divided into a common search space (CSS) and a UE-specific search space. The common search space may be a search space in which all UEs in a cell or some UEs in a cell monitor the PDCCH in common. The UE may be configured to monitor PDCCH candidates (e.g., PDCCH for transmission of DCI having CRC scrambled by at least one RNTI among SI-RNTI, RA-RNTI, MsgB-RNTI, P-RNTI, TC-RNTI, INT-RNTI, SFI-RNTI, TPC-PUSCH-RNTI, TPC-PUCCH-RNTI, TPC-SRS-RNTI, CI-RNTI, C-RNTI, MCS-C-RNTI, CS-RNTI (s), or PS-RNTI), which are broadcast to all UEs in a cell or some UEs in a cell in a common search space, and to receive the PDCCH. The UE-specific search space may be a search space in which a specific UE monitors the PDCCH. The specific UE may be configured to monitor PDCCH candidates (e.g., PDCCH for transferring DCI having CRC scrambled by at least one RNTI among C-RNTI, MCS-C-RNTI, SP-CSI-RNTI, CS-RNTI(s), SL-RNTI, SL-CS-RNTI, or SL-L-CS-RNTI), which are transmitted to a specific UE in a UE-specific search space, and to receive the PDCCH. In addition, the UE may receive a PDCCH including DCI indicating reception of a physical downlink shared channel, transmission of a physical uplink control channel, or transmission of a physical uplink shared channel in the common search space and UE-specific search space.

DCI formats monitored by the UE receiving scheduling for PUSCH transmission and PDSCH reception from the base station may be DCI formats 0_0, 0_1, 0_2, 1_0, 1_1, and 1_2. In the case of DCI formats 0_0, 0_1, 0_2, 1_0, 1_1, and 1_2, the RNTI information may include at least one of CS-RNTI, MCS-C-RNTI, and C-RNTI. Here, the CS-RNTI may be used to activate/release a semi-persistent scheduling (SPS) PDSCH or a configured grant (CG) PUSCH. In addition, CS-RNTI may be used to schedule retransmission of SPS PDSCH or CG PUSCH. Here, MCS-C-RNTI may be used to schedule a PDSCH or a PUSCH using a modulation and coding scheme (MCS) having high reliability. C-RNTI may be used to schedule PDSCH or PUSCH.

The DCI format that may be included in the PDCCH monitored by the UE may further include the following information.

DCI format 2_0 may include information on a dynamic slot format indicator (SFI) indicating the direction of symbols constituting the slot. Here, the direction of a symbol may be uplink, downlink, or flexible. In this case, a symbol having an uplink direction may be used for uplink transmission, a symbol having a downlink direction may be used for downlink reception, and a symbol having a flexible direction may be used for both uplink transmission and downlink reception. The RNTI used for DCI format 2_0 may be an SFI-RNTI.

DCI format 2_1 may include a downlink (DL) preemption indication or interrupted transmission indication indicating that there is no downlink transmission on PRB(s) and symbol (s) performed by the base station to the UE. The RNTI used for DCI format 2_1 may be an INT-RNTI.

DCI format 2_4 may include an uplink (UL) cancellation indication indicating cancellation of uplink transmission on PRB(s) performed by the UE to the base station. The RNTI used for DCI format 2_4 may be a CI-RNTI.

The UE may determine PDCCH candidates to receive the PDCCH based on the configured control resource set and information on the search space. After monitoring the PDCCH candidates and checking the CRC based on the RNTI value, the UE may determine whether the correct PDCCH has been received. The RNTI value may include SFI-RNTI, INT-RNTI, and CI-RNTI values as well as at least C-RNTI, MCS-C-RNTI, and CS-RNTI.

When the UE receives the PDCCH, the UE may perform an operation indicated by the DCI by decoding information on the control resource set and the search space based on the DCI included in the PDCCH. Here, the format of the DCI included in the PDCCH received by the UE may be one of DCI formats 0_0, 0_1, and 0_2 for scheduling the PUSCH. In addition, the format of the DCI included in the PDCCH received by the UE may be one of DCI formats 1_0, 1_1, and 1_2 for scheduling the PDSCH. In addition, the format of the DCI included in the PDCCH received by the UE may be one of DCI formats 1_0, 1_1, and 1_2 for scheduling the PUCCH. Here, the PUCCH may include HARQ-ACK information. In addition, the format of the DCI included in the PDCCH received by the UE may be one of DCI formats 2_0, 2_1, and 2_4.

When the UE receives DCI of DCI formats 1_0, 1_1, and 1_2 for scheduling the PDSCH, the UE may receive the PDSCH scheduled by the DCI. To this end, the UE should determine a slot in which the PDSCH is scheduled and the start index and length (number of symbols) of symbols in the slot based on the received DCI. A time domain resource assignment (TDRA) field of DCI of DCI formats 1_0, 1_1, and 1_2 received by the UE may indicate a value of K0 corresponding to timing information of a scheduled slot, an index of a start symbol in the slot, and a starting length indicator value (SLIV value) corresponding to a length thereof. Here, a value of K0 may be a non-negative integer value. Here, the SLIV may be a value obtained by jointly encoding the index (S) and length (L) values of the start symbol in the slot. The index (S) and length (L) values of the start symbol in the slot may be separately transmitted values. Here, S may have one of 0, 1, . . . , 13 in the case of a normal CP. In this case, L may have one of natural numbers satisfying the condition and here, a value of (S+L) is equal to or smaller than 14. S may have one of 0, 1, . . . , and 11 in the case of an extended CP. In this case, L may have one of natural numbers satisfying the condition and here, a value of (S+L) is equal to or smaller than 12.

The UE may determine a slot in which the PDSCH should be received based on the K0 value. Specifically, the UE may determine a slot in which the PDSCH should be received based on the index of a slot in which the K0 value and DCI are received, a subcarrier spacing (SCS) of a DL BWP receiving the DCI, and a subcarrier spacing of a DL BWP receiving the scheduled PDSCH.

For example, there may be a case in which the subcarrier spacing of the DL BWP receiving DCI and the DL BWP receiving the scheduled PDSCH are the same, and DCI is received in downlink slot n. Here, the UE may receive the PDSCH in downlink slot (n+K0). In the present specification, slot x may denote a slot having an index x or an x-th slot.

For example, the subcarrier spacing of the DL BWP receiving DCI is 15 kHz*2^mu_PDCCH, the subcarrier spacing of the DL BWP receiving the scheduled PDSCH is 15 kHz*2^mu_PDSCH, and the UE may receive DCI in downlink slot n. The index of the downlink slot n may be an index according to the subcarrier spacing of the DL BWP through which the UE receives DCI. Here, the UE may receive the PDSCH in slot floor(n*2^mu_PDSCH/2^mu_PDCCH)+K0. Here, the floor(n*2^mu_PDSCH/2^mu_PDCCH)+K0 may be an index determined according to the subcarrier spacing of the DL BWP through which the PDSCH is transmitted. The mu_PDCCH and mu_PDSCH may have the values of 0, 1, 2, and 3.

Figure 12:
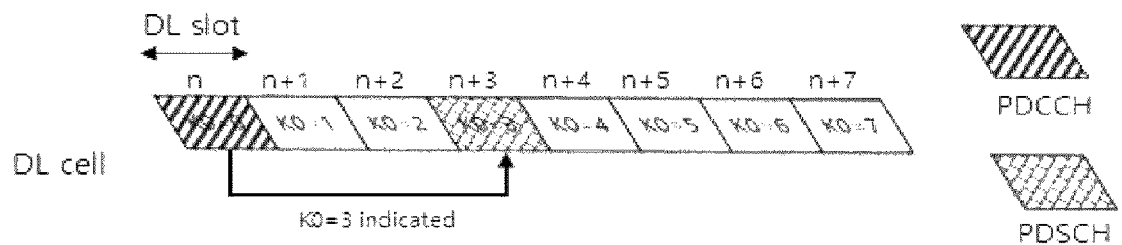
FIG. 12 illustrates scheduling of a physical downlink shared channel according to an embodiment of the present disclosure.

FIG. 12 illustrates scheduling of a physical downlink shared channel according to an embodiment of the present disclosure.

Referring to FIG. 12, a UE may receive a PDCCH scheduling a PDSCH in a downlink slot (DL slot) n. DCI included in the PDCCH may indicate a value of K0 as 3 (K0=3). Here if the subcarrier spacing of the DL BWP through which the PDCCH is transmitted and the subcarrier spacing of the DL BWP for which the PDSCH is scheduled are the same, the UE may be configured to determine that the PDSCH has been scheduled in the downlink slot (n+K0), that is, slot (n+3).

The UE may be configured to determine a slot for receiving the PDSCH by using the K0 value, and determine a symbol from which the PDSCH is transmitted using the values of the index (S) and length (L) of the start symbol in the slot for receiving the PDSCH. A symbol from which the PDSCH is transmitted may range from symbol S to symbol S+L−1 in a slot calculated based on the value of K0. From symbol S to symbol S+L−1 may be configured by consecutive L symbols.

The UE may additionally receive a downlink slot aggregation configured from the base station. Here, the downlink slot aggregation may have the values of 2, 4, and 8. When the UE receives the downlink slot aggregation configured, the UE may receive the PDSCH in consecutive slots according to the slot aggregation value starting from the slot obtained based on the value of K0.

When the UE receives DCI formats 1_0, 1_1, and 1_2, which are DCI for scheduling the PUCCH, the UE may transmit the PUCCH scheduled by the DCI to the base station. Here, the PUCCH may include HARQ-ACK information. The 'PDSCH-to-HARQ_feedback timing indicator' field included in DCI formats 1_0, 1_1, and 1_2 may indicate K1 value that is information about a slot in which the scheduled PUCCH can be transmitted. K1 may have a non-negative integer value. DCI format 1_0 may indicate one of {0, 1, 2, 3, 4, 5, 6, 7} as the K1 value. The K1 value that can be indicated in DCI formats 1_1 and 1_2 may be configured by a higher layer or the configured K1 value may be received through the higher layer. The HARQ-ACK information may correspond to HARQ-ACK information indicating whether reception of two types of channels is successful. The first type of HARQ-ACK information may correspond to, when the UE receives a PDSCH scheduling through DCI of DCI formats 1_0, 1_1, and 1_2, HARQ-ACK information on whether the UE has successfully received the PDSCH. The second type of HARQ-ACK information may correspond to, when the DCI of DCI formats 1_0, 1_1, 1_2 received by the UE indicates release of the SPS PDSCH, HARQ-ACK information on whether the UE has received the DCI indicating the release of the SPS PDSCH.

The UE may be configured to determine an uplink slot, in which the PUCCH including the first type of HARQ-ACK information is transmitted, as follows. The UE may determine a slot, in which the PUCCH is transmitted, based on an uplink slot overlapping the last symbol from which the PDSCH corresponding to the HARQ-ACK information is transmitted. For example, if the index of the uplink slot is m, the index of the uplink slot in which the UE transmits the PUCCH including HARQ-ACK information may be m+K1. The index of the uplink slot may be a value determined based on the subcarrier spacing of the BWP through which the PUCCH is transmitted. When the UE is configured with downlink slot aggregation, the last symbol from which the PDSCH is transmitted may correspond to the last symbol from which the PDSCH is scheduled in the last slot among the slots in which the PDSCH is received.

Figure 13:
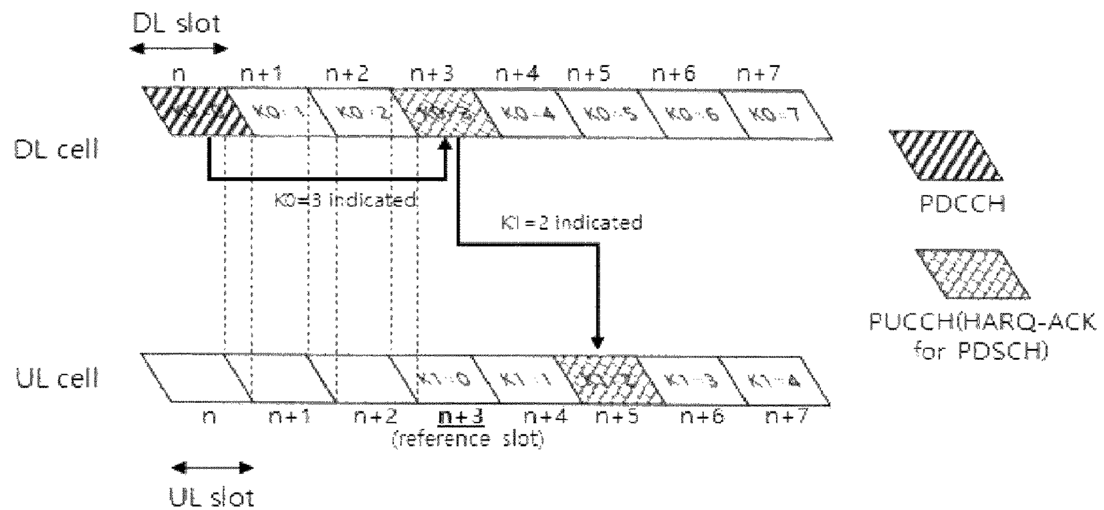
FIG. 13 illustrates scheduling of a physical uplink control channel according to an embodiment of the present disclosure.

FIG. 13 illustrates scheduling of a physical uplink control channel according to an embodiment of the present disclosure.

Referring to FIG. 13, a UE may receive a PDCCH for scheduling a PDSCH in downlink slot n. In this case, DCI included in the PDCCH may indicate a value of K0 as 3 and a value of K1 as 2. In addition, a subcarrier spacing of DL BWP through which a PDCCH is received, a subcarrier spacing of DL BWP for which a PDSCH is scheduled, and a subcarrier spacing of UL BWP through which a PUCCH is transmitted may be the same. Here, the UE may receive the PDSCH in downlink slot (n+K0), that is, downlink slot (n+3). The UE may determine an uplink slot overlapping the last symbol of a PDSCH scheduled in downlink slot (n+3). Here, the last symbol of the PDSCH scheduled in the downlink slot (n+3) overlaps the uplink slot (n+3). Accordingly, the UE may transmit a PUCCH including the first type of HARQ-ACK information on the uplink slot (n+3)+K1, that is, the slot (n+5).

In addition, the UE may determine a slot in which a PUCCH including the second type of HARQ-ACK information is transmitted as follows. The UE may determine an uplink slot overlapping the last symbol, in which a PDCCH corresponding to the second type of HARQ-ACK information is transmitted, as a slot in which the second type of HARQ-ACK information is transmitted. When the index of the uplink slot is m, the UE may transmit a PUCCH including the second type of HARQ-ACK information on the uplink slot m+K1. Here, the index of the uplink slot may be determined according to a subcarrier spacing of UL BWP through which the PUCCH is transmitted.

Figure 14:
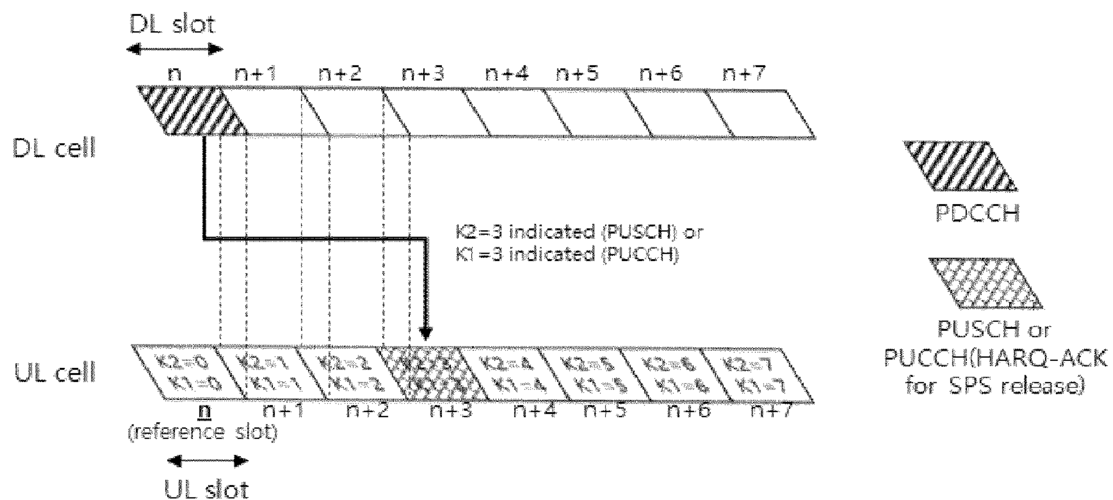
FIG. 14 illustrates scheduling of a physical uplink shared channel and a physical uplink control channel according to an embodiment of the present disclosure.

FIG. 14 illustrates scheduling of a physical uplink shared channel and a physical uplink control channel according to an embodiment of the present disclosure.

Referring to FIG. 14, a UE may receive DCI indicating release of an SPS PDSCH in downlink slot n. Here, the DCI may indicate a value of K1 as 3. A subcarrier spacing of DL BWP through which a PDCCH is received and a subcarrier spacing of UL BWP through which a PUCCH is transmitted may be the same. Here, the UE may determine an uplink slot overlapping the last symbol of a PDCCH received in slot n. The UE may be configured to determine that PUCCH including HARQ-ACK information of DCI indicating release of the SPS PDSCH is scheduled in uplink slot (n+K1), that is, slot (n+3).

When the UE has received DCI formats 0_0, 0_1, and 0_2, which are DCI for scheduling a PUSCH, the UE may transmit the scheduled PUSCH to a base station. To this end, the UE should determine a slot in which the PUSCH is scheduled and the start index and length (number of symbols) of symbols in a slot, through the DCI. A time domain resource assignment (TDRA) field of DCI formats 0_0, 0_1, and 0_2 may indicate a K2 value that is information on a slot in which a PUSCH is scheduled, and a starting length indicator value (SLIV) that is a value for information on an index and length of a start symbol in the slot. Here, K2 may have a non-negative integer value. Here, SLIV may be a value obtained by jointly encoding the values of the index (S) and length (L) of the start symbol in the slot. In addition, the SLIV may separately indicate the values of the index (S) and length (L) of the start symbol in the slot. Here, S may have one of values of 0, 1, . . . , 13 in the case of a normal CP, and L may have one of natural numbers satisfying the condition and here, a value of (S+L) is equal to or smaller than 14. S may have one of values of 0, 1, . . . , 11 in the case of extended CP, and L may have one of natural numbers satisfying the condition and here, a value of (S+L) is equal to or smaller than 12.

The UE may determine a slot in which the PUSCH is transmitted based on the K2 value. Specifically, the UE may determine a slot in which a PUSCH is transmitted, based on an index of a slot in which the K2 value and the DCI are transmitted, a subcarrier spacing of DL BWP through which DCI is transmitted, and a subcarrier spacing of UL BWP through which the PUSCH is transmitted.

For example, when the subcarrier spacing of the DL BWP through which DCI is transmitted and the subcarrier spacing of the UL BWP through which the scheduled PUSCH is transmitted are the same, and the UE receives DCI in downlink slot n, the UE may transmit a PUSCH in uplink slot (n+K2).

For example, the subcarrier spacing of the DL BWP through which DCI is transmitted is 15 kHz*2^mu_PDCCH, the subcarrier spacing of the UL BWP through which the scheduled PUSCH is transmitted is 15 kHz*2^mu_PUSCH, and the UE may receive DCI in downlink slot n. Here, the index of the downlink slot n may be determined according to the subcarrier spacing of the DL BWP through which DCI is transmitted. Here, the UE may transmit the PUSCH in the slot floor(n*2^mu_PUSCH/2^mu_PDCCH)+K2. The index floor(n*2^mu_PUSCH/2^mu_PDCCH)+K2 of the uplink slot may be determined according to the subcarrier spacing of the UL BWP through which the PUSCH is transmitted. mu_PDCCH and mu_PUSCH may have the values of 0, 1, 2, and 3.

Referring to FIG. 14, the UE may receive a PDCCH for scheduling a PUSCH in downlink slot n. DCI included in the PDCCH may indicate a value of K2 as 3. A subcarrier spacing of DL BWP through which a PDCCH is transmitted and a subcarrier spacing of UL BWP through which a PUSCH is transmitted may be the same. Here, the UE may be configured to determine that the PUSCH is scheduled in the uplink slot (n+K2), that is, the slot (n+3).

The UE may determine a slot for transmitting the PUSCH based on the K2 value, and may determine a symbol capable of transmitting the PUSCH using the values of the index (S) and length (L) of the start symbol in the determined slot. Specifically, a symbol from which the PUSCH is transmitted may correspond to from symbol S to symbol S+L−1 in a slot determined based on the K2 value. From symbol S to symbol S+L−1 may correspond to consecutive L symbols.

In addition, the UE may receive an uplink slot aggregation configured from the base station. The uplink slot aggregation value may be 2, 4, or 8. When the UE receives the uplink slot aggregation configured, the UE may transmit the PUSCH in consecutive slots corresponding to the slot aggregation value from the slot determined based on the K2 value.

Referring to FIGS. 12 to 14, the UE may use the values of K0, K1, and K2 to determine a slot in which a scheduled PDSCH is transmitted, a slot in which a PUCCH is transmitted, and a slot in which a PUSCH is transmitted. In the present specification, a slot determined when the values of K0, K1, and K2 are 0 may be described as a reference point or a reference slot. That is, in FIG. 12, the reference slot corresponds to a downlink slot n, which is a slot in which the PDCCH is received; in FIG. 13, the reference slot corresponds to an uplink slot (n+3), which is an uplink slot overlapping the last symbol from which the PDSCH is transmitted; and in FIG. 14, the reference slot may correspond to an uplink slot n, which is an uplink slot overlapping the last symbol from which the PDCCH is transmitted.

In this specification, the uplink slot and the downlink slot may be referred to as a slot without separately distinguishing between the uplink slot and the downlink slot. Hereinafter, it is assumed that the subcarrier spacing of the DL BWP through which the PDSCH and PDCCH are transmitted and the subcarrier spacing of the UL BWP through which the PUSCH and PUCCH are transmitted are the same.

In order to increase the reliability of PDCCH reception, the UE may receive the configuration of repeated reception of the PDCCH from the base station. The reliability of the PDCCH reception may be based on a CCE aggregation level (AL) for the PDCCH. For example, the UE may have higher reliability when receiving the PDCCH at the CCE aggregation level 8 or 16 instead of receiving the PDCCH at the CCE aggregation level 1 or 2. In the present specification, the reception reliability may denote a probability in which the UE succeeds in receiving the PDCCH.

The base station may configure the CCE aggregation level and the number of PDCCH candidates monitored by the UE per CCE aggregation level through search space information and a control resource set through which the UE receives the PDCCH. A UE in a specific situation, for example, a UE located at a cell-edge may require a high CCE aggregation level for PDCCH reception. However, there may be a case in which the control resource set configured by the base station for the UE cannot provide the CCE aggregation level for PDCCH reception. For example, in order to support CCE aggregation level 16 for PDCCH reception, the control resource set of the UE requires 16 CCEs, that is, 96 resource element groups (REGs). Here, if the control resource set includes 2 symbols, the control resource set may include 96 REGs when at least 48 RB(s) are allocated on resources in the frequency domain. However, when the bandwidth of the frequency domain supported by the UE is narrow, or when the base station configures the UE to use only a narrow bandwidth for channel reception, the control resource set may not support CCE aggregation level 16. In a situation in which configuration of a high CCE aggregation level is difficult, the base station may configure the UE to repeatedly receive the PDCCH.

In the present specification, PDCCH 1A, PDCCH 1B, and the like may refer to a PDCCH received by the UE by monitoring the PDCCH #1A candidate, the PDCCH #1B candidate, and the like. In addition, in the present specification, a (repeated) PDCCH candidate and a (repetitive) PDCCH may be interchangeably described.

Hereinafter, a detailed method in which a base station configures a UE to repeatedly receive a PDCCH will be described with reference to FIGS. 15 to 17.

Figure 15:
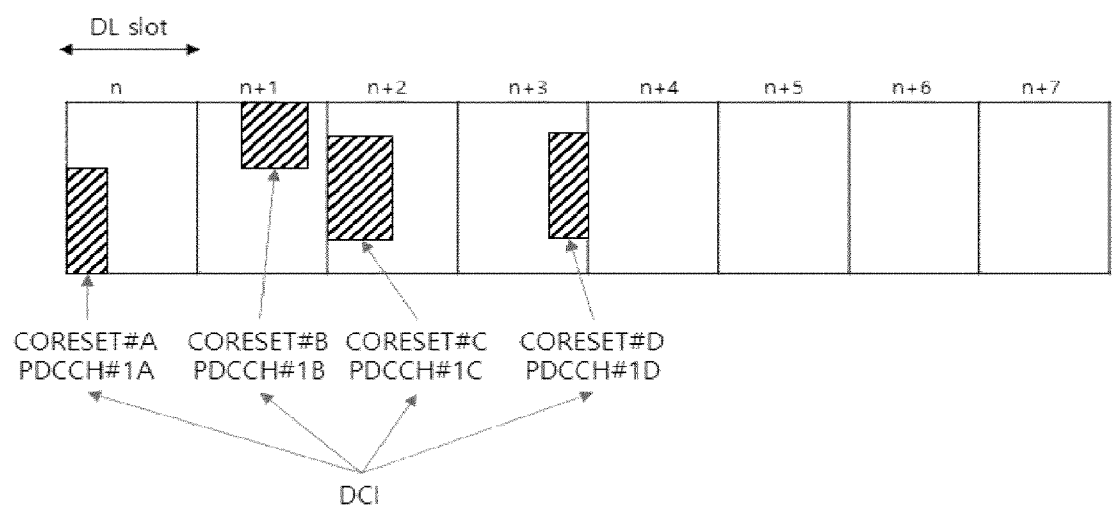
FIG. 15 illustrates repeated transmission of PDCCH in different control resource sets according to an embodiment of the present disclosure.

FIG. 15 illustrates repeated transmission of PDCCH in different control resource sets according to an embodiment of the present disclosure.

Referring to FIG. 15, a UE may assume that PDCCHs transmitted in a plurality of different control resource sets include the same DCI. Specifically, the UE may receive PDCCH 1A by performing monitoring in CORESET A of the first slot (slot n in FIG. 15), and the UE may receive PDCCH 1B by monitoring in CORESET B of the second slot (slot (n+1) in FIG. 15). Here, the UE may receive in advance, from a base station, a configuration in which PDCCH 1A and PDCCH 1B are PDCCHs including the same DCI. The UE may acquire DCI information by independently decoding each of PDCCH 1A and PDCCH 1B. However, when acquisition of DCI information has failed even after independently decoding the PDCCH 1A and PDCCH 1B, the UE may acquire DCI information by combining and decoding the PDCCH 1A and PDCCH 1B. In addition to the above-described PDCCH 1A and PDCCH 1B, the UE may receive PDCCH 1C through CORESET C and receive PDCCH 1D through CORESET D. In addition, although it has been described in FIG. 15 that the same DCI is included in the PDCCH of CORESETs of different slots (e.g., slot n and slot (n+1)), a plurality of CORESETs may be configured in one slot, the UE may receive PDCCHs through the plurality of CORESETs, and the received PDCCHs may include the same DCI. In other words, the first slot and the second slot may be different slots or the same slot. In addition, PDCCHs including the same DCI may have the same CCE aggregation level.

Figure 16:
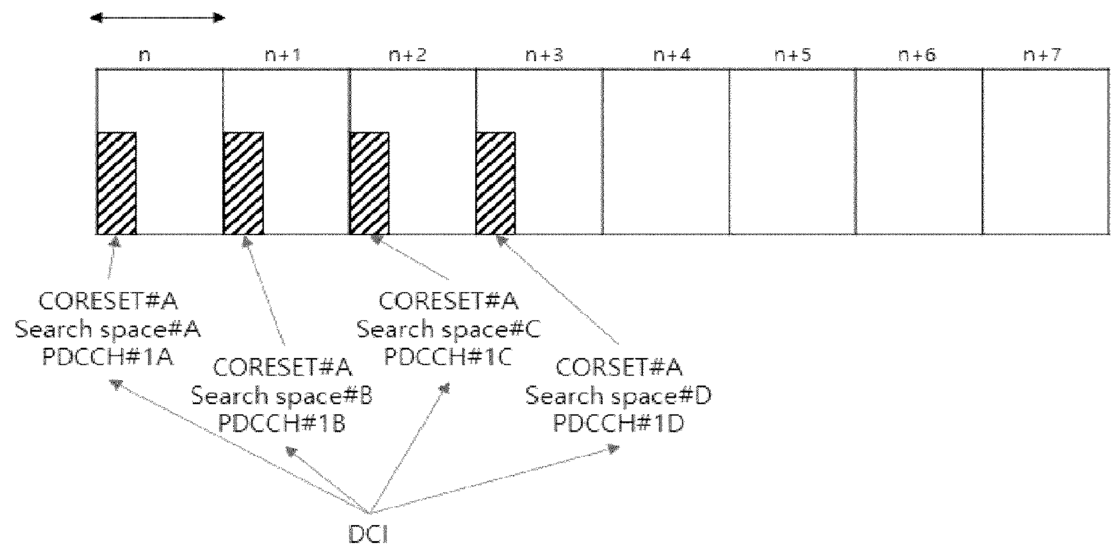
FIG. 16 illustrates repeated transmission of PDCCH in different search spaces according to an embodiment of the present disclosure.

FIG. 16 illustrates repeated transmission of PDCCH in different search spaces according to an embodiment of the present disclosure.

Referring to FIG. 16, a base station may configure a plurality of search spaces in one CORESET (CORESET A in FIG. 16) for the UE. That is, although a CORESET is configured in the same resource domain for each slot, a search space of each slot may be configured in a different time resource domain. The UE may assume that PDCCHs transmitted in a plurality of search spaces include the same DCI. Since one CORESET corresponds to the same resource domain for each slot, the lengths of the frequency domain and the time domain (number of symbols) in which the PDCCH is transmitted are the same. The UE may receive PDCCH 1A by monitoring in the search space A of CORESET A of the first slot (slot n in FIG. 16), and may receive PDCCH 1B by monitoring in the search space B of CORESET A of the second slot (slot (n+1) in FIG. 16). The base station may preconfigure, for the UE, that the DCI included in PDCCH 1A and PDCCH 1B is the same. The UE may acquire DCI information by independently decoding each of PDCCH 1A and PDCCH 1B. However, when acquisition of DCI information has failed even after independently decoding PDCCH 1A and PDCCH 1B, DCI information may be acquired by combining and decoding the PDCCH 1A and PDCCH 1B. In addition, the UE may receive PDCCH 1C in search space C and receive PDCCH 1D in search space D, in addition to PDCCH 1A and PDCCH 1B. In addition, although it has been described in FIG. 16 that the same DCI is included in the PDCCH transmitted through the search spaces of different slots (e.g., slot n and slot (n+1)), a plurality of search spaces may be configured in one slot, the UE may receive PDCCHs through the plurality of search spaces, and the received PDCCHs may include the same DCI. In other words, the first slot and the second slot may be different slots or the same slot. In addition, PDCCHs including the same DCI may have the same CCE aggregation level.

In the present specification, for convenience of explanation, PDCCHs including the same DCI information may be described as a repetition PDCCH. In addition, a PDCCH transmitted only one time may be included in a repetition PDCCH. For example, the PDCCHs in FIGS. 15 and 16 are PDCCHs, each of which is repeated four times, and may be configured as PDCCH 1A, PDCCH 1B, PDCCH 1C, and PDCCH 1D.

When the UE is configured to receive a repetition PDCCH from the base station, the UE may receive a PDCCH by monitoring PDCCH candidates (e.g., PDCCH #1A candidate, PDCCH #1B candidate, PDCCH #1C candidate, and PDCCH #1D candidate of FIGS. 15 and 16) configured to be repeatedly received including the same DCI information, and may determine whether the DCI included in the received PDCCH has been properly received. The UE may determine whether one, multiple, or all of the repetition PDCCHs have been successfully received. For example, if the PDCCH is configured to be transmitted repeatedly four times, the UE may perform monitoring only on the PDCCH #1A candidate to successfully receive the DCI included in the corresponding PDCCH. In addition, the UE may successfully receive the DCI included in the corresponding PDCCH by monitoring the PDCCH #1B candidate and the PDCCH #1C candidate. In addition, the UE may successfully receive DCI included in the corresponding PDCCH by monitoring the PDCCH #1A candidate, the PDCCH #1B candidate, the PDCCH #1C candidate, and the PDCCH #1D candidate.

Figure 17:
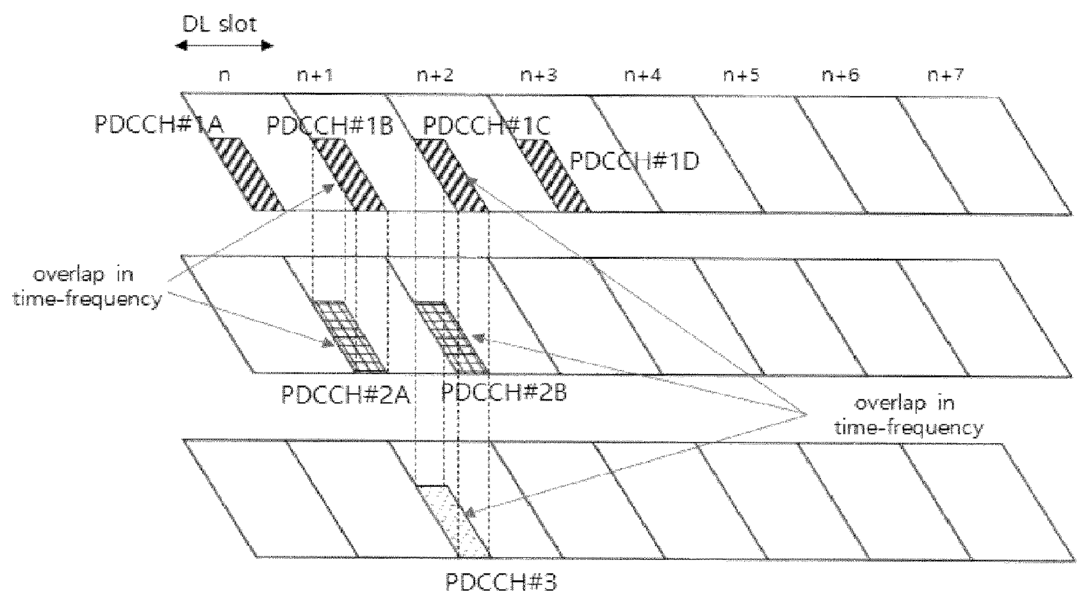
FIG. 17 illustrates different repetition PDCCHs overlapping in the time-frequency domain according to an embodiment of the present disclosure.

FIG. 17 illustrates different repetition PDCCHs overlapping in the time-frequency domain according to an embodiment of the present disclosure.

A base station may configure a UE to receive a first repetition PDCCH by monitoring a first repetition PDCCH candidate in a first CORESET and a search space. Similarly, the base station may configure a UE to receive a second repetition PDCCH, a third repetition PDCCH, and a fourth repetition PDCCH by monitoring a second repetition PDCCH candidate, a third repetition PDCCH candidate, and a fourth repetition PDCCH candidate in a second CORESET and a search space, a third CORESET and a search space, and a fourth CORESET and a search space, respectively.

Referring to FIG. 17, the UE may receive a first repetition PDCCH by monitoring the repetition PDCCH #1 candidate (the first repetition PDCCH candidate) in the first CORESET and the search space. The first repetition PDCCH may be configured to be transmitted repeatedly four times. The PDCCH repeated four times may correspond to a PDCCH transmitted on a PDCCH #1A candidate in slot n, a PDCCH #1B candidate in slot (n+1), a PDCCH #1C candidate in slot (n+2), and a PDCCH #1D candidate in slot (n+3). The UE may receive a second repetition PDCCH by monitoring the repetition PDCCH #2 candidate (the second repetition PDCCH candidate) in the second CORESET and the search space. The second repetition PDCCH may be configured to be transmitted repeatedly two times. The PDCCH repeated two times may be a PDCCH transmitted in a PDCCH #2A candidate of slot (n+1) and a PDCCH #2B candidate of slot (n+2). The UE may receive a third repetition PDCCH by monitoring the repetition PDCCH #3 candidate (the third repetition PDCCH candidate) in the third CORESET and the search space. The third repetition PDCCH may be configured to be received without repetition in slot (n+2). Here, the received PDCCH may include DCI in a DCI format having a CRC scrambled by C-RNTI, MCS-C-RNTI, CS-RNTI, SFI-RNTI, INT-RNTI, or CI-RNTI. Here, the received DCI format may include DCI formats 0_0, 0_1, 0_2, 1_0, 1_1, 1_2, 2_0, 2_1, to 2_4.

Referring to FIG. 17, there may be a case in which resources for monitoring PDCCHs transmitted in different CORESETs and search spaces, the configuration of which is received from the base station by the UE, are overlapped. Specifically, the base station may configure the UE to repeatedly monitor the repetition PDCCH #1 candidate (the first repetition PDCCH candidate) in slots n, n+1, n+2, and n+3. The base station may configure the UE to repeatedly monitor the repetition PDCCH #2 candidate (the second repetition PDCCH candidate) in slots n+1 and n+2. That is, the UE should monitor the repetition PDCCH #1 candidates and the repetition PDCCH #2 candidates in the slots n+1 and n+2, and receive the corresponding PDCCHs. Here, when the time-frequency resource domain of slot (n+1) and slot (n+2) in which PDCCH #1 is transmitted overlaps the resource through which PDCCH #2 is transmitted, the UE may be configured not to distinguish whether PDCCHs received in slots n+1 and n+2 after performing monitoring thereof is repetition PDCCH #1 or repetition PDCCH #2. Therefore, although the UE has successfully received the repetition PDCCH, in the case of decoding DCI information included in the received repetitive PDCCH, a problem may occur as to whether the received PDCCH should be determined as repetition PDCCH #1 or repetition PDCCH #2. In addition, the base station may configure the UE to monitor the repetition PDCCH #3 candidate (the third repetition PDCCH candidate) without repetition in slot (n+2) to receive the corresponding PDCCH. Here, the UE may monitor the repetition PDCCH #1 candidate, the repetition PDCCH #2 candidate, and the PDCCH #3 candidate in slot (n+2) and receive the corresponding PDCCH. When the time-frequency resource domains of slot (n+2) in which PDCCH #1, PDCCH #2, and PDCCH #3 are transmitted overlap, the UE may be configured not to distinguish whether the PDCCH received in slot (n+2) is repetition PDCCH #1, repetition PDCCH #2, or repetition PDCCH #3. Therefore, although the UE has successfully received the repetition PDCCH, in the case of decoding the DCI information included in the received repetition PDCCH, a problem may occur as to whether the UE should determine the received PDCCH as the repetition PDCCH #1, the repetition PDCCH #2, or the repetition PDCCH #3. The overlapping of the time-frequency resource domains described above may include a case in which the resource domains in which PDCCHs are transmitted fully overlap. In other words, this case may include a situation in which CCEs in which each PDCCH is transmitted fully overlap.

Hereinafter, description will be given of the case in which the UE cannot determine a repetition PDCCH the received PDCCH corresponding to, due to the overlapping of the time-frequency resource domains, that is, the ambiguity of the PDCCH.

Figure 18:
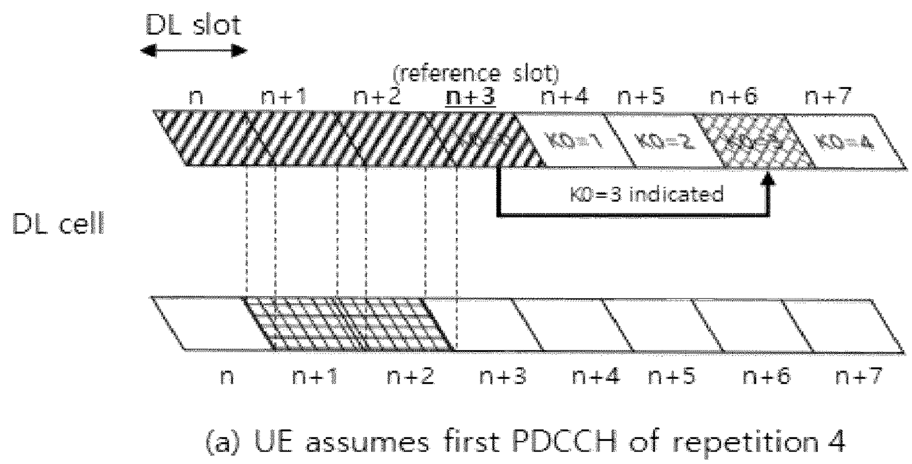
FIG. 18 illustrates a problem occurring when determining a slot in which a physical downlink shared channel is scheduled according to an embodiment of the present disclosure.
Figure 18:
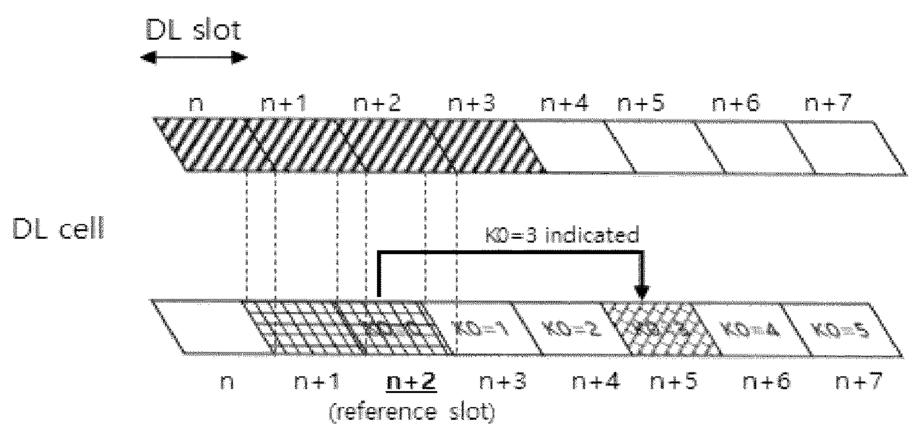
Figure 18:
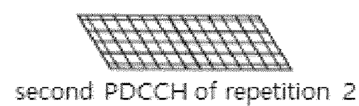
Figure 18:
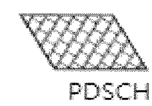

FIG. 18 illustrates a problem occurring when determining a slot in which a physical downlink shared channel is scheduled according to an embodiment of the present disclosure.

FIG. 18 illustrates a problem with respect to a value of K0 described above. Referring to FIG. 18(*a*), when DCI successfully received by a UE is included in a first repetition PDCCH (configured to be transmitted repeatedly four times), the UE may be configured to regard slot (n+3), in which the last repetition PDCCH of the first repetition PDCCH is transmitted, as a reference slot, and apply a value of K0 from the reference slot. That is, the UE may be configured to determine that a PDSCH is scheduled to be transmitted in slot (n+3)+K0(n+3+3), that is, slot (n+6). Referring to FIG. 18(*b*), when the DCI successfully received by the UE is included in a second repetition PDCCH (configured to be transmitted repeatedly two times), the UE may be configured to regard slot (n+2), in which the last repetition PDCCH of the second PDCCH is transmitted, as a reference slot, and apply a value of K0 from the reference slot. That is, the UE may be configured to determine that a PDSCH is scheduled to be transmitted in slot (n+5), which is slot (n+2)+K0(n+2+3). Therefore, different results may occur depending on which repetition PDCCH the DCI successfully received by the UE belongs to.

Figure 19:
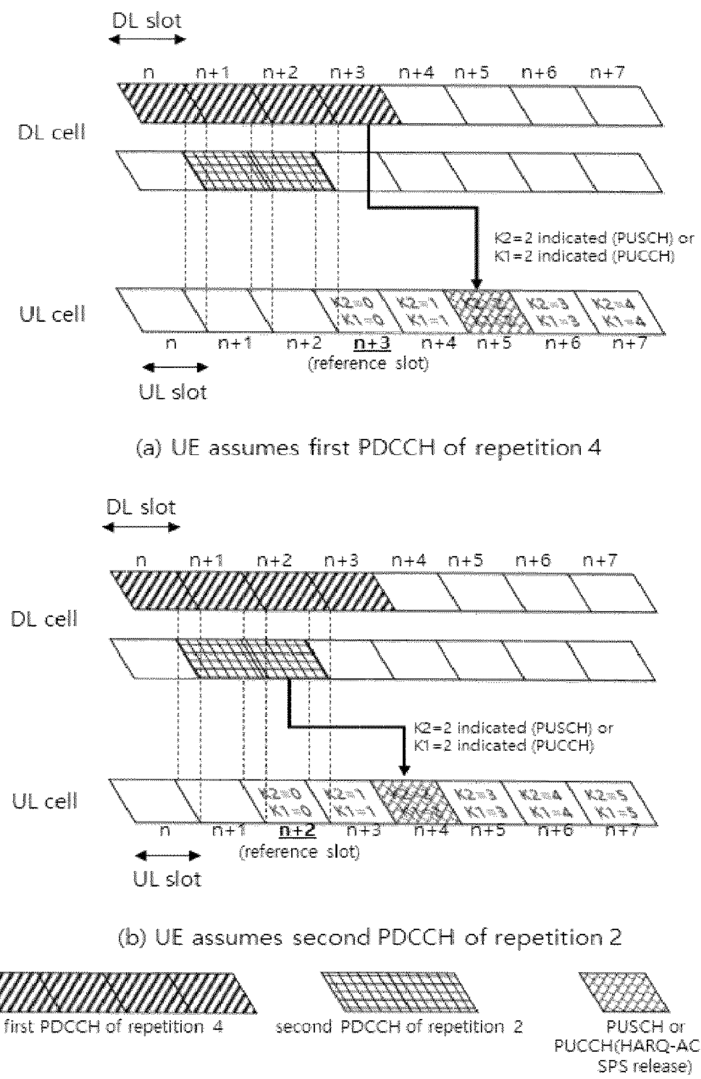
FIG. 19 illustrates a problem occurring when determining a slot in which a physical uplink shared channel and a physical uplink control channel are scheduled according to an embodiment of the present disclosure.

FIG. 19 illustrates a problem occurring when determining a slot in which a physical uplink shared channel and a physical uplink control channel are scheduled according to an embodiment of the present disclosure.

FIG. 19 illustrates a problem with respect to the K1 and K2 values described above.

First, the problem with respect to the K1 value will be described with reference to FIG. 19. The PUCCH of FIG. 19 may include HARQ-ACK information for DCI indicating release of the SPS PDSCH. Referring to FIG. 19(*a*), when the DCI successfully received by the UE is included in a first repetition PDCCH (configured to be transmitted repeatedly four times), the UE may be configured to regard slot (n+3), in which the last repetition PDCCH of the first repetition PDCCH is transmitted, as a reference slot, and apply the K1 value from the reference slot. That is, the UE may be configured to determine that a PUCCH is scheduled to be transmitted in slot (n+5), which is slot (n+3)+K1 (n+3+2). Referring to FIG. 19(*b*), when the DCI successfully received by the UE is included in a second repetition PDCCH (configured to be transmitted repeatedly two times), the UE may be configured to regard slot (n+2), in which the last repetition PDCCH of the second repetition PDCCH is transmitted, as a reference slot, and the K1 value may be applied from the reference slot. That is, the UE may be configured to determine that the PUCCH is scheduled to be transmitted in the slot (n+4), which is the slot (n+2)+K2 (n+2+2). Therefore, different results may occur depending on which repetition PDCCH the DCI successfully received by the UE belongs to.

Next, a problem with respect to a value of K2 will be described with reference to FIG. 19. Referring to FIG. 19(*a*), when the DCI successfully received by the UE is included in a first repetition PDCCH (configured to be transmitted repeatedly four times), the UE may be configured to regard slot (n+3), in which the last repetition PDCCH of the first PDCCH is transmitted, as a reference slot, and apply the K2 value from the reference slot. That is, the UE may be configured to determine that a PUSCH is scheduled to be transmitted in slot (n+3)+K2 (n+3+2), that is, slot (n+5). Referring to FIG. 19(*b*), when the DCI successfully received by the UE is included in the second repetition PDCCH (configured to be transmitted repeatedly two times), the UE may be configured to regard slot (n+2), in which the last repetition PDCCH of the second repetition PDCCH is transmitted, as a reference slot, and apply the K2 value from the reference slot. That is, the UE may be configured to determine that a PUSCH is scheduled to be transmitted in slot (n+4), which is slot (n+2)+K2 (n+2+2). Therefore, different results may occur depending on which repetition PDCCH the DCI successfully received by the UE belongs to.

Figure 20:
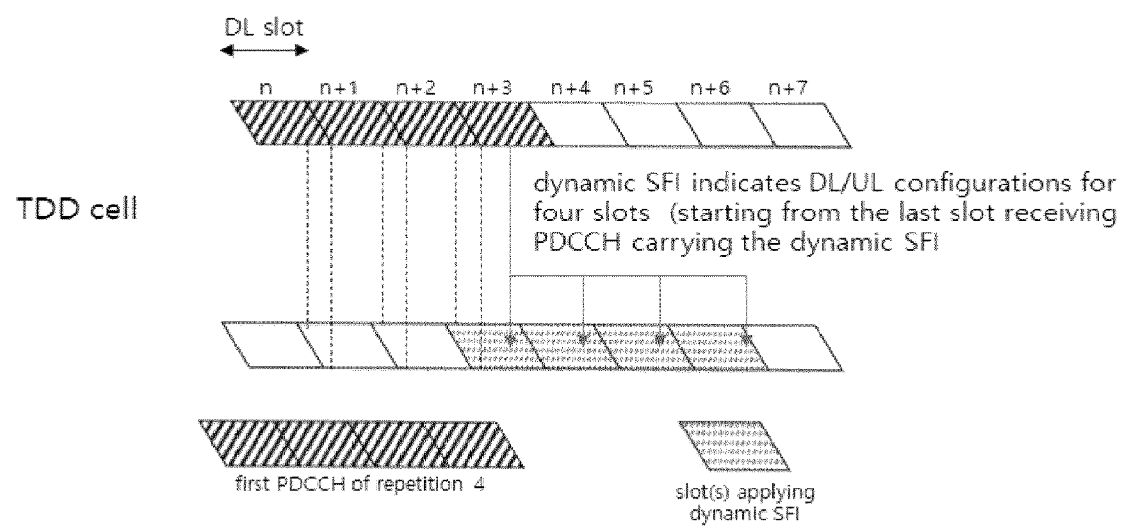
FIG. 20 illustrates determination of a slot according to a dynamic slot format indicator according to an embodiment of the present disclosure.

FIG. 20 illustrates slot determination according to a dynamic slot format indicator according to an embodiment of the present disclosure.

FIG. 20 illustrates a problem occurring when a slot indicated by a dynamic slot format indicator (SFI) and a symbol configuration (uplink, downlink, or flexible) of the indicated slot are applied.

DCI of DCI format 2_0 included in a first repetition PDCCH transmitted by a base station may include dynamic SFI. The UE may determine a slot and a symbol configuration of the slot based on the dynamic SFI. Here, the slot indicated by the dynamic SFI may be a specific number of slot(s) starting from the last slot among the slots in which the repetition PDCCH is transmitted. Here, a specific number may be configured by RRC. For example, referring to FIG. 20, the base station may configure the UE to repeatedly receive the first repetition PDCCH in slot n, slot (n+1), slot (n+2), and slot (n+3). The UE may be configured to apply the symbol configuration indicated by the dynamic SFI to four slots from slot (n+3), which is the last slot in which the first repetition PDCCH is transmitted. In FIG. 20, it has been described that the slot configuration indicated by the dynamic SFI is applied to starting from the last slot in which the first repetition PDCCH is transmitted. However, the slot configuration indicated by the dynamic SFI may be applied to starting from the first slot in which the first repetition PDCCH is transmitted, from a slot after the number of slots configured by a higher layer after the first slot, or from after the number of slots configured by a higher layer after the last slot.

Figure 21:
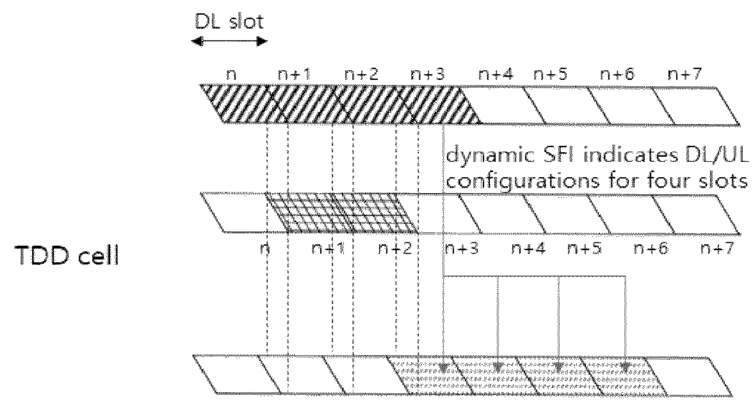
FIG. 21 illustrates a problem occurring when a slot is determined according to a dynamic slot format indicator according to an embodiment of the present disclosure.
Figure 21:
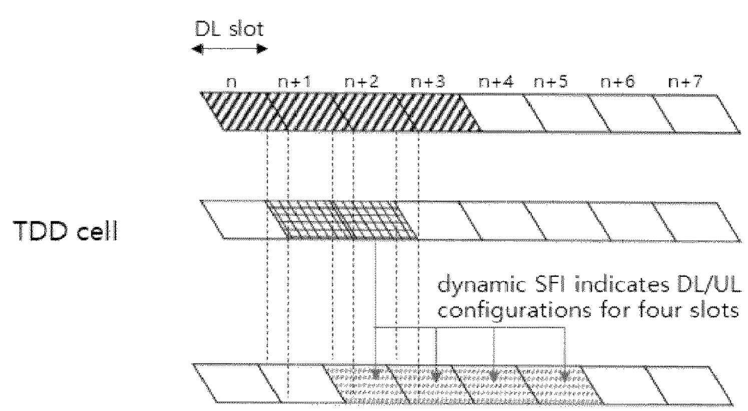

FIG. 21 illustrates a problem occurring when a slot is determined according to a dynamic slot format indicator according to an embodiment of the present disclosure.

FIG. 21 illustrates a problem occurring when a slot indicated by dynamic SFI and a symbol configuration of the indicated slot are applied. Referring to FIG. 21(*a*), when the DCI of DCI format 2_0, which has successfully received by a UE, is included in a first repetition PDCCH (configured to be transmitted repeatedly four times), the UE may be configured to apply the symbol configuration indicated by dynamic SFI to from slot (n+3), which is the last slot among slots in which the first repetition PDCCH is transmitted. Referring to FIG. 21(*b*), when the DCI of DCI format 2_0 successfully received by the UE is included in a second repetition PDCCH (configured to be transmitted repeatedly two times), the UE may be configured to apply the symbol configuration indicated by dynamic SFI to from slot (n+2), which is the last slot among slots in which the second repetition PDCCH is transmitted. Accordingly, a slot to which the symbol configuration indicated by the dynamic SFI is applied may vary depending on which repetition PDCCH the DCI successfully received by the UE belongs to.

Figure 22:
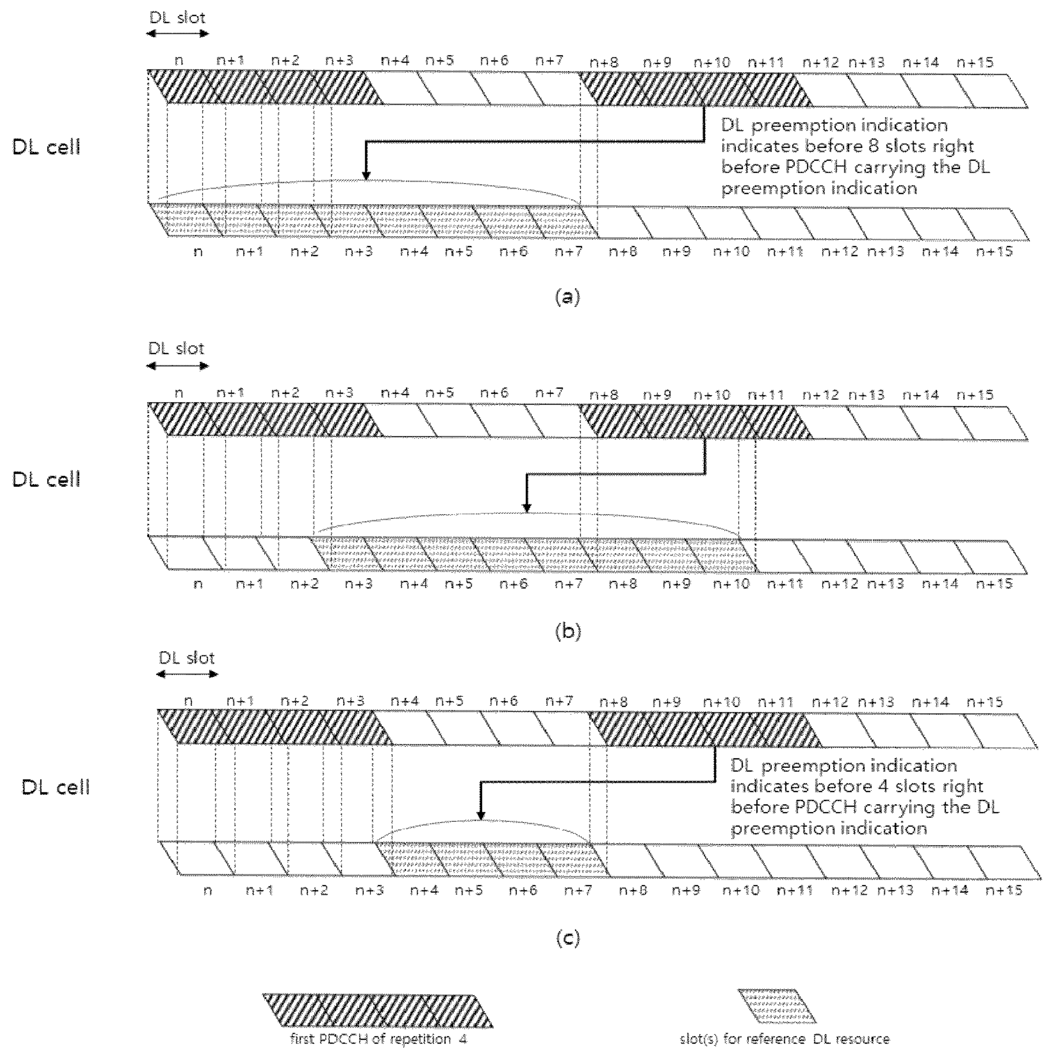
FIG. 22 illustrates determination of a slot based on a downlink preemption indication according to an embodiment of the present disclosure.

FIG. 22 illustrates determination of a slot based on a downlink preemption indication according to an embodiment of the present disclosure.

FIG. 22 illustrates a problem with respect to a resource in a time-frequency domain indicated by a downlink (DL) preemption indication.

The base station may include, in a first repetition PDCCH, DCI of DCI format 2_1 including the DL preemption indication and transmit the same to a UE. The UE may determine a reference DL resource to determine a resource on the time-frequency domain indicated by the DL preemption indication. The DL preemption indication may indicate a resource on the time-frequency domain of some of the reference DL resources.

Hereinafter, a method for determining a reference DL resource by a UE will be described with reference to FIG. 22. Here, a transmission period of a first repetition PDCCH including the DL preemption indication may be 8 slots. In addition, for convenience of explanation, the first repetition transmission (transmission of repetition PDCCH in slots n to n+3 of FIG. 22) is described as transmission during a first period, and the second repetition transmission (transmission of repetition PDCCH in slots n+8 to n+11 of FIG. 22) is described as transmission during a second period. That is, the first period may correspond to slot n to slot (n+3), and the second period may correspond to slot (n+8) to slot (n+1)1.

Referring to FIG. 22(*a*), when the UE receives a first repetition PDCCH including the DL preemption indication transmitted during a second period, the reference DL resource of the DL preemption indication may include from right before a first symbol of the first repetition PDCCH among the first repetition PDCCHs of the second period (i.e., slot (n+7) right before the first symbol of slot (n+8) in FIG. 22A) to the first symbol of the first repetition PDCCH among the first repetition PDCCHs of the first period (the first symbol of slot n in FIG. 22(*a*)) (slot n to slot (n+7) in FIG. 22(*a*)). In other words, the reference DL resource of the DL preemption indication may include P slots or $P*N^{slot}_{symb}$ symbols right before the first symbol of the first repetition PDCCH among the first repetition PDCCHs of the second period. P is the transmission periodicity of the first repetition PDCCH, and P may be 8. $N^{slot}_{symb}$ denotes the number of symbols constituting the slot. According to FIG. 22(*a*), the reference DL resource corresponds to a resource at a predetermined time interval away from the last slot in which the first repetition PDCCH is transmitted. Accordingly, rapid transmission of the DL preemption indication may not be possible.

Referring to FIG. 22(*b*), when the UE receives a first repetition PDCCH including the DL preemption indication transmitted during a second period, the reference DL resource of the DL preemption indication may include from right before a first symbol of the last repetition PDCCH among the first repetition PDCCHs of the second period (i.e., slot (n+1)0 right before the first symbol of slot (n+1)1 in FIG. 22(*b*)) to the first symbol of the last repetition PDCCH among the first repetition PDCCHs of the first period (the first symbol of slot (n+3) in FIG. 22(*b*)) (slot (n+3) to slot (n+1)0 in FIG. 22B). In other words, the reference DL resource of the DL preemption indication may include P slots or $P*N^{slot}_{symb}$ symbols right before the first symbol of the last repetition PDCCH among the first repetition PDCCHs of the second period. P is the transmission periodicity of the first repetition PDCCH, and P may be 8. $N^{slot}_{symb}$ denotes the number of symbols constituting the slot. According to FIGS. 22(*a*) and 22(*b*), the reference DL resource includes slots or symbols in which the UE receives repetition PDCCHs (i.e., slot n to slot (n+3) in FIG. 22(*a*), and slot (n+3) and slot (n+8) to slot (n+1)0 in FIG. 22(*b*)). When the UE fails to simultaneously receive the PDCCH and the PDSCH through one symbol, the UE may be configured not to include symbols or slots, in which the repetition PDCCH is transmitted, in the reference downlink resource.

Referring to FIG. 22(*c*), when the UE receives a first repetition PDCCH including a DL preemption indication transmitted during a second period, the reference DL resource of the DL preemption indication may include Q slots, $Q*N^{slot}_{symb}$ symbols, or Q symbols right before the first symbol of the first repetition PDCCH among first repetition PDCCHs of a second period. Q may indicate a difference between the transmission period of the repetition PDCCH including the DL preemption indication and slots used for repetition transmission or a value configured by the base station through a higher layer. Referring to FIG. 22(*c*), the transmission period of the repetition PDCCH corresponds to 8 slots and the number of slots for repetitive transmission is 4, and thus Q may have a value of 4 (8-4). $N^{slot}_{symb}$ denotes the number of symbols included in a slot. According to FIG. 22(*c*), a case in which a slot or symbol, through which repetition transmission of a PDCCH is configured, is included in the reference DL resource as shown in FIGS. 22(*a*) and *b*) may be excluded.

Figure 23:
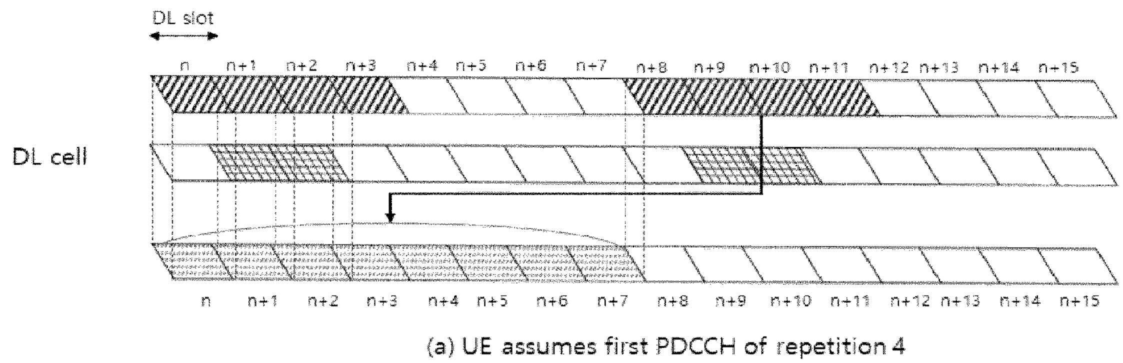
FIG. 23 illustrates a problem occurring when a slot is determined according to a downlink preemption indication according to an embodiment of the present disclosure.
Figure 23:
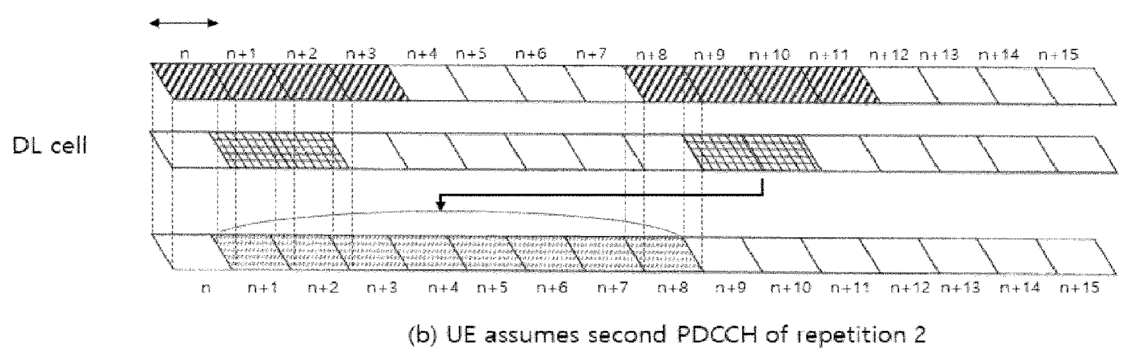

FIG. 23 illustrates a problem occurring when a slot is determined according to a DL preemption indication according to an embodiment of the present disclosure.

Hereinafter, a problem occurring when a UE determines a resource in the time-frequency domain indicated by the DL preemption indication will be described with reference to FIG. 23. For convenience of explanation, it is assumed that a reference DL resource is determined as described with reference to FIG. 22(*a*).

Referring to FIG. 23(*a*), a first repetition PDCCH including DCI of DCI format 2_1 transmitted from a base station to the UE may be configured to be repeatedly transmitted four times. In this case, as described with reference to FIG. 22(*a*), the reference DL resource may include symbols of slots n to n+7. In FIG. 23(*b*), a second repetition PDCCH including DCI of DCI format 2_1 transmitted from the base station to the UE may be configured to be transmitted repeatedly two times. Here, the UE may determine the reference DL resource based on slot (n+9) in which the second repetition reception of the second repetition PDCCH is configured. The number of slots or symbols included in the reference DL resource may be determined based on a transmission period of the second repetition PDCCH. That is, the reference DL resource may include symbols of slots n+1 to n+8 (see FIG. 22(*a*)). Accordingly, a problem may occur in which the reference DL resource is determined differently depending on which repetition PDCCH the DCI successfully received by the UE belongs to.

Figure 24:
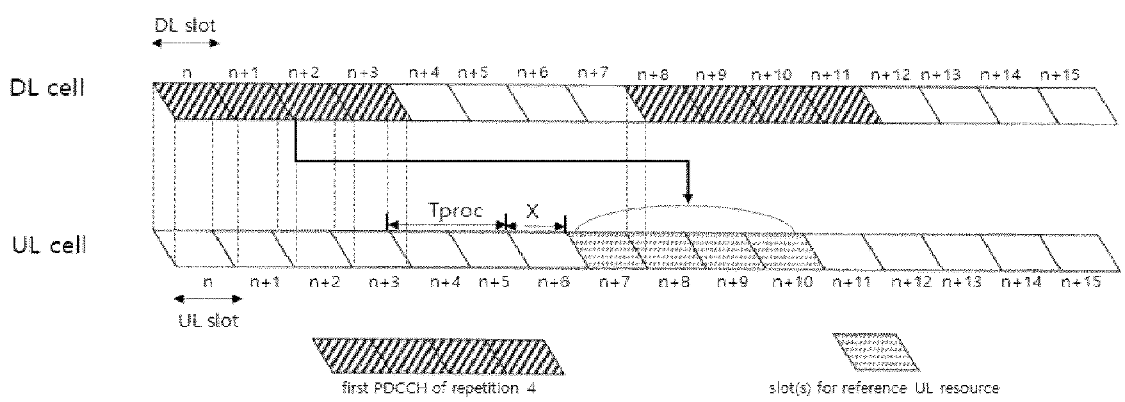
FIG. 24 illustrates a slot determined according to an uplink cancellation indication according to an embodiment of the present disclosure.

FIG. 24 illustrates a slot determined according to an uplink cancellation indication according to an embodiment of the present disclosure.

Referring to FIG. 24, a first repetition PDCCH transmitted by a base station to a UE may include DCI of DCI format 2_4 including an uplink (UL) cancellation indication. The UE may determine a reference uplink (UL) resource in order to determine a resource in the time-frequency domain indicated by the UL cancellation indication. The UL cancellation indication may indicate a resource in the time-frequency domain of some of the reference UL resources.

Referring to FIG. 24, the reference UL resource may be determined based on the last symbol (slot (n+3) in FIG. 24) of the last PDCCH among the first repetition transmissions of the first repetition PDCCH including the UL cancellation indication. Specifically, the reference UL resource may include Y symbols after Tproc+X symbols after the last symbol. Here, Tproc may be a value determined based on a processing time, and X may be a value configured through a higher layer. Y may be a value configured through a higher layer or determined based on the transmission periodicity of the first repetition PDCCH. Referring to FIG. 24, Tproc=2, X=1, and Y=4 and here, the unit of the Tproc, X, and Y values may correspond to a symbol unit.

Figure 25:
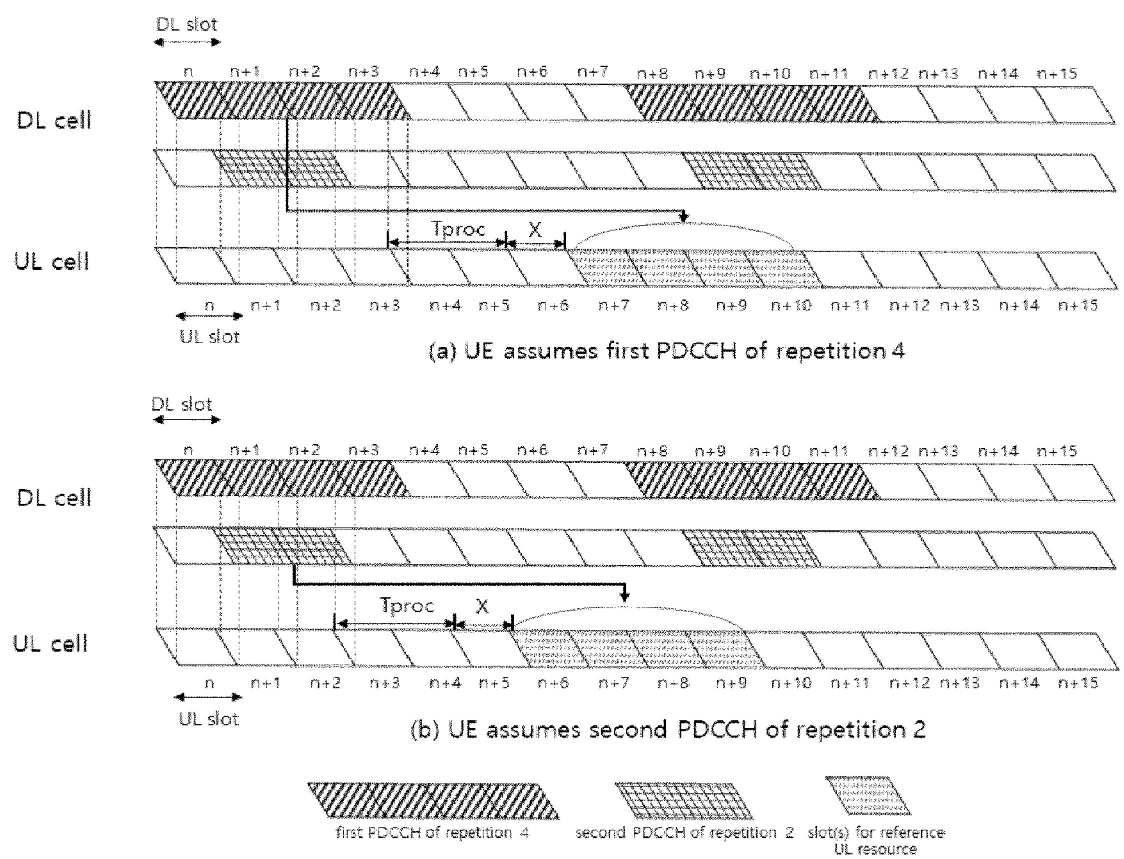
FIG. 25 illustrates a problem occurring when determining a slot according to an uplink cancellation indication.

FIG. 25 illustrates a problem occurring when determining a slot according to an uplink cancellation indication.

FIG. 25 illustrates a problem occurring when a UE interprets resources in a time-frequency domain indicated by the UL cancellation indication.

Referring to FIG. 25(*a*), as described with reference to FIG. 24, reference UL resources may be determined (slot (n+7) to slot (n+1)0). That is, the last symbol of the last PDCCH in which the first repetition transmission of the first repetition PDCCH is configured is a symbol of slot (n+3). Accordingly, Y symbols after the Tproc+X symbol starting from the last symbol of the slot (n+3) may be determined as the reference UL resource. Referring to FIG. 25B, a second repetition PDCCH transmitted by the base station to the UE may include DCI of DCI format 2_4 including a UL cancelation indication. Here, the second repetition PDCCH may be configured to be repeated two times. The UE may determine the reference UL resource based on the last symbol of the last repetition PDCCH on the first repetition interval region configured to transmit the second repetition PDCCH. That is, the last symbol of the last repetition PDCCH on the first repetition interval region of the second repetition PDCCH is a symbol of slot (n+2). Accordingly, the UE may determine the Y symbols after the Tproc+X symbol starting from the last symbol of the slot (n+2) as the reference UL resource. Accordingly, a problem may occur in which a reference UL resource is determined differently depending on which repetition PDCCH the DCI successfully received by the UE belongs to.

Hereinafter, a method for resolving the above-described PDCCH ambiguity will be described. That is, a description will be given of a method of determining which repetition PDCCH from among a plurality of different repetition PDCCHs the DCI received by the UE belongs to. In addition, the UE may determine which repetition PDCCH the received DCI is included in, and transmit an HARQ-ACK therefor to the base station. That is, the UE may transmit the HARQ-ACK for the PDCCH, determined according to a method to be described later, to the base station. Here, the HARQ-ACK transmitted by the UE to the base station may be the first type HARQ-ACK and/or second type HARQ-ACK described above.

i) First Method

In order to distinguish different repetition PDCCHs, a base station may add information required for distinguishing different repetition PDCCHs in DCI and transmit the same. In the case of successfully receiving the repetition PDCCH, the UE may determine which repetition PDCCH has been successfully received based on the added information included in the DCI. In this case, information for distinguishing between different repetition PDCCHs may include at least one of the following pieces of information.

The DCI may include information on the number of repeated transmissions of the repetition PDCCH as the first information. That is, the DCI may include a value for the number of times the repetition PDCCH is repeatedly transmitted.

For example, when the number of repeated transmissions of the repetition PDCCH, which is transmitted by the base station to the UE, is 4, the DCI may include information (value) indicating the number of repeated transmissions (4 times) or information (value) capable of inferring the number of repeated transmissions.

As another example, when the first repetition PDCCH received by the UE is configured to be transmitted repeatedly four times and the second repetition PDCCH is configured to be transmitted repeatedly 2 times, a case may occur in which the first repetition PDCCH and the second repetition PDCCH fully overlap in a resource on the time-frequency domain of a predetermined one slot. Here, the DCI may include an indicator for distinguishing between the first repetition PDCCH and the second repetition PDCCH. When there is L types of the repetition PDCCH, the DCI may indicate the type of the repetition PDCCH using ceil (log 2(L)) bits. ceil(x) is a function representing the smallest integer not less than x. Specifically, when the repetition PDCCH corresponds to two types of repetition PDCCHS, that is, the first repetition PDCCH and the second repetition PDCCH, the information for distinguishing the repetition PDCCH included in the DCI may correspond to ceil(log 2(2)) bit (i.e., 1 bit) size indicator. The case in which a value of the 1-bit indicator is '0' may indicate the second repetition PDCCH transmitted repeatedly two times, and the case in which a value of the 1-bit indicator is '1' may indicate the first repetition PDCCH transmitted repeatedly four times. In general, the UE may obtain the number of repetition PDCCHs which fully overlap in resources on the time-frequency domain in a predetermined one slot. If the number of overlapping repetition PDCCHs is X, required information may be represented by the size of ceil(log 2(X)) bits. Each code point of the ceil(log 2(X)) bit may indicate the number of repeated transmissions of the overlapping repetition PDCCH. For example, the lowest value of the code point may indicate the number of repeated transmissions of a PDCCH having the lowest number of repeated transmissions among the repetition PDCCHs configured for the UE. Here, a value of the code point may indicate the number of repeated transmissions of the repetition PDCCH in an ascending order.

Second information included in the DCI may be information (value) indicating an ID of a CORESET corresponding to a repetition PDCCH. For example, when the first repetition PDCCH is transmitted in the first CORESET and the second repetition PDCCH is transmitted in the second CORESET, a case may occur in which the first repetition PDCCH and the second repetition PDCCH are fully overlap in the time-frequency resource domain in a predetermined one slot. Here, the DCI may include an indicator for distinguishing the first repetition PDCCH from the second repetition PDCCH. Specifically, when the repetition PDCCH is two types of PDCCHs, that is, the first repetition PDCCH and the second repetition PDCCH, the DCI may include an indicator having a size of 1 bit to distinguish between the first repetition PDCCH and the second repetition PDCCH. If a value of the 1-bit size indicator is '0', it may indicate the first repetition PDCCH transmitted in the first CORESET, and if a value of the 1-bit size indicator is '1', it may indicate the second repetition PDCCH transmitted in the second CORESET. In general, the UE may obtain the number of CORESETs corresponding to the repetition PDCCHs for which the time-frequency domain resources fully overlap in a predetermined one slot. If the number of overlapping repetition PDCCHs is X, information included in DCI may have a size of ceil(log 2(X)) bits. Each code point indicated by the ceil(log 2(X)) bit may indicate a CORESET ID corresponding to the overlapping repetition PDCCH. For example, the lowest value of the code point may indicate the lowest ID among CORESET IDs corresponding to overlapping repetition PDCCHs. The value of the code point may indicate the CORESET ID in an ascending order. The CORESET ID is a value configured through a higher layer, and the base station may transmit CORESET information including the CORESET ID to the UE.

Third information included in DCI may be information (value) indicating a search space ID corresponding to the repetition PDCCH. For example, when the first repetition PDCCH is transmitted in a first search space and the second repetition PDCCH is transmitted in a second search space, a case may occur in which the first repetition PDCCH and the second repetition PDCCH are fully overlap in the time-frequency resource of a predetermined one slot. Here, the DCI may include an indicator for distinguishing between the first repetition PDCCH and the second repetition PDCCH. When the repetition PDCCH is configured by two types of PDCCHs, that is, the first repetition PDCCH and the second repetition PDCCH, the DCI may include an indicator having a size of 1 bit to distinguish between the first repetition PDCCH and the second repetition PDCCH. Specifically, if a value indicated by the 1-bit indicator is '0', it may indicate the first repetition PDCCH corresponding to the first search space, and if a value of the indicator is '1', it may indicate the second repetition PDCCH corresponding to the second search space. In general, the UE may obtain the number of search spaces corresponding to the repetition PDCCHs for which time-frequency domain resources fully overlap in a predetermined one slot. If the number of search spaces corresponding to overlapping repetition PDCCHs is X, information included in DCI may have a size of ceil(log 2(X)) bits. Each code point indicated by the ceil (log 2(X)) bit may indicate a search space ID corresponding to the overlapping repetition PDCCH. For example, the lowest value of the code point may indicate the lowest ID among search space IDs corresponding to overlapping repetition PDCCHs. The value of the code point may represent the search space ID in an ascending order. The search space ID is a value configured through a higher layer, and the base station may transmit search space information including the search space ID to the UE.

Fourth information included in DCI may be information (value) indicating a repetition PDCCH ID corresponding to a repetition PDCCH. For example, when the first repetition PDCCH has a first repetition PDCCH ID and the second repetition PDCCH has a second repetition PDCCH ID, a case may occur in which the first repetition PDCCH and the second repetition PDCCH are fully overlap in the time-frequency resource of a predetermined one slot. Here, the DCI may include an indicator for distinguishing between the first repetition PDCCH and the second repetition PDCCH. When the repetition PDCCH is configured by two types of PDCCHs, that is, the first repetition PDCCH and the second repetition PDCCH, the DCI may include an indicator having a size of 1 bit to distinguish between the first repetition PDCCH and the second repetition PDCCH. Specifically, if a value indicated by the 1-bit indicator is '0', it may indicate the first repetition PDCCH corresponding to the first search space, and if a value of the indicator is '1', it may indicate the second repetition PDCCH corresponding to the second search space. In general, the UE may obtain the number of repetition PDCCH IDs corresponding to the repetition PDCCHs for which time-frequency domain resources fully overlap in a predetermined one slot. If the number of repetition PDCCH IDs corresponding to overlapping repetition PDCCHs is X, information included in DCI may have a size of ceil(log 2(X)) bits. Each code point indicated by the ceil(log 2(X)) bit may indicate a repetition PDCCH ID corresponding to the overlapping repetition PDCCH. The lowest value of the code point may indicate the repetition PDCCH ID among IDs of overlapping repetition PDCCHs. The value of the code point may represent the repetition PDCCH ID in an ascending order. The repetition PDCCH ID may be a value configured through a higher layer. For example, based on the search space information transmitted from the base station to the UE, an aggregation level and the number of repetition PDCCH candidates monitored by the UE per CCE aggregation level may be configured. In addition, a unique repetition PDCCH ID may be configured for each repetition PDCCH candidate monitored by the UE. The repetition PDCCH ID may be a value obtained by the UE based on CORESET information and/or search space information received from the base station. For example, based on the search space information, the CCE aggregation level and the number of repetition PDCCH candidates monitored by the UE per CCE aggregation level are configured, and the low CCE aggregation level may be mapped to the lowest repetition PDCCH ID, and the CCE aggregation level and repetition PDCCH IDs may be mapped to each other in a sequential manner. If the base station configures the UE to monitor a plurality of repetition PDCCH candidates of the same CCE aggregation level, the repetition PDCCH ID may be determined based on at least one value of the CCE index, the REG index, or the PRB index to which the repetition PDCCH is mapped. The repetition PDCCH ID may correspond to at least one of the CCE index, the REG index, and the PRB index to which the PDCCH is mapped, and may be mapped in an ascending order. The repetition PDCCH ID may correspond to the search space ID and may be mapped in an ascending order. In addition, the repetition PDCCH ID may correspond to the CORESET ID and may be mapped in an ascending order.

Fifth information included in DCI may be information (value) indicating an index of a slot or symbol from which transmission of the repetition PDCCH starts. For example, the first repetition PDCCH may be transmitted from slot n, and the second repetition PDCCH may be transmitted from slot (n+1). Since transmission of the first repetition PDCCH and the second repetition PDCCH starts in different slots, the fifth information may be an index of a slot in which transmission of the first repetition PDCCH and the second repetition PDCCH start. The first repetition PDCCH may be transmitted from symbol m of a specific slot, and the second repetition PDCCH may be transmitted from symbol m+1 of a specific slot. Since transmission of the first repetition PDCCH and the second repetition PDCCH starts from different symbols, the fifth information may be an index of a symbol from which transmission of the first repetition PDCCH and the second repetition PDCCH starts.

Sixth information included in DCI may be information (value) indicating an index of a slot or symbol and here, transmission of the repetition PDCCH ends. For example, transmission of the first repetition PDCCH may start from slot n and end in slot (n+3), and transmission of the second repetition PDCCH may start from slot (n+1) and end at slot (n+2). Since the transmission of the first repetition PDCCH and the second repetition PDCCH ends in different slots, the sixth information may be an index of a slot in which the transmission of the first repetition PDCCH and the second repetition PDCCH ends. Transmission of the first repetition PDCCH may start from symbol m of a specific slot and transmission may end at symbol m+3 of a specific slot, and transmission of the second repetition PDCCH starts from symbol m+1 of a specific slot, and the transmission may end at symbol m+2 of a specific slot. Since transmission of the first repetition PDCCH and the second repetition PDCCH is ended in different symbols, the sixth information may be an index of a symbol at which transmission of the first repetition PDCCH and the second repetition PDCCH is ended.

Since the size of bits representing the fifth and sixth information may be limited, the index of a slot or symbol indicated by the fifth and sixth information may be information (value) obtained after performing a modular operation. For example, if the limited bit size is N bits, the remainder value obtained by dividing the index of the slot by 2^N (the index mod 2^N of the slot) may be included in the DCI. The method for determining N is as follows. In a situation in which the UE should distinguish different repetition PDCCHs, the UE may acquire the number of slots in which transmission of different repetition PDCCHs are started. For example, when transmission of the first repetition PDCCH starts from slot n, transmission of the second repetition PDCCH starts from slot (n+1), and the first repetition PDCCH and the second repetition PDCCH are fully overlap in a resource on the time-frequency domain of a predetermined one slot, the UE may be configured to determine that the number of slots (X) in which the repetition PDCCH starts is two. In this case, N may be obtained by the calculation of N=ceil (log 2(X)).

In a plurality of different repetition PDCCHs, overlapping slots may occur according to a monitoring periodicity and an offset. In this case, if a separate field is added to DCI in order to solve a problem caused by overlapping slots, a problem of increasing overhead may occur. As described above, the repetition PDCCH is used when the radio channel condition is bad, such as a cell-edge UE, and thus it is not efficient to increase the overhead of DCI. Therefore, a method for solving this problem will be described below.

ii) Second Method

The second method relates to a method of obtaining information for distinguishing between overlapping repetition PDCCHs by reinterpreting one or a plurality of fields included in the existing DCI. When the UE needs to distinguish which repetition PDCCHs successfully received from among different repetition PDCCHs, the UE may distinguish between the repetition PDCCHs by reinterpreting one or a plurality of fields of DCI included in the successfully received PDCCHs.

The field used for reinterpretation may be a redundancy version (RV) field. That is, the UE may acquire information required to distinguish one repetition PDCCH from among the different repetition PDCCHs from the RV field of the DCI. Specifically, the UE may distinguish between different repetition PDCCHs by assuming that a value of the RV field is a specific value (e.g., 0).

A field used for reinterpretation may be a field for transmitting a TPC command. That is, the UE may acquire information required to distinguish one repetition PDCCH from among the different repetition PDCCHs from the field for transmitting the TPC command. Specifically, the UE may distinguish between different repetition PDCCHs by assuming that a value of the TPC command field is a specific value (e.g., 0 dB).

A field used for reinterpretation may be a downlink assignment index (DAI) field. That is, the UE may acquire information required to distinguish one repetition PDCCH from among different repetition PDCCHs from the DAI field. Specifically, the UE may distinguish between different repetition PDCCHs by assuming a specific DAI value as a specific value. For example, since the UE is not able to know the DAI value, the DAI value may be assumed to be the lowest value or the highest value. In addition, since the UE is not able to know the DAI value, the UE may not perform HARQ-ACK multiplexing according to the DAI.

It is obvious that fields other than the above-described fields may be used to distinguish between different repetition PDCCHs. In this case, a field for distinguishing between different repetition PDCCHs may be configured through a higher layer. In addition, only some bits of the field may be used for reinterpretation and the remaining bits may be used for existing purposes. In this case, some bits may correspond to the most significant bits (MSB).

iii) Third Method

The third method corresponds to a method for distinguishing between different repletion PDCCHs by CRC, instead of adding a separate field to the DCI or reinterpreting the existing DCI field like the first method and the second method described above. That is, information for distinguishing between different repetition PDCCHs may be delivered to the UE through DCI scrambled by different CRC values. Specifically, the DCI may be scrambled by using a specific RNTI value as the CRC according to the purpose. The UE may determine whether DCI reception is successful based on the RNTI value according to the CRC value of DCI. Accordingly, the base station may generate a separate RNTI (hereinafter, referred to as a first RNTI) based on the RNTI value and information for distinguishing between different repetition PDCCHs, and then may use the first RNTI as the CRC of the DCI. The UE may compare the CRC value of received DCI with the first RNTI values to determine whether DCI reception is successful, and may obtain information for distinguishing between different repetition PDCCHs. For example, if information for distinguishing between different repetition PDCCHs has a size of X-bit, the base station may generate a first RNTI value by performing an exclusive OR (XOR) operation on X bits of the RNTI. Here, the X bits of the RNTI may be the most significant bits (MSB) or least significant bits (LSB) of the RNTI. In addition, the UE may calculate usable first RNTI values. If the information for distinguishing between different repetition PDCCHs has a size of X-bit, the number of combinations usable as the first RNTI corresponds to 0 to 2^X−1 and may have 2^X RNTI values. The UE may compare the CRC of the received DCI with 2^X first RNTI values to determine the first RNTI value matching thereto. If there is a matching first RNTI value, the UE may be configured to identify that information corresponding to the first RNTI value, that is, information for distinguishing between different repetition PDCCHs is included in the DCI.

iv) Fourth Method

The fourth method corresponds to a method in which information for distinguishing between different repetition PDCCHs is configured as a specific value in advance in the UE. Specifically, the specific value may be the lowest value or the highest value configured for the UE among values that can be indicated by information for distinguishing between different repetition PDCCHs.

Information for distinguishing between different repetition PDCCHs may be a value corresponding to the number of times the repetition PDCCH is repeatedly transmitted. Accordingly, when the specific value configured for the UE is the lowest value, the UE may assume that a repetition PDCCH having the lowest number of repeated transmissions among the number of repeated transmissions of the different repetition PDCCHs is received. When the specific value configured for the UE is the highest value, the UE may assume that a repetition PDCCH having the highest number of repeated transmissions among the number of repeated transmissions of the different repetition PDCCHs is received.

Information for distinguishing between different repetition PDCCHs may be a CORESET ID corresponding to a repetition PDCCH. Accordingly, when the specific value configured for the UE is the lowest value, the UE may assume that the repetition PDCCH is received on the CORESET having the lowest ID among CORESETs corresponding to different repetition PDCCHs. When the specific value configured for the UE is the highest value, the UE may assume that the repetition PDCCH is received on the CORESET having the highest ID among CORESETs corresponding to different repetition PDCCHs.

Information for distinguishing between different repetition PDCCHs may be a search space ID corresponding to a repetition PDCCH. Accordingly, when the specific value configured for the UE is the lowest value, the UE may assume that the repetition PDCCH is received in the search space of the lowest ID among search space IDs corresponding to different repetition PDCCHs. When the specific value configured for the UE is the highest value, the UE may assume that the repetition PDCCH is received in the search space of the highest ID among search space IDs corresponding to different repetition PDCCHs.

Information for distinguishing between different repetition PDCCHs may be a repetition PDCCH ID corresponding to a repetition PDCCH. Accordingly, when the specific value configured for the UE is the lowest value, the UE may assume that a repetition PDCCH having the lowest ID among the repetition PDCCH IDs corresponding to different repetition PDCCHs is received. If the specific value configured for the UE is the highest value, the UE may assume that a repetition PDCCH having the highest ID among the repetition PDCCH IDs corresponding to different repetition PDCCHs is received.

v) Fifth Method

The fifth method is a method in which a UE distinguishes between different repetition PDCCHs using a search space type. Specifically, there may be a case in which a first repetition PDCCH corresponds to the first type of search space, a second repetition PDCCH corresponds to the second type of search space, and the first type and the second type are different from each other. Here, the UE may be configured to determine that the repetition PDCCH has been received in one search space among the first search type space and the second search space. The UE may determine one search space as follows. If the first search space type is a cell common search space and the second search space type is a specific-UE search space, the UE may be configured to determine that the repetition PDCCH has been received in the first search space of the cell common search space type.

The repetition PDCCH transmitted on the cell common search space may include system information and paging information, and may schedule PDSCH, PUCCH, and PUSCH. In addition, the repetition PDCCH transmitted on the cell common search space may include a dynamic SFI, a DL preemption indication, and a UL cancellation indication that may be transmitted to a specific UE or a specific UE group. Accordingly, a repetition PDCCH transmitted on the cell common search space may have a priority over a repetition PDCCH transmitted on a specific-UE search space. In addition, since the repetition PDCCH transmitted in the cell common search space can be received by a plurality of UEs in a cell, when a plurality of UEs interpret DCI by assuming the received repetition PDCCH as a UE-specific search space, each of the plurality of UEs can perform different actions. Accordingly, repetition PDCCH transmitted on a common cell search space may be given priority in order to prevent different operations of a plurality of respective terminals.

The above-described first to fifth methods illustrate a method for determining which repetition PDCCH the DCI received by the UE belongs to among different repetition PDCCHs. Hereinafter, a method of resolving PDCCH ambiguity, without determining whether which repetition PDCCH the DCI received by the UE is included in and without determining whether the DCI correctly received by the UE has been transmitted through the repetition PDCCH, will be described. Specifically, a method for explicitly or implicitly determining a time point (i.e., a reference slot) for applying the values of K0, K1, and K2 described above with reference to FIGS. 18 to 20 will be described.

vi) Sixth Method

The sixth method is a method in which a base station indicates an index of a slot or symbol to which the values of K0, K1, and K2 are applied through DCI. For example, if the index of a slot or symbol to which the values of K0, K1, and K2 are applied is 'n', the base station may include information about 'n' in the DCI and transmit the same to the UE. If the information on the index of the slot or symbol to which the values of K0, K1, and K2 are applied has a size of N bits, the information on the 'n' may be included in the DCI as a value obtained by performing a modular operation. Specifically, the information on 'n' is a remainder value obtained by dividing the index n by 2^N (n mod 2^N), and may be included in DCI.

A method in which UE determines an index of a reference slot or symbol to which the values of K0, K1, and K2 are applied based on information included in DCI is as follows. The repetition PDCCH successfully received by the UE may be configured to be transmitted in slot a, slot a+1, . . . , slot (a+b−1). In this case, 'a' is a non-negative integer, and 'b' is an integer greater than 0. The UE may assume that the PDSCH, PUCCH, and PUSCH cannot be scheduled before a time point at which the last part of the repetition PDCCH is received. That is, the UE may assume that the PDSCH, PUCCH, and PUSCH may not be scheduled before slot (a+b−1), which is the last slot among slots configured to transmit the repetition PDCCH. Therefore, the UE may assume that a previous slot of slot (a+b−1) is not available as a time point to which the values of K0, K1, and K2 are applied (reference slot).

DCI transmitted by the base station to the UE may include a specific value, and the UE may determine time points available as the reference slot according to the specific value. For example, if the specific value is 'c', the UE may determine slot n+0*2^N+c, slot (n+1)*2^N+c, slot (n+2)*2^N+c, . . . , slot n+i*2^N+c, as candidates for reference slots to which the values of K0, K1, and K2 can be applied. Here, 'c' may be one of 0, 1, . . . , 2N−1. In this case, N may be a bit size of information indicating a specific value c. A method of selecting one of the candidates of the plurality of reference slots is as follows. As described above, since a slot before slot (a+b−1) cannot be the reference slot, the UE may determine any one of the slots after slot (a+b−1) as the reference slot. For example, among the candidates of the reference slots, the earliest slot among subsequent slots including the slot (a+b−1) may be determined as the reference slot.

Hereinafter, a method of determining a reference slot will be described in detail with reference to FIG. 26.

Figure 26:
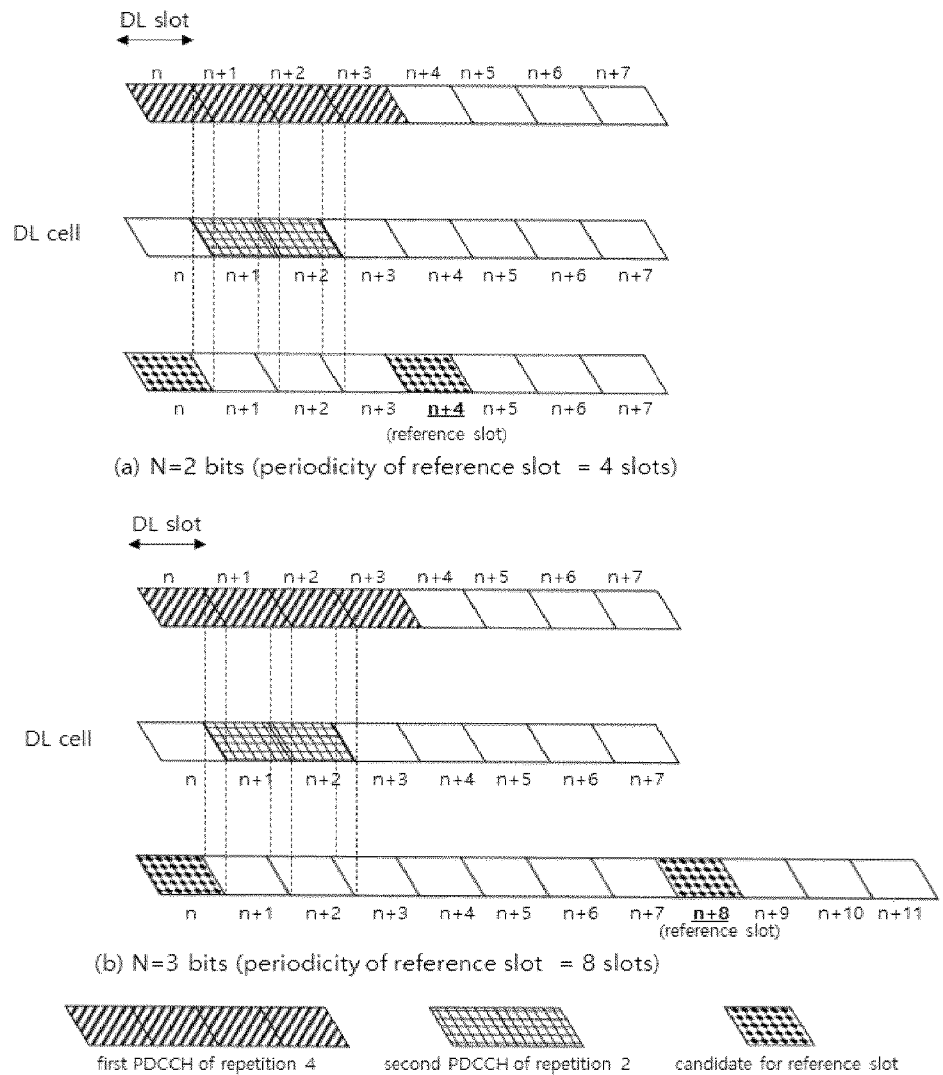
FIG. 26 illustrates a method of determining a reference slot according to an embodiment of the present disclosure.

FIG. 26 illustrates a method of determining a reference slot according to an embodiment of the present disclosure.

Referring to FIG. 26A, N is 2 bits, and a UE receives an indication of a specific value as 'c' through DCI and here, a value of 'c' may be 0. Accordingly, the UE may determine slot candidates available as the reference slot as slot n, slot (n+4), slot (n+8), . . . and the like. In this case, since the UE has received DCI included in a repetition PDCCH transmitted in slot (n+1) and slot (n+2), the UE may determine, as the reference slot, slot (n+4) which is the earliest slot among subsequent slots including slot (n+1) and slot (n+2) among the slot candidates. In addition, the UE may be configured to apply the values of K0, K1, and K2 based on the determined reference slot.

Referring to FIG. 26B, N is 3 bits, and a UE receives an indication of a specific value as 'c' through DCI, and a value of 'c' may be 0. Accordingly, the UE may determine slot candidates available as the reference slot as slot n, slot (n+8), slot (n+1)6, . . . and the like. In this case, since the UE has received DCI included in a repetition PDCCH transmitted in slot (n+1) and slot (n+2), the UE may determine, as the reference slot, slot (n+8) which is the earliest slot among subsequent slots including slot (n+1) and slot (n+2) among the slot candidates. In addition, the UE may be configured to apply the values of K0, K1, and K2 based on the determined reference slot.

The UE has determined the reference slot candidates according to a specific value included in DCI. However, since information on a specific value is included in the DCI, there may be a problem in that the overhead is large. In order to solve this problem, information on a separate specific value may not be included in the DCI. For example, the UE may determine slot 0*M+c, slot 1*M+c, slot 2*M+c, . . . , slot i*M+c, . . . and the like as reference slot candidates. In this case, M and c, which are values configured through a higher layer, may be non-negative integer values, and in particular, c may be 0.

vii) Seventh Method

When a UE needs to determine whether a repetition PDCCH successfully received is a first repetition PDCCH or a second repetition PDCCH, the UE may determine the last slot of a repetition PDCCH ending later in time among the first repetition PDCCH and the second repetition PDCCH as a reference slot to which the values of K0, K1, and K2 can be applied. The UE may determine, as a reference slot, a slot configured to transmit the last PDCCH among repetition PDCCHs overlapping in the time-frequency resource domain. In this case, since the repetition PDCCH is repeatedly transmitted according to a transmission period, the last PDCCH may imply the last PDCCH among the repetition PDCCHs within one period. Hereinafter, this will be described in detail with reference to FIG. 27.

Figure 27:
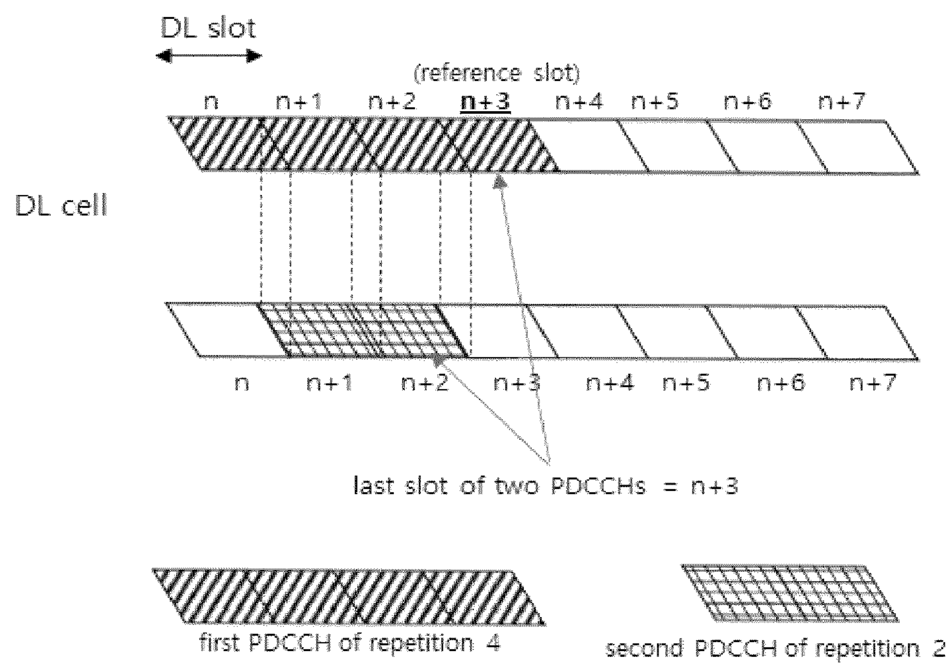
FIG. 27 illustrates a method of determining a reference slot according to an embodiment of the present disclosure.

FIG. 27 illustrates a method of determining a reference slot according to an embodiment of the present disclosure.

Referring to FIG. 27, the UE may determine a last slot in which a first repetition PDCCH is transmitted and a last slot in which a second repetition PDCCH is transmitted, through CORESET information and search space information configured by a base station. The first repetition PDCCH may be configured to be transmitted in slot n, slot (n+1), slot (n+2), and slot (n+3) within one period. The second repetition PDCCH may be configured to be transmitted in slot (n+1) and slot (n+2) within one period. The UE may determine, as the reference slot, a slot ending later in time, among the slot in which the first repetition PDCCH is transmitted and the slot in which the second repetition PDCCH is transmitted. For example, the first repetition PDCCH is last transmitted in slot (n+3) within one period, and the second repetition PDCCH is last transmitted in slot (n+2) within one period. Therefore, the UE may determine a reference slot based on slot (n+3).

The above-described sixth method and seventh method may be applied to the PDCCH ambiguity described with reference to FIGS. 20 to 25. For example, when determining a slot to which dynamic SFI is applied or when determining a reference uplink resource, the UE needs position information of a slot or symbol from which the last PDCCH of a repetition PDCCH including a successfully received DCI is transmitted. Here, the position of the slot or symbol from which the last PDCCH is transmitted may be determined using a method similar to the above-described sixth method or seventh method.

Specifically, according to the sixth method, the UE may determine a candidate slot or symbol set having a predetermined period. Such a candidate slot or symbol set may be indicated through DCI or may be determined through a higher layer. The UE may determine one slot or symbol from among candidate slots or symbol sets having a predetermined period based on the last slot or symbol from which the repetition PDCCH is transmitted. For example, the UE may select the earliest candidate slot or symbol from among subsequent slots or symbols including the last slot or symbol from which the repetition PDCCH is transmitted from among the candidate slots or symbol sets. For example, the UE may select the earliest slot or symbol among subsequent slots or symbols including the last slot or symbol from which the repetition PDCCH is transmitted from among the candidate slots or symbol sets. The UE may determine a slot or reference uplink resource, to which dynamic SFI is applied, from the selected slot or symbol.

According to the seventh method, the UE may acquire the index of the last slot or symbol from which the first repetition PDCCH is transmitted and the index of the last slot or symbol from which the second repetition PDCCH is transmitted. A slot to which dynamic SFI is applied or a reference uplink resource may be determined based on a temporally later slot/symbol among the last slot/symbol from which the first repetition PDCCH is transmitted and the last slot/symbol from which the second repetition PDCCH is transmitted. As another example, a slot to which dynamic SFI is applied or a reference uplink resource may be determined based on the earliest slot/symbol among the last slot/symbol from which the first repetition PDCCH is transmitted and the last slot/symbol from which the second repetition PDCCH is transmitted.

In order to determine the reference DL resource, the UE needs position information of a slot or symbol from which a first PDCCH of a repetition PDCCH including the successfully received DCI is transmitted. Here, the position of the slot or symbol from which the first PDCCH is transmitted may be determined using a method similar to the above-described sixth method or seventh method.

Specifically, similarly to the sixth method, the UE may determine a candidate slot or symbol set having a predetermined period. The candidate slot and symbol set may be indicated through DCI or determined through a higher layer. The UE may select one slot or set of candidate slots or symbol sets based on the first slot or symbol from which the repetition PDCCH is transmitted. For example, the UE may select the last slot or symbol from among previous slots or symbols, including the first slot or symbol from which the repetition PDCCH is transmitted among the candidate slots or symbol sets. In addition, the UE may select a slot or symbol before the first slot or symbol from which the repetition PDCCH is transmitted from among the candidate slots or symbol sets. The UE may determine the reference DL resource based on the selected slot or symbol.

Similar to the seventh method, the UE may acquire the index of a first slot or symbol from which a first repetition PDCCH is transmitted and the index of a first slot or symbol from which a second repetition PDCCH is transmitted. Here, the reference DL resource may be determined based on the earliest slot/symbol among the first slot/symbol from which the first repetition PDCCH is transmitted and the first slot/symbol from which the second repetition PDCCH is transmitted. As another example, the reference DL resource may be determined based on the last slot/symbol among the first slot/symbol from which the first repetition PDCCH is transmitted and the first slot/symbol from which the second repetition PDCCH is transmitted.

viii) Eighth Method

The eighth method is a method of transmitting information on repeated transmission of a repetition PDCCH through a specific PDCCH for configuring a repetition PDCCH.

When the UE is configured to receive the repetition PDCCH from the base station, the UE may be configured to monitor and receive a specific PDCCH to explicitly receive information on the repeated transmission of the repetition PDCCH. Here, the information on the repeated transmission of the PDCCH may include the number of the first slot (or symbol) in which transmission of a repetition PDCCH starts and the number of the slots (or symbols) for repetition transmission.

Information on repetition transmission of a PDCCH may be explicitly included in DCI included in a specific PDCCH. In this case, a specific PDCCH may be expressed as an activation PDCCH, and for convenience of explanation, in this specification, it is described as a first activation PDCCH.

Information on repetition transmission of a PDCCH may be explicitly included in DCI included in the first PDCCH in which the repetition transmission of a PDCCH starts. Here, the first PDCCH may be expressed as an activation PDCCH, and for convenience of explanation, in the present specification, it is described as a second activation PDCCH.

Information on repetition transmission of a PDCCH may be explicitly included in the DCI included in the first PDCCH from which the repetition transmission of a PDCCH starts and a specific number of repetition PDCCHs. Here, the first PDCCH and the specific number of repetition PDCCHs may be expressed as active repetition PDCCHs. The first PDCCH and the specific number of repetition PDCCHs may be consecutive repeating PDCCHs.

The UE may acquire information on the repeated transmission of the aforementioned repetition PDCCH by reinterpreting the existing fields constituting DCI. In this case, the DCI may schedule PDSCH, PUCCH, and PUSCH. The existing field may include a TDRA field. For example, an SLIV value indicated by the TDRA field may be reinterpreted. Through reinterpretation of the SLIV value, the UE may acquire resource information on the repetition PDCCH repeatedly transmitted after the first activation PDCCH, the second activation PDCCH, and the active repetition PDCCH.

Specifically, the TDRA field of the DCI included in the repetition PDCCH repeatedly transmitted after the first activation PDCCH, the second activation PDCCH, and the active repetition PDCCH may include an SLIV value for scheduling the PDSCH, PUCCH, and PUSCH. That is, the UE may acquire resource information for the repetition PDCCH and resource information for the PDSCH, PUCCH, and PUSCH based on the TDRA field of the DCI included in the repetition PDCCH repeatedly transmitted after the first activation PDCCH, the second activation PDCCH, and the active repetition PDCCH. The TDRA field described in this specification is shown in Table 4.

TABLE 4

| | K0/K1/K2 | SLIV |
|---|---|---|
| Activation PDCCH | Valid K0/K1/K2 for PDSCH/PUCCH/PUSCH | SLIV for repetition PDCCH (slot/symbol unit) |
| Repetition PDCCH | Invalid | Valid SLIV for PDSCH/PUCCH/PUSCH |

Figure 28:
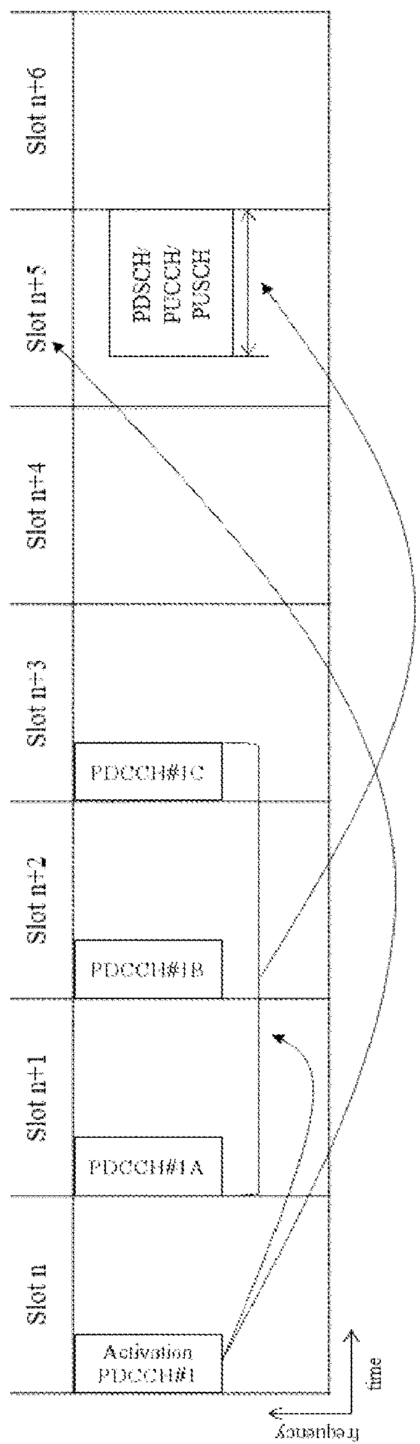
FIG. 28 illustrates reception of ab activation PDCCH and a repetition PDCCH according to an embodiment of the present disclosure.

FIG. 28 illustrates reception of an activation PDCCH and a repetition PDCCH according to an embodiment of the present disclosure.

Referring to FIG. 28, when a UE receives an activation PDCCH #1 in slot n, the UE may expect to transmit PDSCH, PUCCH, and PUSCH in slot (n+5). In addition, the UE may expect repeated transmission of a repetition PDCCH during three slots starting from slot (n+1). The UE having received PDCCH #1A in slot (n+1), PDCCH #1B in slot (n+2), and PDCCH #1C in slot (n+3) may acquire SLIV values for PDSCH, PUCCH, and PUSCH expected to be transmitted in slot (n+5).

When search spaces for different types of UEs fully overlap in the time-frequency resource domain, the UE may perform blind decoding to receive a PDCCH on a search space configured for the UE by receiving information on repeated transmission of the repetition PDCCH.

The base station may transmit information about a CORESET and information about a search space to the UE. Hereinafter, information on CORESET will be described. In the present specification, resources constituting CORESET may have the same meaning as resources included in CORESET.

First information on CORESET may be an index of a PRB or PRB sets constituting a CORESET in which the PDCCH is transmitted. The PRB set may be 6 consecutive PRBs. The index of the PRB or PRB sets may be configured in the form of a bitmap. For example, if the bit value is 1, the PRB or PRB set may correspond to a CORESET for receiving the PDCCH. If the bit value is 0, the PRB or PRB set may not correspond to a CORESET for receiving the PDCCH. Second information on CORESET may be the number of symbols from which the PDCCH is transmitted. Here, the number of symbols may be 1, 2, or 3, and the symbols may be consecutive symbols. The UE may determine a resource through which the PDCCH is transmitted by receiving the information on CORESET from the base station.

Specifically, the first information on CORESET may configure the indexes of PRBs as PRB #(6*n), PRB #(6*n+1), PRB #(6*n+2), and PRB #(6*n+3), PRB #(6*n+4), and PRB #(6*n+5) and here, n may be an integer. Specifically, the base station may configure the indexes of the P PRBs as PRB #0, PRB #1, . . . , PRB #(P−1) and here, P may have a value of a multiple of 6. Here, the PRBs may be continuous or not in the frequency domain. The second information on CORESET may correspond to the number (S) of symbols through which the PDCCH is transmitted and here, S may be one of values of 1, 2, and 3. That is, the UE may receive a resource for transmission of PDCCHs based on the first information and the second information, configured from the base station.

Resources corresponding to P PRBs and S symbols constituting CORESET may be configured as a resource element group (REG). One REG may include one PRB and one symbol. That is, P PRBs and S symbols may be configured as P*S REGs. Two, three, or six adjacent REGs may be bundled to form one REG bundle. A method of bundling 2, 3, or 6 REGs may be determined according to the length (number of symbols) of CORESET and a mapping method (interleaved mapping/non-interleaved mapping).

When a non-interleaved mapping method is used and the length of CORESET corresponds to 1 symbol, one REG bundle may be generated by bundling six consecutive REGs in the frequency domain. When a non-interleaved mapping method is used and the length of CORESET corresponds to 2 symbols, one REG bundle may be generated by bundling 3 REGs in each symbol, that is, bundling a total of 6 REGs (3 REGs per symbol*2 symbols). For convenience, when each 1-symbol of the 2 symbols is called an A symbol and a B symbol, three REGs in the A symbol may be consecutive in the frequency domain, and three REGs in the B symbol may be consecutive in the frequency domain. In addition, three REGs in the A symbol and three REGs in the B symbol may be located on the same frequency domain. When a non-interleaved mapping method is used and the length of CORESET corresponds to 3 symbols, one REG bundle may be generated by bundling 2 REGs in each symbol, that is, bundling a total of 6 REGs (2 REGs per symbol*3 symbols). For convenience, when each 1-symbol of the 3 symbols is called a C symbol, a D symbol, and an E symbol, two REGs in the D symbol may be consecutive in the frequency domain, and two REGs in the E symbol may be consecutive in the frequency domain. In addition, two REGs in the C symbol, two REGs in the D symbol, and two REGs in the E symbol may be located on the same frequency domain.

When a non-interleaved mapping method is used and the length of CORESET corresponds to 1 symbol, i) the REG bundle may be generated by bundling 6 consecutive REGs in the frequency domain. ii) The REG bundle may be generated by bundling two consecutive REGs on the frequency domain. When an interleaved mapping method is used and the length of CORESET corresponds to 2 symbols, the REG bundle may be generated by bundling one REG of each symbol. In this case, one REG of each symbol may be located on the same frequency domain. When the interleaved mapping method is used and the length of CORESET corresponds to 3 symbols, the REG bundle may be generated by bundling one REG in each symbol. In this case, one REG in each symbol may be located on the same frequency domain.

The CCE may be generated by bundling REG bundles generated using the above-described method. Here, the CCE may include 6 REGs. That is, since the generated REG bundle includes 2, 3, or 6 REGs, the CCE may include 3, 2, or 1 REG bundles. For non-interleaved mapping, the REG bundle includes 6 REGs regardless of the length of CORESET. Here, the CCE may include one REG bundle.

Hereinafter, in this specification, a new CORESET different from the existing CORSET is proposed. The new CORESET may include at least one of REG, REG bundle, and CCE different from those of the existing CORESET. Hereinafter, a method of configuring a new CORESET will be described.

i) Method A

A new CORESET may be configured to include at least 6 consecutive symbols. The base station may transmit information about the CORESET to the UE and configure the CORESET including 6 consecutive symbols. Here, the information on CORESET may include information on a start symbol and symbol length (number) for configuring a new CORESET. The UE may determine the structure of REG, REG bundle, and CCE based on the CORESET including 6 symbols configured from the base station. For convenience of explanation, six consecutive symbols are expressed as symbol #0, symbol #1, symbol #2, symbol #3, symbol #4, and symbol #5.

Figure 29:
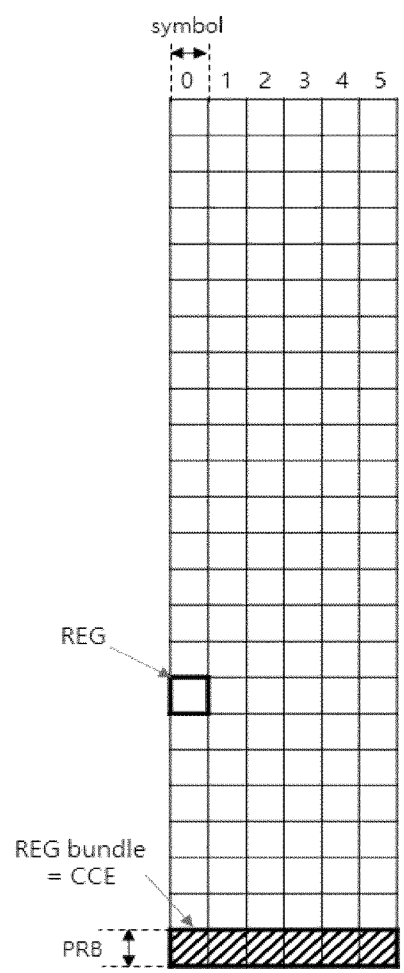
FIG. 29 illustrates the configuration of a control resource set according to an embodiment of the present disclosure.

FIG. 29 illustrates the configuration of a control resource set according to an embodiment of the present disclosure.

Referring to FIG. 29, REG, REG bundle, and CCE may be configured as follows.

i) REG may include 12 REs included in 1 PRB of each symbol in 6 symbols. ii) The REG bundle may include 6 REGs of 6 symbols. That is, the REG bundle may include REG corresponding to symbol #0, REG corresponding to symbol #1, . . . , and REG corresponding to symbol #5. Since one REG includes 12 REs, one REG bundle including 6 REGs may include 72 REs. iii) the CCE may include one REG bundle. Referring to FIG. 29, the number of REGs constituting a REG bundle is the same as the number of symbols constituting CORESET. However, when CCE is configured as shown in FIG. 29, the UE cannot obtain frequency diversity because each REG bundle constituting the CCE is located in the same PRB. Accordingly, when the UE monitors one CCE, a problem may occur in which PDCCH reception performance is deteriorated.

Figure 30:
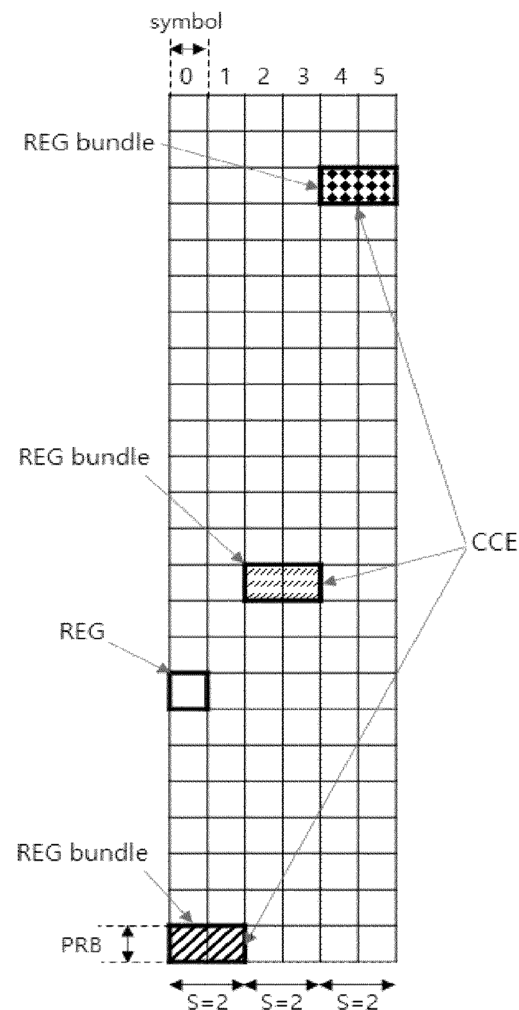
FIG. 30 illustrates the configuration of a control resource set according to an embodiment of the present disclosure.

FIG. 30 illustrates the configuration of a control resource set according to an embodiment of the present disclosure.

Referring to FIG. 30, REG, REG bundle, and CCE may be configured as follows.

i) REG may include 12 REs included in 1 PRB of each symbol. ii) The REG bundle may include S REGs corresponding to S consecutive symbols. A method of determining the S consecutive symbols will be described later. One REG bundle may include REs (i.e., 12*S REs) included in S symbols of 1 PRB. Here, a value of 'S' may correspond to one of 1, 2, and 3, and may be a value configured through a higher layer. Six consecutive symbols constituting CORESET may be divided into 6/S symbol sets. In this case, each symbol set may include S consecutive symbols. For example, the first symbol set among the 6/S symbol sets may include symbol #0, symbol #1, . . . , and symbol #(S−1), and the second symbol set may include symbol #S, symbol #(S+1), . . . , and symbol #(2*S−1). The subsequent symbol set may include sequential S symbols. iii) CCE may include 6/S REG bundles. Here, the CCE may include one REG bundle selected from each symbol set. The index of the REG bundle may be configured for each symbol set. In addition, the UE may configure the CCE by selecting a REG bundle having the same index in each symbol set. In each symbol set, the index of the REG bundle may be interleaved. Meanwhile, indexes may be configured for all REG bundles constituting CORESET. The CCE may include consecutive 6/S REG bundles among the REG bundles of configured indexes. That is, CCE x may include REG bundle #(6/S*x), REG bundle #(6/S*x+1), and REG bundle #(6/S*x+6/S−1). The method of configuring the index of the REG bundle is as follows. Indexing, starting from an REG bundle corresponding to the earliest symbol in time among the six symbols constituting the CORESET, may be performed. Among the PRBs constituting CORESET, an REG bundle constituting a PRB located on the lowest frequency domain may be indexed based on the time domain and then, an REG bundle included in a PRB located on the next lowest frequency domain may be indexed in the time domain. Here, the indexed index may be interleaved.

ii) Method B

The new CORESET may include a plurality of base CORESETs. The base CORESET may include 1 to 3 consecutive symbols. That is, a base station may transmit information on the new CORESET to the UE and here, the information on the new CORESET includes information on the number of base CORESETs constituting the new CORESET and information on the number of symbols constituting the base CORESET (consecutive 1 symbol to 3 symbols).

Figure 31:
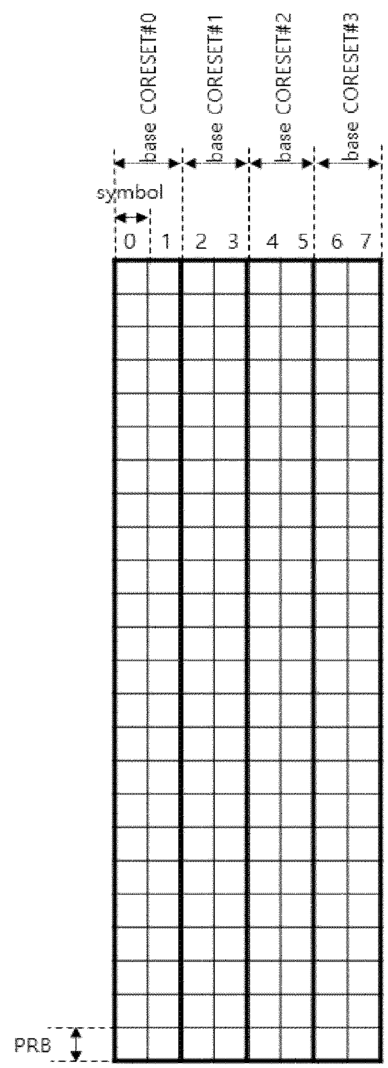
FIG. 31 illustrates a control resource set including a base control resource set according to an embodiment of the present disclosure.

FIG. 31 illustrates a control resource set including a base control resource set according to an embodiment of the present disclosure.

Referring to FIG. 31, each of the four base CORESETs (base CORESET #0, #1, #2, #3) may include two symbols. A new CORESET may include four base CORESETs. In FIG. 31, four base CORESETs are shown to be configured with the same length (number of symbols) and the same frequency band, but base CORESETs may be configured with different lengths and frequency bands. In addition, although each base CORESET is continuously located on a time domain resource, it is not limited thereto and may be discontinuous.

Hereinafter, a method for determining a plurality of base CORESETs and arrangement of symbols constituting the plurality of base CORESETs will be described.

Symbols constituting the plurality of base CORESETs may be continuous in the time domain. Meanwhile, a UE may receive start symbol indexes of a plurality of base CORESETs from the base station. For example, the UE may receive a bitmap having a size (length) of 14 bits. Here, the MSB of the bitmap may indicate the first symbol of a slot as a start symbol index, and the LSB of the bitmap may indicate the last symbol of the slot as a start symbol index.

Figure 32:
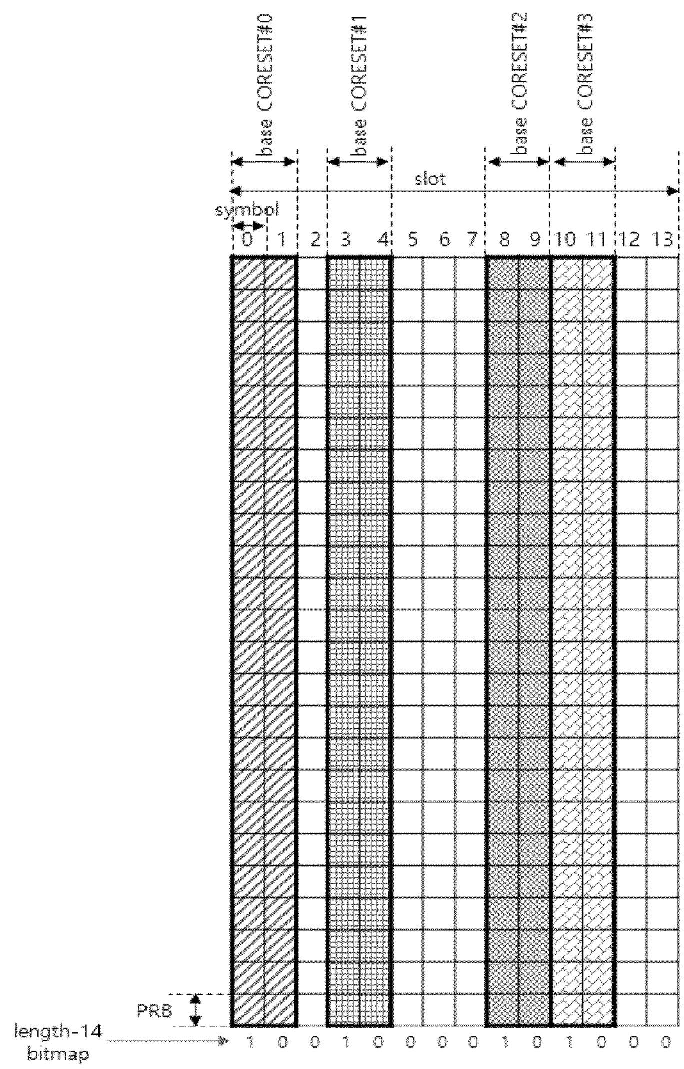
FIG. 32 illustrates a control resource set including a base control resource set according to an embodiment of the present disclosure.

FIG. 32 illustrates a control resource set including a base control resource set according to an embodiment of the present disclosure.

Referring to FIG. 32, a 14-bit sized bitmap may be [10010000101000]. Here, the index of the symbol corresponding to 1 in the bitmap may be 0, 3, 8, or 10. Accordingly, the base control resource set may be configured to start at symbols 0, 3, 8, and 10.

The UE may receive a bitmap of 14*N bit size from the base station. The bitmap may indicate start symbol indexes for N slots. Specifically, the bitmap may be divided into a bundle of 14 bits and here, the MSB of each 14-bit bundle may indicate the first symbol of a slot as a start symbol index, and the LSB may indicate the last symbol of the slot as a start symbol index.

Figure 33:
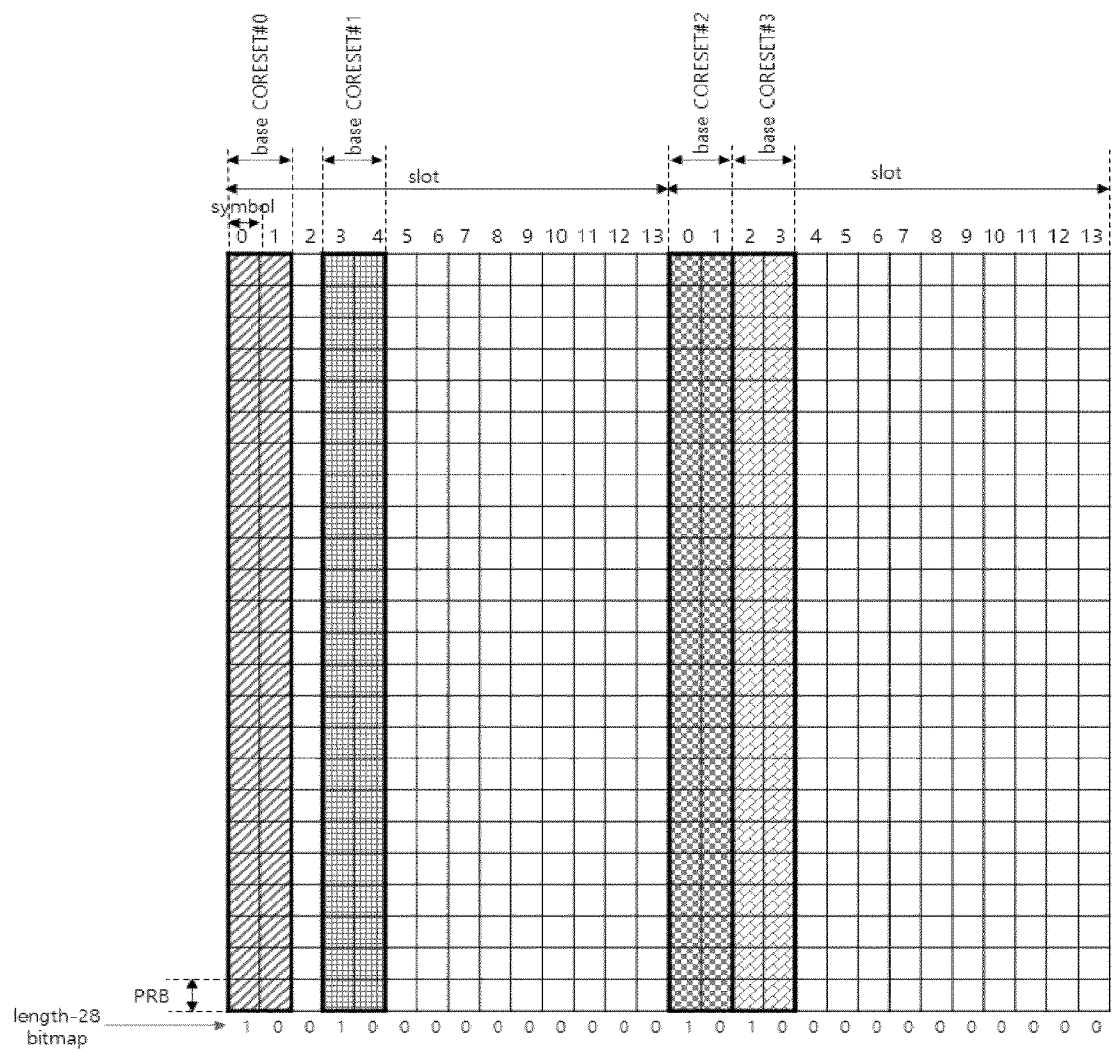
FIG. 33 illustrates a method of designing a control resource set using a base control resource set according to an embodiment of the present disclosure.

FIG. 33 illustrates a method of designing a control resource set using a base control resource set according to an embodiment of the present disclosure.

Referring to FIG. 33, the base station may transmit a bitmap having a length of 28 to the UE. Here, the first 14 bits may indicate the position of a base CORESET start symbol in a first slot, and the next 14 bits may indicate the position of a base CORESET start symbol in a second slot. Since the first 14 bits are [10010000000000], the base CORESET may be configured starting from symbols 0 and 3 of the first slot. Since the next 14 bits are [101000000000000], the base CORESET may be configured from symbols 0 and 2 of the second slot.

Each of the plurality of base CORESETs may be configured with a different symbol length (number). The base station may transmit, to the UE, the position and length of the start symbol from which the base CORESET is configured in one slot. Here, the position and length of the start symbol may be configured in pairs. In addition, the frequency domains of the plurality of base CORESETs may all be the same.

Figure 34:
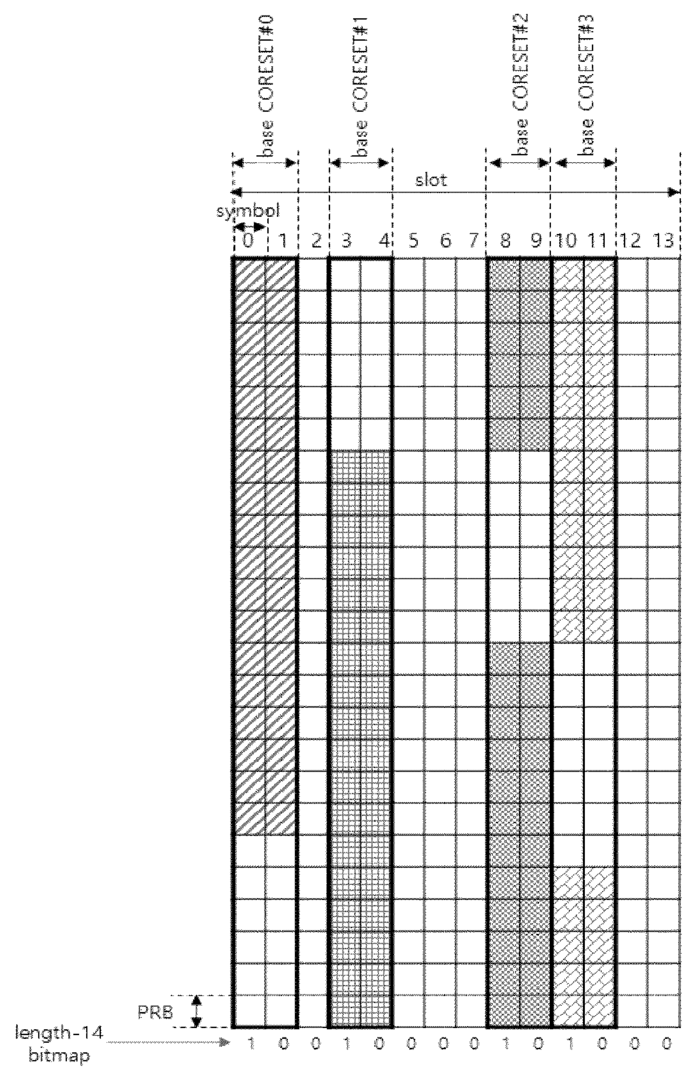
FIG. 34 illustrates a method of configuring a control resource set using a base control resource set according to an embodiment of the present disclosure.

FIG. 34 illustrates a method of configuring a control resource set using a base control resource set according to an embodiment of the present disclosure.

Meanwhile, the frequency domains of the plurality of base CORESETs may be different from each other. Referring to FIG. 34, a new CORESET may include four base CORESETs. Here, the plurality of base CORESETs may be configured with resources on different frequency domains. For example, a first base CORESET (base CORESET #0) may include the remaining PRBs except for the lowest 6 PRBs in the frequency domain. A second base CORESET (base CORESET #1) may include the remaining PRBs except for the six highest PRBs in the frequency domain. A third base CORESET (base CORESET #2) and a fourth base CORESEET (base CORESET #3) may include the remaining PRBs except for the intermediate 6 PRBs. As described above, since the base CORESETs are configured with resources on different frequency domains, this method is advantageous in terms of frequency diversity.

Hereinafter, when the base CORESETs are configured with resources on different frequency domains, a method of configuring each of the base CORESETs will be described.

The base station may configure frequency resources of the base CORESETs with different bitmaps, respectively. For example, a bitmap corresponding to each of a plurality of base CORESETs exists, and each bitmap may indicate whether six bundled PRBs constitute a base CORESET. Here, the number of PRBs constituting each base CORESET may be the same.

The base station may configure resources on the frequency domain with two different bitmaps, and may indicate a resource on a frequency domain of an odd-numbered base CORESET by a first bitmap and indicate a resource on a frequency domain of an even-numbered base CORESET by a second bitmap. To generalize this method, the base station may indicate to the UE the resources on the frequency domain of the base CORESET, by using B different bitmaps. In this case, if n mod B is 0, the frequency domain resource of base CORESET n may be indicated by the first bitmap, and if n mod B is 1, the frequency domain resource of the base CORESEET n may be indicated by the second bitmap. In other words, if n mod B is k, the resource on the frequency domain of the base CORESET may be indicated by the (k+1)th bit of the bitmap. In this case, n may be indexed from 0 as an index of the base CORESET.

The base station may transmit the PRB offset value between the base CORESETs to the UE. For example, a resource on a frequency domain of an odd-numbered base CORESET among a plurality of base CORESETs may be indicated by a bitmap. Here, the bitmap may indicate whether the bundled 6 PRBs are included in the odd-numbered base CORESET. In addition, the base station may transmit a PRB offset to the UE. The PRB offset may be in units of 6 PRBs. The PRBs included in the even-numbered base CORESET may be PRBs corresponding to an index value obtained by adding the PRB offset to the indexes of the PRBs included in the odd-numbered base CORESET.

When the base station configures a new CORESET for the UE, the UE may receive a PDCCH from each base CORESET. Hereinafter, a method for receiving a PDCCH by a UE will be described.

The index of a CCE of a base CORESET may be indexed in a frequency-first manner. That is, among the base CORESETs constituting a new CORESET, CCEs included in the earliest base CORESET on the time domain may be selected first, and the selected CCEs may be indexed in an ascending order on the frequency resource domain. In this case, if the number of first CCEs included in the earliest base CORESET on the time domain is N_CCE0, the first CCEs may be indexed as 0, 1, . . . , N_CCE0-1, respectively, in an ascending order on the frequency domain. The second CCEs included in the second preceding base CORESET on the time domain may be indexed in an ascending order on the frequency domain. The index of the second CCEs may be indexed with a value after the last index of the first CCEs in the time domain. If the number of CCEs included in the second CCEs is N_CCE1, the second CCEs may be indexed as N_CCE0, N_CCE0+1, . . . , N_CCE0+N_CCE1−1, respectively, in an ascending order on the frequency domain. In the same method, CCEs of the base CORESET constituting the new CORESET may be indexed.

Meanwhile, CCEs of base CORESETs constituting a new CORESET may be indexed in a time-first manner. For example, among the base CORESETs constituting a new CORESET, CCEs constituting a PRB on the lowest frequency domain may be selected first, and the selected CCEs may be indexed in an ascending order on the time domain. Here, if the number of first CCEs constituting the PRB on the lowest frequency domain is N_CCE0, the first CCEs may be indexed as 0, 1, . . . , N_CCE0-1, respectively, in an ascending order on the time domain. The second CCEs constituting the second lowest PRB on the frequency domain may be indexed in an ascending order on the time domain. The indexes of the second CCEs may be indexed with values after the last index of the first CCEs in the frequency domain. If the number of second CCEs is N_CCE1, the second CCEs may be indexed as N_CCE0, N_CCE0+1, . . . , N_CCE0+N_CCE1−1, respectively, in an ascending order on the time domain. In the same method, CCEs of the base CORESET constituting the new CORESET may be indexed.

Figure 35:
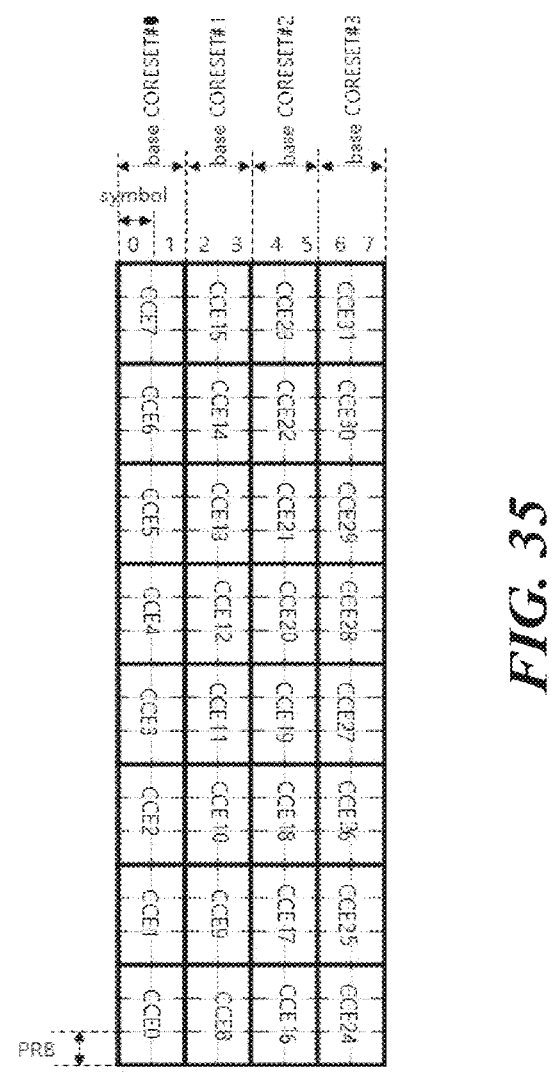

FIG. 35 illustrates a method of indexing CCEs in a frequency-first manner according to an embodiment of the present disclosure.

Referring to FIG. 35, each base CORESET constituting a new CORESET may include 8 CCEs. In this case, CCEs corresponding to a first base CORESET (base CORESET #0) located in symbol 0 and symbol 1 may be indexed as 0, 1, 2, 3, 4, 5, 6, and 7 in a frequency-first manner. CCEs corresponding to a second base CORESET (base CORESET #1) located in symbol 2 and symbol 3 may be indexed as 8, 9, 10, 11, 12, 13, 14, and 15 in a frequency-first manner. CCEs of the remaining base CORESETs constituting the new CORESET may be indexed in the same manner.

Figure 36:
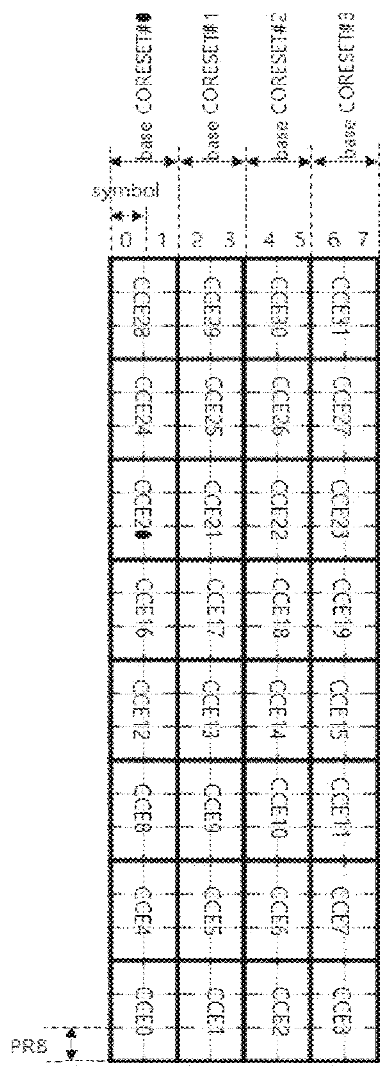
FIG. 36 illustrates a method of indexing CCEs in a time-first manner according to an embodiment of the present disclosure.

FIG. 36 illustrates a method of indexing CCEs in a time-first manner according to an embodiment of the present disclosure.

Referring to FIG. 36, each PRB included in a new CORESET may include four CCEs. In this case, CCEs on the lowest frequency domain may be indexed as 0, 1, 2, and 3 in a time-first manner. CCEs on the second lowest frequency domain may be indexed as 4, 5, 6, and 7 in a time-first manner. CCEs of the remaining base CORESETs constituting the new CORESET may be indexed in the same manner.

The UE may receive a PDCCH having an aggregation level of L from L CCEs among CCEs constituting a base CORESET. In this case, i) L may be a value of power of 2. For example, L may be 1, 2, 4, 8, 16, 32, or the like. In addition, ii) L may be a value of 2^k*C. ‘k’ is a natural number, and ‘C’ is the number of base CORESETs, which may be a natural number. For example, if a new CORESET includes three base CORESETs, L may have values such as 1*3, 2*3, 4*3, 8*3, 16*3, 32*3, and the like.

Figure 37:
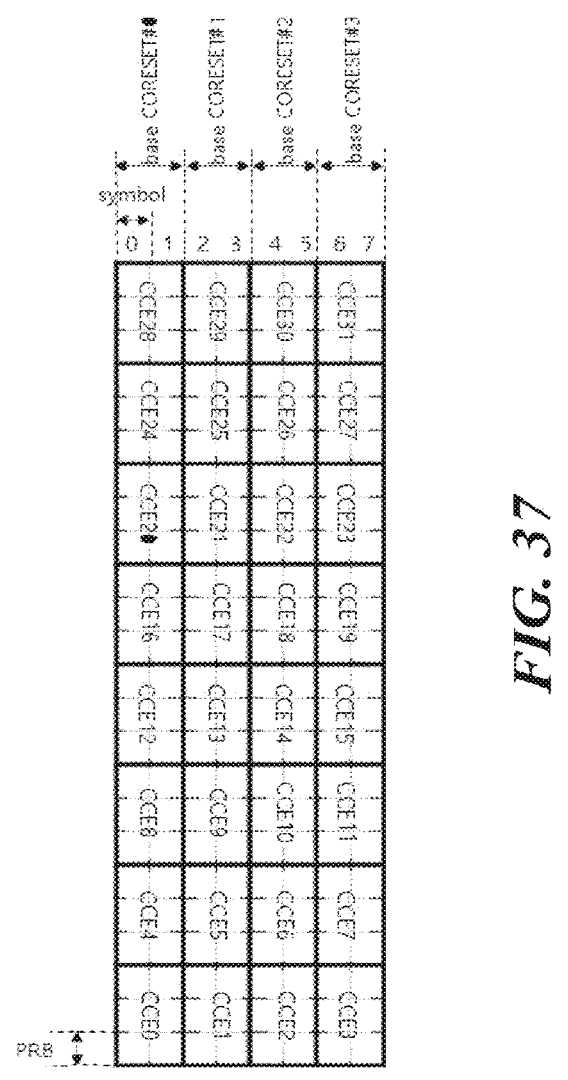
Figure 38:
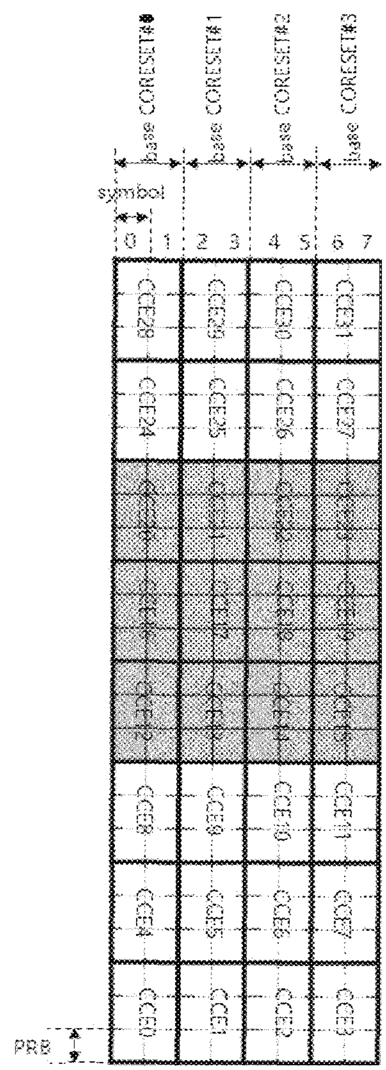
FIG. 38 illustrates a PDCCH candidate based on CCE indexed in a time-first manner according to an embodiment of the present disclosure.

FIG. 37 illustrates a PDCCH candidate based on a CCE indexed in a frequency-first manner according to an embodiment of the present disclosure, and FIG. 38 illustrates a PDCCH candidate based on a CCE indexed in a time-first manner according to an embodiment of the present disclosure.

Referring to FIG. 37, CCEs constituting a new CORESET may be indexed in a frequency-first manner. Here, a region in which a UE monitors a PDCCH candidate may be CCE 12 to CCE 23 (12 CCEs). The UE may recognize that CCEs for monitoring the PDCCH candidate based on the CCE index correspond to 4 CCEs included in a second base CORESET (base CORESET #1) and all CCEs included in a third base CORESET (base CORESET #2).

Referring to FIG. 38, CCEs constituting a new CORESET may be indexed in a time-first manner. Here, the region in which a UE monitors a PDCCH candidate may be CCE 12 to CCE 23 (12 CCEs). The UE may recognize that CCEs for monitoring the PDCCH candidate based on the CCE index correspond to 3 CCEs of each of 4 base CORESETs.

CCEs of base CORESETs constituting a new CORESET may be independently indexed. For example, if the number of CCEs constituting a first base CORESET among the base CORESETs constituting a new CORESET is N_CCE0, the CCEs constituting the first base CORESET may be indexed as one of values of 0, 1, . . . , N_CCE0-1, respectively. Similarly, if the number of CCEs constituting a second base CORESET among the base CORESETs constituting a new CORESET is N_CCE0, the CCEs constituting the second base CORESET may be indexed as one of values of 0, 1, . . . , N_CCE0−1. Here, the UE may determine CCEs in which the PDCCH is received on the first base CORESET. The UE may receive a PDCCH having an aggregation level of L from L CCEs among CCEs constituting the first base CORESET. The UE may receive a PDCCH having an aggregation level of L from L CCEs among CCEs constituting the second CORESET. Here, the PDCCH received on the first CORESET and the PDCCH received on the second CORESET may include the same DCI. That is, the UE may repeatedly receive the PDCCH on different base CORESETs constituting a new CORESET. Here, L may be a value of power of 2. For example, L may have a value of 1, 2, 4, 8, 16, 32, or the like.

Figure 39:
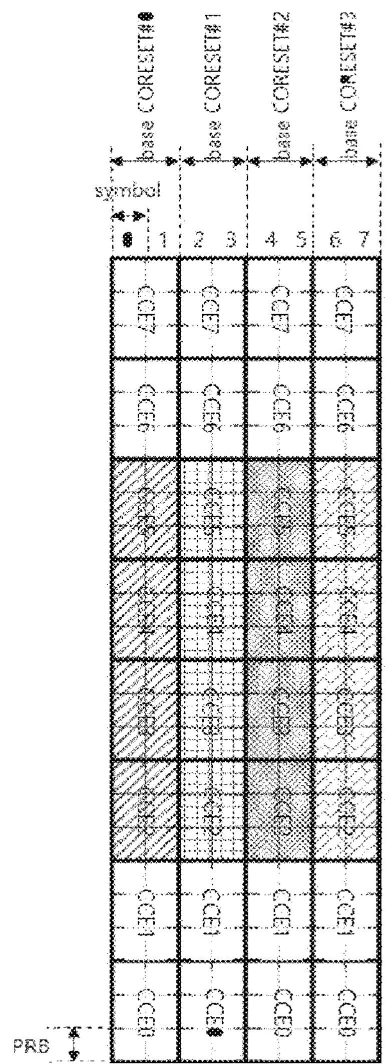
FIG. 39 illustrates repeated reception of a PDCCH on a base control resource set according to an embodiment of the present disclosure.

FIG. 39 illustrates repeated reception of a PDCCH on a base control resource set according to an embodiment of the present disclosure.

Referring to FIG. 39, CCEs of base CORESETs constituting a new CORESET may be independently indexed. A UE may receive a first PDCCH having an aggregation level of 4 on a first base CORESET (base CORESET #0). Here, a region monitored by the UE to receive the PDCCH having the aggregation level of 4 may correspond to CCE2, CCE3, CCE4, and CCE5 included in the first base CORESET (base CORESET #0). The UE may receive a second PDCCH having an aggregation level of 4 on a second base CORESET (base CORESET #1). Here, the region monitored by the UE to receive the PDCCH having the aggregation level of 4 may correspond to CCE2, CCE3, CCE4, and CCE5 included in the second base CORESET (base CORESET #1). Similarly, the UE may receive a third PDCCH and a fourth PDCCH on the third base CORESET (base CORESET #2) and the fourth base CORESET (base CORESET #3), respectively. In this case, each DCI included in the first, second, third, and fourth PDCCHs may be identical to each other. That is, the UE may monitor and receive a PDCCH including the same DCI through 16 CCEs.

When REG and REG bundles constitute CCE, interleaving may be applied differently to each base CORESET. This is to distribute CCEs included in each base CORESET into different frequency bands. Accordingly, multiplexing between one base CORESET and another base CORESET overlapping therewith may be easy.

Hereinafter, a method of applying interleaving to each base CORESET will be described. First, if the index of the REG bundle constituting the base CORESET is x, the index of the interleaved REG bundle may be f(x). f(x) is represented as in Equation 1.

$$f(x)=(rC+c+n_{shift})\bmod\left(N_{REG}^{CORESET}/L\right)$$ [Equation 1]

$$x=cR+r$$

$$r=0,1,\ \ldots\ ,R-1$$

$$c=0,1,\ \ldots\ ,C-1$$

$$C=N_{REG}^{CORESET}/(LR)$$

In Equation 1, $N_{REG}^{CORESET}$ may be the number of REGs constituting a base CORESET, and L may be the number of REGs constituting an REG bundle. Therefore, $N_{REG}^{CORESET}/L$ may correspond to the number of REG bundles in the base CORESET. R may be one of values of 2, 3, to 6. $n_{shift}$ may be a shift value applied when interleaving is performed on indexes of REG bundles constituting each base CORESET. Based on $n_{shift}$, indexes of REG bundles may be interleaved differently. $n_{shift}$ may be a value configured by a base station to the UE or an ID of a cell.

The base station may configure the $n_{shift}$ value applied to each base CORESET differently for each base CORESET in order to interleave indexes of different REG bundles of different base CORESETs. The UE may interleave the index of the REG bundle based on the $n_{shift}$ value configured in each base CORESET.

The base station may configure one value ($n_{shift,0}$) in the UE. Here, the UE may be configured to apply the $n_{shift,0}$ value differently for each base CORESET. For example, the UE may interleave the index of the REG bundle by determining a multiple of the $n_{shift,0}$ value as the $n_{shift}$ value. In addition, the UE may determine the $n_{shift}$ value by adding a value based on the number of REG bundles to the $n_{shift,0}$ value. For example, the $n_{shift}$ value may be determined as $n_{shift,0}+N_{REG}^{CORESET}/L/N*n$. Here, N is the number of base CORESETs constituting one new CORESET, and n is an index of the base CORESET and may have a value of 0, 1 . . . , N−1. If a value of $n_{shift,0}+N_{REG}^{CORESET}/L/N*n$ is not an integer, the UE may determine an integer value obtained by applying one of ceil, floor, and round operations, as the value of $n_{shift,0}+N_{REG}^{CORESET}/L/N*n$. This is a method in which indexes of CCEs are uniformly configured to be different by $n_{shift}$ values according to the number of REG bundles.

Figure 40:
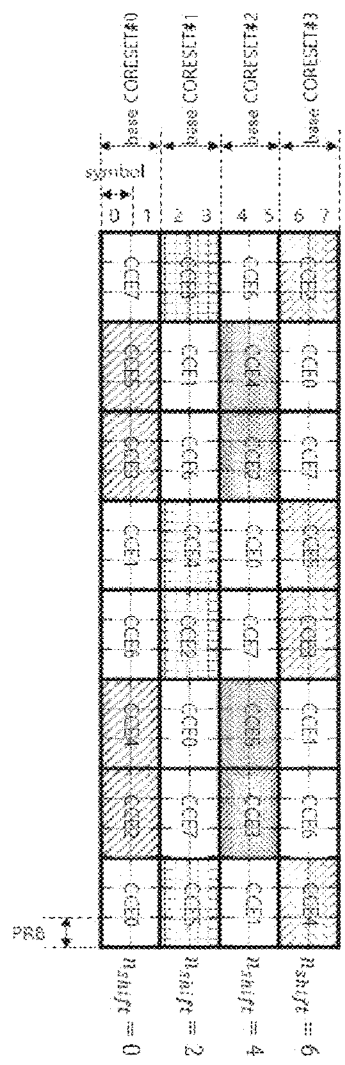
FIG. 40 illustrates repeated reception of a PDCCH candidate by applying interleaving to a base control resource set, by a terminal according to an embodiment of the present disclosure.

FIG. 40 illustrates repeated reception of a PDCCH candidate by applying interleaving to a base control resource set, by a terminal according to an embodiment of the present disclosure.

FIG. 40 illustrates an example of a method of determining the index of CCEs constituting each base CORESET by using different interleaving for each base CORESET when the CCEs of the base CORESETs constituting a new CORESET are independently indexed as described above. Referring to FIG. 40, $n_{shift,0}+N_{REG}^{CORESET}/L/N*0$ may be used as an $n_{shift}$ value for a first base CORESET (base CORESET #0), $n_{shift,0}+N_{REG}^{CORESET}/L/N*1$ may be used as an $n_{shift}$ value for a second base CORESET (base CORESET #1), $n_{shift,0}+N_{REG}^{CORESET}/L/N*2$ may be used as an $n_{shift}$ value for a third base CORESET (base CORESET #2), and $n_{shift,0}+N_{REG}^{CORESET}/L/N*3$ may be used as an $n_{shift}$ value for a fourth base CORESET (base CORESET #3). In this case, L may be 6, N may be 4, $N_{REG}^{CORESET}$ may be 48, R may be 2, and $n_{shift,0}$ may be 0. Since different $n_{shift}$ values are applied to different base CORESETs, interleaving may be performed differently for each base CORESET. In addition, CCE 0 of each base CORESET may be located in the lowest frequency domain in a first base CORESET (base CORESET #0), located in a frequency domain corresponding to ¼ of the entire frequency band in a second base CORESET (base CORESET #1), located in a frequency domain corresponding to 2/4 of the entire frequency band in a third base CORESET (base CORESET #2), and located in a frequency domain corresponding to ¾ of the entire frequency band in a fourth base CORESET. Accordingly, CCE0 of each base CORESET may be equally distributed in the frequency band.

Referring to FIG. 40, the UE may receive a PDCCH having an aggregation level of 4 on the first base CORESET (base CORESET #0). Here, a region monitored by the UE to receive the PDCCH having an aggregation level of 4 may correspond to CCE2, CCE3, CCE4, and CCE5 of the first base CORESET. Similarly, the UE may receive a PDCCH having an aggregation level of 4 by monitoring CCE2, CCE3, CCE4, and CCE5 of each of the second base CORESET, the third base CORESET, and the fourth base CORESET. In this case, PDCCHs having an aggregation level of 4 received on each of the first base CORESET, the second base CORESET, the third base CORESET, and the fourth base CORESET may include the same DCI. As different interleaving is applied to each of base CORESETs, CCE2, CCE3, CCE4, and CCE5 of each base CORESET may be distributed and disposed in the frequency domain. Therefore, this method is effective in terms of frequency diversity.

Hereinafter, a method for receiving a PDCCH by a UE will be described. Here, the PDCCH may be transmitted on a CORESET, and the CORESET may correspond to the existing CORESET or the above-described new CORESET.

iii) Method C

A base station may transmit information on one CORESET and information on a plurality of search spaces corresponding to one CORESET to a UE. Each of the plurality of search spaces may have a periodicity and an offset. Here, the periodicity and the offset may be configured in units of slots. The information on the plurality of search spaces may include information on the index of a start symbol for which the UE performs monitoring in order to receive a PDCCH in a slot. The UE may monitor the PDCCH on a region determined based on the periodicity and offset of each of the plurality of search spaces and an index of a start symbol, which are received from the base station, and may receive the PDCCH. That is, the UE may receive the PDCCH on each of the plurality of search spaces corresponding to one CORESET. In this case, DCIs included in the PDCCH received on each of the plurality of search spaces may be identical to each other. Therefore, the PDCCH may be repeatedly transmitted.

The base station may configure an index in each of the plurality of search spaces in order to transmit the PDCCH including the same DCI on the plurality of search spaces to the UE. That is, the UE may recognize that the indexed search spaces configured by the base station transmit the same DCI. For example, the UE receives search space 1 and search space 2 configured from the base station, and the UE may recognize that DCIs included in PDCCHs repeatedly transmitted in search space 1 and search space 2 are the same. Here, the periodicity of the search space 1 and the periodicity of the search space 2 may be the same. That is, the base station may configure the same periodicity of a plurality of search spaces for transmitting the same DCI, and thus the UE may determine an interval (resource domain) in which the PDCCH is repeatedly transmitted. For example, if the periodicity of the search space 1 and the periodicity of the search space 2 are equal to P, the UE may determine slots, the slot indexes of which are P*n, P*n+1, . . . , P*n+P−1, as an interval in which the PDCCH is repeatedly transmitted, and PDCCHs including the same DCI may be repeatedly transmitted in a plurality of search spaces included in the determined interval. In this case, n may have a value of 0, 1, 2, . . . , and the like.

Figure 41:
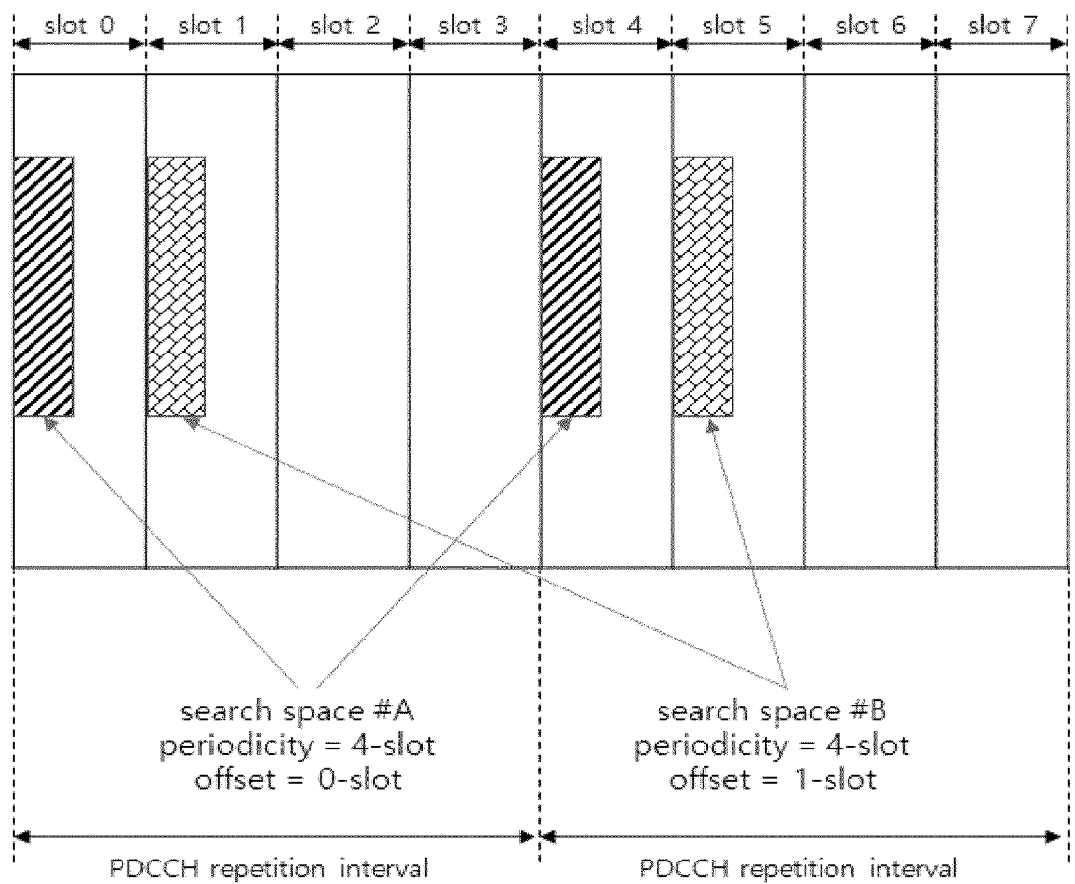
FIG. 41 illustrates repeated transmission of PDCCH on a plurality of search spaces according to an embodiment of the present disclosure.

FIG. 41 illustrates repeated transmission of PDCCH in a plurality of search spaces according to an embodiment of the present disclosure.

Referring to FIG. 41, two search spaces may be configured in one CORESET. The periodicity of a first search space (search space #A) among the two search spaces may be 4 slots, and the offset may be 0 slots. Therefore, a UE may perform monitoring for receiving a PDCCH on the first search space (search space #A) of slot 0, slot 4, and slot 8. The periodicity of a second search space (search space #B) among the two search spaces may be 4 slots and the offset may be 1 slot. Accordingly, the UE may perform monitoring for receiving a PDCCH in the second search space (search space #B) of slots 1, 5, and 9. When the UE is configured to repeatedly receive the PDCCH including the same DCI on a plurality of search spaces, the UE may receive a repetition PDCCH including the same DCI on the search space of slot 0, slot 1, and slot 2, and slot 3 based on a common periodicity (the periodicity of the first search space and the second search space). In addition, the UE may receive the repetition PDCCH transmitting the same DCI on the search space of slot 4, slot 5, slot 6, and slot 7 based on the common period.

Meanwhile, the periodicity of the first search space and the periodicity of the second search space may be different from each other. In this case, a resource domain (interval) in which the PDCCH is repeatedly transmitted needs to be defined. A period in which the PDCCH is repeatedly transmitted may be determined based on the least common multiple of the periodicity of the first search space and the periodicity of the second search space. A period in which the PDCCH is repeatedly transmitted may be determined based on the greatest common divisor of the periodicity of the first search space and the periodicity of the second search space. A period in which the PDCCH is repeatedly transmitted may be determined based on a larger periodicity between the periodicity of the first search space and the periodicity of the second search space. A period in which the PDCCH is repeatedly transmitted may be determined based on a smaller periodicity between the periodicity of the first search space and the periodicity of the second search space. The base station may separately transmit (configure) a periodicity of interval, in which the PDCCH is repeatedly transmitted, to (in) the UE.

The base station may transmit (configure) a plurality of periodicities and offset values for one search space to (in) the UE. In addition, the base station may transmit (configure) an index of a start symbol for which the UE performs monitoring for reception of the PDCCH on a plurality of slots. The UE may receive a repetition PDCCH including the same DCI based on a plurality of periodicities an offset value, and an index of a start symbol.

In order to transmit PDCCHs including the same DCI in the search space, the base station may transmit (configure) a periodicity and an offset value of one search space to (in) the UE. In addition, the base station may transmit (configure) an index of a start symbol to be monitored in order to receive the PDCCH within one slot to the UE. In addition, the base station may indicate the number of slots (K) in which a search space repeatedly monitored by the UE is configured. The number of slots (K) may be a natural number smaller than the periodicity of the search space. Specifically, the search space in which the UE performs monitoring to receive the PDCCH may be configured according to a period. The search space may be configured based on an index of a start symbol in a slot indicated by the base station. In other words, the search space may be configured from the start symbol indicated by the index. In addition, the base station may indicate the number of slots (K) for configuring the search space repeatedly monitored by the UE. For example, if the base station indicates a value of K as 2, the search space may be equally configured in slot n and slot (n+1). Here, an index of a symbol from which the search space starts and a slot index are equal to 'n'. Therefore, the search space in slot n and slot (n+1) may be configured starting from symbol n of each slot.

Figure 42:
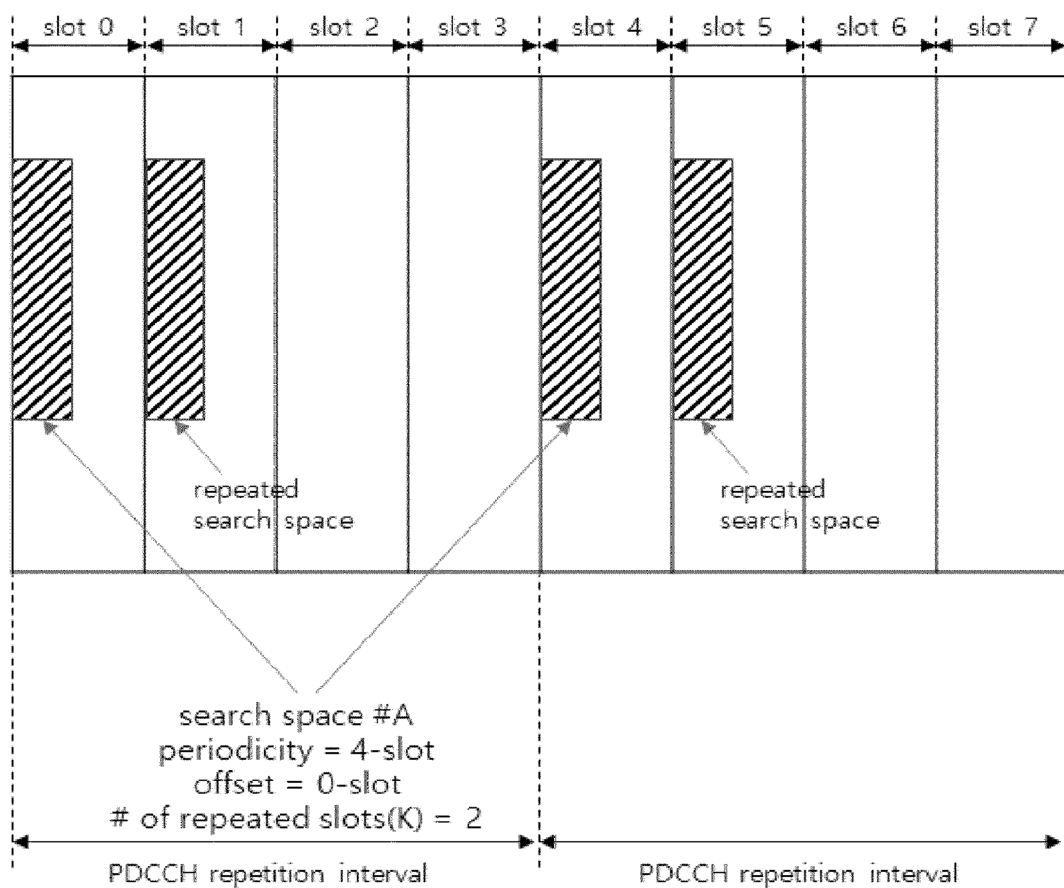
FIG. 42 illustrates transmission of a PDCCH based on a search space and repetition configuration according to an embodiment of the present disclosure.

FIG. 42 illustrates transmission of a PDCCH based on a search space and repetition configuration according to an embodiment of the present disclosure.

Referring to FIG. 42, the periodicity of a search space may be configured with 4 slots, and the offset may be configured with 0 slots. Accordingly, the search space may be configured in slot 0, slot 4, slot 8, . . . , and the like. In addition, a UE may receive an indication of the number of slots (K) for repeatedly monitoring the search space, as the value of K being 2. Here, a search space in which the UE monitors a repetition PDCCH may be configured in the next slots (slot 1, slot 5, slot 9 . . . ) of slots (slot 0, slot 4, slot 8 . . . ) in which a first search space is configured.

A base station may transmit (configure) the periodicity and offset value of one search space to (in) the UE. In addition, the base station may transmit (configure) K indexes of start symbols for which the UE performs PDCCH monitoring in a slot. Specifically, the UE may perform monitoring based on a first index of the symbol from which monitoring for receiving the PDCCH in slot n is started. For example, if the first index is 0, a search space is configured from the first symbol of slot n, and the UE may perform monitoring for PDCCH reception on the search space of slot n. The UE may perform monitoring based on a second index of the symbol from which monitoring for receiving the PDCCH in slot (n+1) is started. For example, if the second index is 2, a search space is configured from the third symbol of slot (n+1), and the UE may perform monitoring for PDCCH reception on the search space of slot (n+1).

Figure 43:
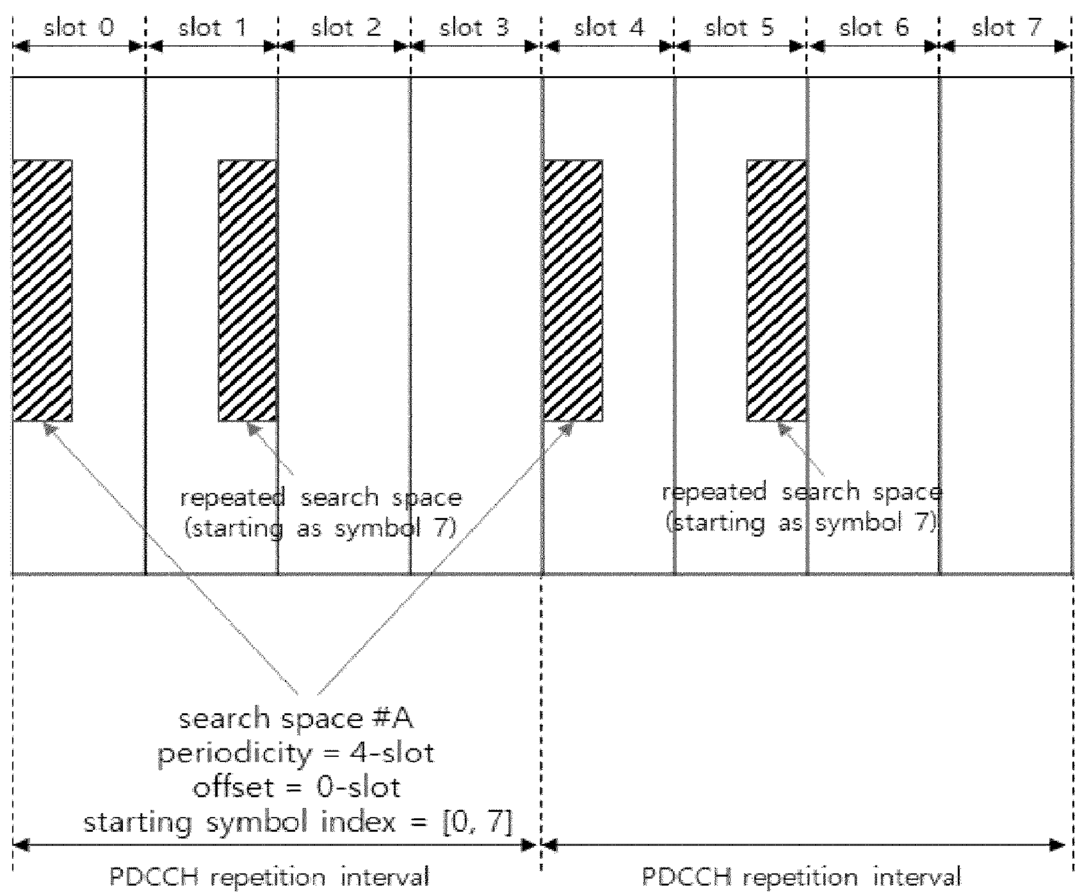
FIG. 43 illustrates transmission of a PDCCH according to different start symbol positions based on a search space and repetition configuration according to an embodiment of the present disclosure.

FIG. 43 illustrates transmission of a PDCCH according to different start symbol positions based on a search space and repetition configuration according to an embodiment of the present disclosure.

Referring to FIG. 43, a search space may be configured with a periodicity of 4 slots and an offset of 0 slot. Accordingly, the search space may be configured in slot 0, slot 4, slot 8, . . . and the like. In addition, a base station may configure 0 and 7 as start symbol indexes of the search space. Therefore, the search space may be configured from symbol 0 in slot 0, slot 4, slot 8 . . . , etc., and the repeated search space is configured from symbol 7 in slot 1, slot 5, slot 9 . . . etc. corresponding to the next slot thereof.

The base station may configure a plurality of search spaces in CORESET configured in one slot. To this end, the base station may indicate the UE the number of start symbols (K) of the search space. For example, if a value of K is 2, the number of search spaces configured in slot n may be two. Specifically, the first search space may be configured from the first symbol of slot n, and the second search space may be configured from the symbol immediately after the last symbol of the first search space.

The base station may configure a plurality of search spaces in CORESET configured in one slot. To this end, the base station may indicate, to the UE, K indexes of the start symbols of the search space. For example, if a value of K is 2, the start symbol index indicated by the base station may be a first index and a second index, and there may be two search spaces. In this case, if a value of the first index is 0, the first search space may be configured from the first symbol of the slot n, and if a value of the second index is 2, the second search space may be configured from the third symbol of the slot n.

In the above-described method C, since a region in which the PDCCH is transmitted corresponds to one CORESET, resources on the frequency domain are fixed in some bands, and the number of symbols of the CORESET is fixed. One CORESET in the present specification may refer to a resource on the same time-frequency domain configured for each slot. Therefore, method C may be disadvantageous in terms of frequency diversity, and may not adjust the number of symbols according to the slot configuration. Hereinafter, a method for solving these problems will be described.

iv) Method D

A base station may configure a plurality of CORESETs in one DL BWP. A resource in the time-frequency domain of each CORESET of the plurality of CORESETs may be configured independently. In addition, one or a plurality of search spaces may be configured on each CORESET. Specifically, the plurality of search spaces may be mapped to respective CORESETs based on an indicator indicating CORESET.

For example, a different search space may be configured in each of the plurality of CORESETs. The base station may transmit an indicator indicating a PDCCH repeatedly transmitted on a plurality of CORESETs to the UE. Specifically, the base station may transmit an indicator indicating that the PDCCH is repeatedly transmitted on the first CORESET and the second CORESET to a UE. In this case, if a value of the indicator is '1', the repetition PDCCH is transmitted on a first search space corresponding to a first CORESET, and if a value of the indicator is '2', the repetition PDCCH is transmitted on a second search space corresponding to a second CORESET. In this case, DCIs included in PDCCHs repeatedly transmitted on a plurality of CORESETs may be identical to each other.

For example, the base station may configure one search space with a plurality of CORESETs. Specifically, the UE may receive, from the base station, an indicator indicating which CORESET among a plurality of CORESETs one search space is mapped to. In addition, the UE may receive (configure) the periodicity, the offset, and the index of the start symbol of the search space from the base station. The search spaces determined based on the periodicity, the offset, and the index of the start symbol may be sequentially mapped to a plurality of CORESETs. In this case, pieces of DCI included in PDCCHs transmitted on a plurality of CORESETs may be the same. Since the DCI may be transmitted on a plurality of CORESETs, frequency diversity can be obtained.

Figure 44:
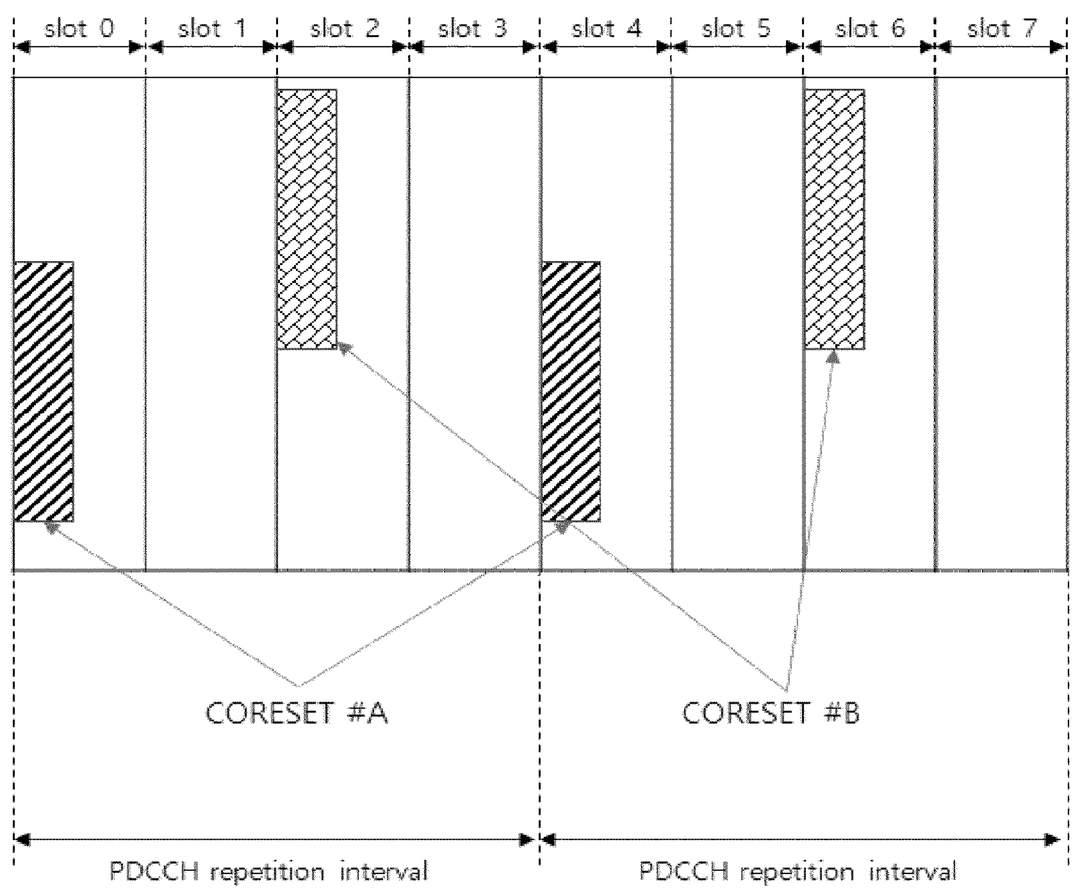
FIG. 44 illustrates transmission of a PDCCH on a plurality of control resource sets according to an embodiment of the present disclosure.

FIG. 44 illustrates transmission of a PDCCH on a plurality of control resource sets according to an embodiment of the present disclosure.

Referring to FIG. 44, the periodicity of a search space may be 2 slots, and the offset may be 0 slots. Accordingly, the search space may be configured in slot 0, slot 2, slot 4, slot 6, slot 8, . . . , and the like. The search spaces configured in slot 0, slot 2, slot 4, slot 6, slot 8, . . . , and the like may each be mapped to one of two CORESETs (CORESET #A, CORSET #B). The odd-numbered search space (i.e., the search space configured in slot 0, slot 4, and slot 8) may be mapped to CORESET #A, and the even-numbered search space (i.e., the search space configured in slot 2, slot 6) may be mapped to CORESET #B. Here, an interval of a resource through which the PDCCH is transmitted may be equal to a value obtained by multiplying the periodicity of the search space by the number of CORESETs. That is, 4 obtained by multiplying 2, which is the periodicity of the search space, by 2, which is the number of CORESETs, may be an interval of a resource through which the PDCCH is transmitted, and the unit of the interval may be a slot. The UE may receive a PDCCH during the intervals of slot 0, slot 1, slot 2, and slot 3. In addition, the UE may receive a PDCCH during the interval of slot 4, slot 5, slot 6, and slot 7.

The search space may be configured based on a plurality of periodicities, an offset, and an index of a start symbol configured by the base station. Since the plurality of search spaces respectively correspond to the plurality of CORESETs, the number of search spaces and the number of CORESETs may be the same. In other words, the number of sets of configuration values for each search space may be the same as the number of CORESETs. Here, the set may include a plurality of periodicities, an offset, and an index of a start symbol. For example, a search space determined based on a first period, an offset, and an index of a start symbol may be mapped to a first CORESET, and a search space determined based on a second period, an offset, and an index of a start symbol may be mapped to a second CORESET.

In addition, the search space may be configured based on the number of slots (K) in which the search space is repeated. In this case, K may be the same as the number of CORESETs, and thus K may be configured without separate signaling. For example, if K has the value of 2, slot n is determined based on the periodicity and offset, a search space determined based on the start symbol index in slot n may be mapped to a first CORESET, and a search space determined based on the start symbol index in slot (n+1) may be mapped to a second CORESET.

In addition, the search space may be determined based on the number of indexes of the start symbol. Here, the number of indexes of the start symbol and the number of CORESETs may be the same. For example, if an index of a start symbol is two, a search space determined based on the first start symbol index in slot n may be mapped to a first CORESET, and a search space determined based on the second start symbol index in slot (n+1) may be mapped to a second CORESET.

v) Method E

A method for receiving a DM-RS of a repetition PDCCH including the same DCI transmitted to a UE by a base station will be described.

A wideband reference signal (RS) may be configured. The UE may determine REGs in which the same precoder is assumed according to whether the wideband RS has been configured.

If the wideband RS is not configured, the UE may assume that the same precoder is applied to REGs constituting an REG bundle. That is, the UE may perform channel estimation using DM-RSs of REGs included in the REG bundle. The UE may compensate for the phase of a signal received from REs included in the REGs constituting the REG bundle based on a result of the channel estimation.

When the wideband RS is configured, the UE may assume that the same precoder is applied to adjacent REGs on the time-frequency domain. The UE may assume that the same precoder is applied to adjacent REGs in the time-frequency domain among REGs mapped to a plurality of CORESETs. In this case, each of the plurality of CORESETs may correspond to a region in which the same DCI is transmitted. In addition, the UE may assume that the same precoder is applied to adjacent REGs in the time-frequency domain among REGs corresponding to the plurality of search spaces. In this case, a PDCCH including the same DCI may be transmitted in the search space. The UE may assume that the same precoder is applied to adjacent REGs in the time-frequency domain among REGs included in one CORESET. In other words, the UE does not assume that the same precoder is applied even if REGs of different CORESETs are adjacent to each other in the time-frequency domain. Different CORESETs may include CORESETs in which the same DCI is repeatedly transmitted. On the other hand, CORESETs in which the same DCI is repeatedly transmitted may be excluded from the different CORESETs. The UE may assume that the same precoder is applied to adjacent REGs in the time-frequency domain among REGs corresponding to one search space. That is, even if adjacent REGs in the time-frequency domain are included in the same CORESET, the UE does not assume that the same precoder is applied when adjacent REGs correspond to different search spaces. Different search spaces may include search spaces in which the same DCI is transmitted. On the other hand, a search space in which the same DCI is transmitted may be excluded from the different search spaces.

The UE may assume that the same precoder has been applied to REGs of a region in which a PDCCH is repeatedly transmitted (a plurality of base CORESETs constituting one CORESET, a plurality of search spaces corresponding to one CORESET, or a plurality of CORESETs). Regions in which a PDCCH is repeatedly transmitted do not necessarily need to be adjacent in the time-frequency domain. That is, the UE may assume that the same precoder is applied to REGs included in non-adjacent regions in the time-frequency domain. Accordingly, the UE may assume that the same precoder has been applied to a non-adjacent region in the time-frequency domain, and thus the performance of channel estimation using DM-RS can be improved.

REs of some symbols among the resources used for the base station to transmit the repetition PDCCH including the same DCI to the UE may be used to transmit the DCI instead of being used for the DM-RS. For example, if a repetition PDCCH including the same DCI is configured to be transmitted on an adjacent symbol, the base station may be configured not to allocate a DM-RS to REs of all symbols for transmission of the repetition PDCCHs. In this case, all or some of the symbols to which the DM-RS is not allocated may be used to transmit DCI. Each of the repetition PDCCHs may be adjacent PDCCHs on the resource domain. Hereinafter, a detailed method of allocating a DM-RS will be described.

i) The base station may not include a DM-RS in some or all of REs corresponding to symbols from which a PDCCH corresponding to every turn of a multiple of k among repetition PDCCHs is transmitted. For example, when k has the value of 2, the base station may be configured not to allocate a DM-RS to some or all of the symbols from which a PDCCH corresponding to every turn of a multiple of 2 (i.e., even-numbered symbols) among the repetition PDCCHs is transmitted. ii) The base station may be configured not to allocate a DM-RS to some or all of the REs corresponding to symbols of every turn of a multiple of k among PDCCHs to which a DM-RS is repeatedly allocated and transmitted to symbols corresponding to every turn of a multiple of k of each of the repetition PDCCHs. For example, when k has the value of 2, the base station may be configured not to allocate a DM-RS to some or all of REs corresponding to symbols corresponding to every turn of a multiple of 2 (i.e., even-numbered symbols) of each of the repetition PDCCHs. iii) The base station may allocate a DM-RS to REs corresponding to the k-th symbol of each repetition PDCCH, and may be configured not to allocate the DM-RS to REs corresponding to the remaining symbols except for the k-th symbol. For example, if k has the value of 1, DM-RSs may be allocated to REs corresponding to the first symbol of each repetition PDCCH, and DM-RSs may not be mapped to REs corresponding to symbols except for the first symbol. iv) The base station may be configured to allocate a DM-RS to REs corresponding to the first symbol to the k-th symbol of each repetition PDCCH, and not to allocate a DM-RS to all or some of the REs corresponding to the remaining symbols except for the first symbol to the k-th symbol. For example, if k has the value of 2, the base station may be configured to allocate a DM-RS to REs corresponding to the first and second symbols of each of the repetition PDCCHs, and not to allocate a DM-RS to all or some of the REs except for REs corresponding to the first and second symbols. In iii) and iv) described above, a value of k may be determined based on the number of symbols through which the PDCCH is transmitted. For example, k may be determined as ceil(PDCCH_length/2). PDCCH_length is the number of symbols through which the PDCCH is transmitted. That is, if the number of symbols through which the PDCCH is transmitted is 1 or 2, k has the value of 1, and if the number of symbols is 3, k has the value of 2. Here, the value k may be a value configured by the base station.

vi) Method F

The same sequence may be used for a DM-RS allocated to a repetition PDCCH including the same DCI. That is, the UE may be configured to determine that pieces of DCI included in the repetition PDCCH are identical to each other, assuming that the same sequence is used for the DM-RSs allocated to the repetition PDCCHs. In addition, the UE may perform phase compensation by using or comparing the DM-RSs allocated to the repetition PDCCHs. Pieces of DCI included in the repetition PDCCHs may be the same.

More specifically, the sequence of DM-RS allocated to symbol 1 of slot $n_{s,f}^{\mu}$ may be determined as in Equation 2.

$$r_l(m) = \frac{1}{\sqrt{2}}(1 - 2\cdot c(2m)) + j\frac{1}{\sqrt{2}}(1 - 2\cdot c(2m-1)) \quad \text{[Equation 2]}$$

In Equation 2, the initial value of pseudo-random sequence c(i) may be calculated as Equation 3 below.

$$c_{init}(n_{s,f}^{\mu}, l) = \left(2^{17}\left(N_{symb}^{slot} n_{s,f}^{\mu} + l + 1\right)(2N_{ID} + 1) + 2N_{ID}\right) \bmod 2^{31} \quad \text{[Equation 3]}$$

In Equation 3, $n_{s,f}^{u}$ may be an index of a slot in a subframe, l may be an index of a symbol in a slot, and $N_{ID}$ may be one of value of 0, 1, . . . , 65535 or the same value as the cell ID.

Hereinafter, a method for applying the same sequence to a DM-RS allocated to a repetition PDCCH will be described.

i) A sequence used for a DM-RS allocated to a repetition PDCCH may have the same initial value. An initial value may be determined using a symbol index and an index of a slot in which the first PDCCH is transmitted among repetition PDCCHs. For each symbol of each slot in which the repetition PDCCH is transmitted, the determined initial value may be used. For example, the first PDCCH among the repetition PDCCHs may be transmitted in symbol i and symbol (i+1) of slot n1, and the second PDCCH among the repetition PDCCHs may be transmitted in symbol j and symbol (j+1) of slot n2. Here, the initial value of the DM-RS sequence of the second PDCCH may use the initial value of the DM-RS sequence of the first PDCCH. That is, the initial value of the sequence used for the DM-RS allocated to the first symbol of the second PDCCH may correspond to $c_{init}$(n1, i), and the initial value of the sequence used for the DM-RS allocated to the second symbol of the second PDCCH may correspond to $c_{init}$(n1, i+1). ii) When a repetition PDCCH is transmitted in one slot, symbols of a resource domain in which the repetition PDCCH is transmitted may be configured to have the same index value of I. For example, when a repetition PDCCH is repeated four times in one slot, specifically, the first repetition PDCCH may be transmitted through symbols 0 to 2, the second repetition PDCCH may be transmitted through symbols 3 to 5, the third repetition PDCCH may be transmitted through symbols 6 to 8, and the fourth repetition PDCCH may be transmitted through symbols 9 to 11. Here, index value I of the first symbol (i.e., symbols 0, 3, 6, and 9) on a region for transmission of each of the repetition PDCCHs may be configured as 0, and index value I of the second symbol (i.e., symbols 1, 4, 7, and 11) may be configured as 1. As another example, a symbol through which the first PDCCH among the repetition PDCCHs is transmitted may be configured to have an index value of 1. That is, the index value of a symbol through which the remaining PDCCHs except for the first PDCCH among the repetition PDCCHs are transmitted may be 1. iii) If the repetition PDCCHs are transmitted on different slots, the index values $n_{s,f}^{u}$ of a slot in the initial value of the DM-RS may all have the same value. For example, $n_{s,f}^{u}$ of the first slot in which a PDCCH is repeatedly transmitted may be configured as 0, and $n_{s,f}^{u}$ of the second slot may be configured as 1. As another example, $n_{s,f}^{u}$ may be an index of a slot in which the first PDCCH among the repetition PDCCHs is transmitted. That is, $n_{s,f}^{u}$ of the remaining PDCCHs except for the first PDCCH may be the same as the index of a slot in which the first PDCCH is transmitted.

iv) $n_{s,f}^{u}$ may be equally applied to N slots. For example, $n_{s,f}^{u}$ may be determined as $c_{init}$ (floor ($n_{s,f}^{u}$/N)*N, l). Floor(x) is a function that returns the largest integer among integers equal to or smaller than x. N may be a value configured by the base station. N may be a value determined based on the number of slots in which the repetition PDCCH is transmitted. N may be equal to the number of slots in which the repetition PDCCH is transmitted. v) $n_{s,f}^{u}$ may be equally used for N slots based on a specific slot (e.g., slot n0). For example, $n_{s,f}^{u}$ may be determined as $c_{init}$ (floor(($n_{s,f}^{u}$−n0)/N)*N, l). N may be a value configured by the base station. N may be a value determined based on the number of slots in which the repetition PDCCH is transmitted. N may be equal to the number of slots in which the repetition PDCCH is transmitted. n0 may be an index of a slot in which the first PDCCH of the repetition PDCCH is transmitted. n0 may be configured by the base station.

CCEs corresponding to a PDCCH candidate in a first search space of a first CORSET in which a repetition PDCCH including the same DCI is transmitted and a PDCCH candidate in a second search space of a second CORESET may be determined based on a hashing function. The number of blind decodings and the number of non-overlapping CCEs for monitoring a repetition PDCCH candidate on the first search space and receiving the repetition PDCCH may be different from the number of blind decodings and the number of non-overlapping CCEs for monitoring a repetition PDCCH candidate on the second search space and receiving the repetition PDCCH. That is, the maximum number of blind decodings and the number of non-overlapping CCEs per slot (or during a specific time interval) may be different between the first search space and the second search space. Therefore, the UE may receive the repetition PDCCH on the first search space (that is, when a condition for the maximum number of blind decodings and the number of non-overlapping CCEs is satisfied), but may not receive the repetition PDCCH on the second search space. Therefore, it is difficult to extend coverage by repeatedly receiving the repetition PDCCH. Hereinafter, a method of applying a hashing function for extending coverage will be described.

vii) Method G

The same hashing function may be applied to a region in which repetition PDCCHs including the same DCI are repeatedly transmitted (a plurality of base CORESETs constituting one CORESET, a plurality of search spaces corresponding to one CORESET, or a plurality of CORESETs).

Specifically, CCEs constituting PDCCH candidate $m_{s,n_{CI}}$ of slot $n_{s,f}^{u}$ included in search space s of CORESET p may be determined by a hashing function such as Equation 4. Here, the aggregation level of the PDCCH candidate may be L.

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i, \quad \text{[Equation 4]}$$

$$i = 0, 1, \ldots, L-1$$

If the search space s is a common search space, $Y_{p,n_{s,f}^{\mu}}$ may have the value of 0. If the search space s is a UE-specific search space, $Y_{p,n_{s,f}^{\mu}}$ is equal to $(A_p \cdot Y_{p,n_{s,f}^{\mu}-1}) \bmod D$, and $Y_{p,-1}$ is equal to $n_{RNTI}$ and non-zero. In addition, $A_p$ may correspond to 39827 when p mod 3 has the value of 0, $A_p$ may correspond to 39829 when p mod 3 has the value of 1, and $A_p$ may correspond to 39839 when p mod 3 has the value of 2. D may correspond to 65537. $n_{RNTI}$ may have a C-RNTI value.

If up to 5 CORESETs in which a repetition PDCCH is transmittable is configurable, p may have a value of 0 to 4. If the search space s is a UE-specific search space, $Y_{p,n_{s,f}^{\mu}}$ is equal to $(A_p \cdot Y_{p,n_{s,f}^{\mu}-1}) \bmod D$, and $Y_{p,-1}$ is equal to $n_{RNTI}$ and non-zero. In addition, $A_p$ may correspond to 39827 when p mod 5 has the value of 0, $A_p$ may correspond to 39829 when p mod 5 has the value of 1, $A_p$ may correspond to 39839 when p mod 5 has the value of 2, $A_p$ may correspond to 39841 when p mod 5 has the value of 3, and $A_p$ may correspond to 39847 when p mod 5 has the value of 4. D may correspond to 65537.

$N_{CCE,p}$ may be the number of CCEs constituting a CORESET. $M_{s,max}^{(L)}$ may be the number of repetition PDCCH candidates with an aggregation level of L, the repetition PDCCH being monitored by the UE. $n_{CI}$ may be a value indicated by a carrier indicator field.

If the search space s is a common search space, $Y_{p,n_{s,f}^{\mu}}$ may have the value of 0 regardless of a slot. Therefore, if $N_{CCE,p}$ is identical, the hashing function outputs the same value. Therefore, a CORESET corresponding to a search space in which a repetition PDCCH is transmitted may include the same number of CCEs. On the other hand, if the CORESETs are not configured by the same number of CCEs, the UE needs to calculate the hashing function under an assumption of a specific number of CCEs.

Hereinafter, a method for determining a specific number will be described. When the number of CCEs constituting a plurality of CORESETs is different, a specific number may be determined based on CORESETs including the smallest number of CCEs. Alternatively, a specific number may be determined based on CORESETs including the largest number of CCEs. Alternatively, a specific number may be determined based on a CORESET in which the first PDCCH is transmitted among the repetition PDCCHs. Alternatively, a specific number may be determined based on a CORESET of the lowest index among the plurality of CORESETs. Alternatively, a specific number may be determined based on a CORESET of the highest index among the plurality of CORESETs.

If the search space s is a UE-specific search space, $Y_{p,n_{s,f}^{\mu}}$ may be determined differently for each slot. Therefore, in order to output the same value in the hashing function, $Y_{p,n_{s,f}^{\mu}}$ may be fixed as a specific value. Hereinafter, a method for determining $Y_{p,n_{s,f}^{\mu}}$ will be described. i) $Y_{p,n_{s,f}^{\mu}}$ may be determined as a specific value regardless of the slot index $n_{s,f}^{\mu}$. For example, $Y_{p,n_{s,f}^{\mu}}$ may be determined as a specific value different from a value (i.e., 0) used when search space s is a common search space. $Y_{p,n_{s,f}^{\mu}}$ may be a specific value determined based on $N_{CCE,p}$. Specifically, $Y_{p,n_{s,f}^{\mu}}$ may be determined based on half of $N_{CCE,p}$. For example, $Y_{p,n_{s,f}^{\mu}}$ may be determined based on floor ($N_{CCE,p}/2$), ceil ($N_{CCE,p}/2$), and round ($N_{CCE,p}/2$). Round (x) is a function that returns the value obtained by rounding x. When $Y_{p,n_{s,f}^{\mu}}$ is determined based on half of $N_{CCE,p}$, half of the resources constituting CORESET may be used as a common search space, and the other half may be used as a UE-specific search space. ii) $Y_{p,n_{s,f}^{\mu}}$ has a specific value for a predetermined time unit and may be changed for each predetermined time unit. The predetermined time unit may be a slot unit and may be configured by the base station. In addition, the predetermined time unit may be the same as the number of times the PDCCH is repeatedly transmitted. For example, $Y_{p,n_{s,f}^{\mu}}$ may have a specific value during N slots (for a predetermined time unit). Specifically, if the remainder obtained by dividing $n_{s,f}^{\mu}$ by N is not zero, $Y_{p,n_{s,f}^{\mu}}$ is equal to $Y_{p,n_{s,f}^{\mu}-1}$, and if the remainder obtained by dividing $n_{s,f}^{\mu}$ by N is 0, then $Y_{p,n_{s,f}^{\mu}}$ may be $(A_p \cdot Y_{p,n_{s,f}^{\mu}-1}) \bmod D$. As another example, during N slots, $Y_{p,n_{s,f}^{\mu}}$ is determined as a fixed specific value, and $Y_{p,n_{s,f}^{\mu}}$ may be updated by offset M. M may have the value of 0 to N−1. If the remainder obtained by dividing $n_{s,f}^{u}$ by N is not M, $Y_{p,n_{s,f}^{\mu}}$ is equal to $Y_{p,n_{s,f}^{\mu}-1}$, and if the remainder obtained by dividing $n_{s,f}^{\mu}$ by N is M, then $Y_{p,n_{s,f}^{\mu}}$ may be $(A_p \cdot Y_{p,n_{s,f}^{\mu}-1}) \bmod D$. M may be a value configured by the base station. As another example, the offset M may be determined based on the index S of a slot in which a first PDCCH among repetition PDCCHs is transmitted. Specifically, M may be determined as S mod N. $Y_{p,n_{s,f}^{\mu}}$ may have the same value during a slot in which repetition PDCCHs are transmitted. iii) When repetition PDCCHs are transmitted on different CORESETs, since there are several values of p, which are CORESET indexes, $Y_{p,n_{s,f}^{\mu}}$ may be determined differently according to a value of p. Therefore, the p value may be fixed as a specific value. For example, the value of p may be fixed as 0. As another example, the p value may be determined based on an index of a CORESET in which a first PDCCH among repetition PDCCHs is transmitted. As another example, the p value may be determined based on the lowest index or the highest index among configured indexes of CORESETs.

Figure 45:
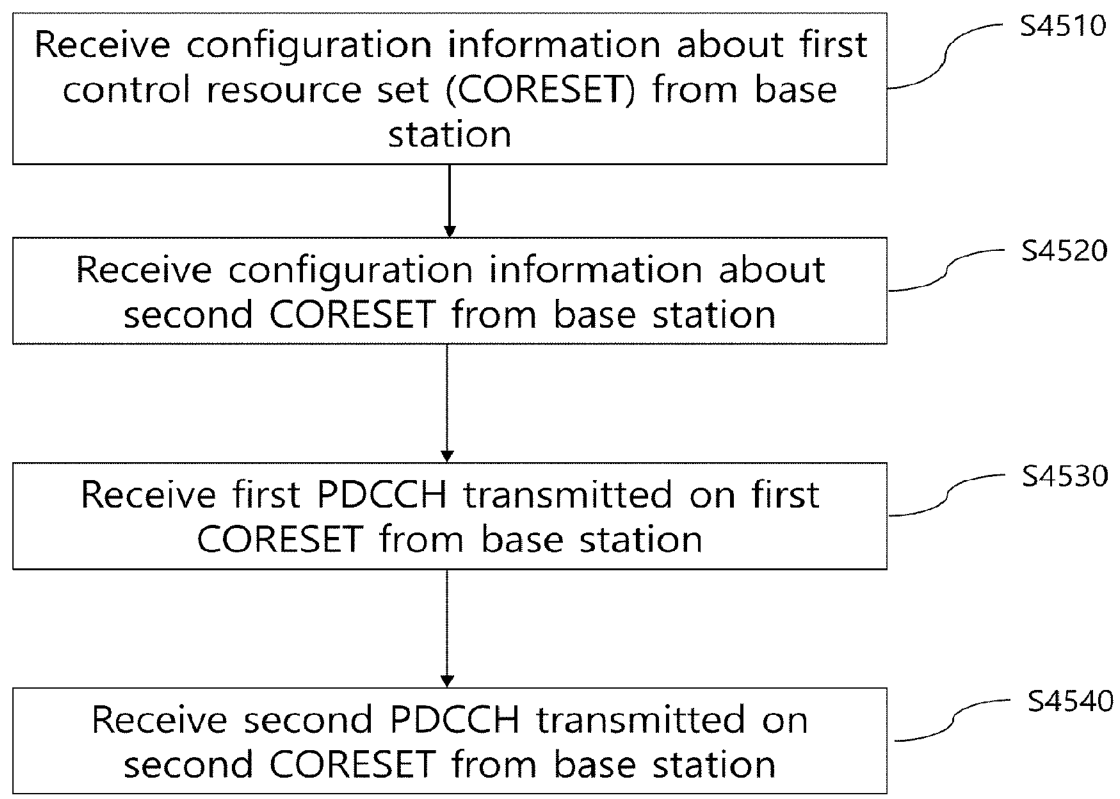
FIG. 45 is a flowchart illustrating transmission of a repetition PDCCH according to an embodiment of the present disclosure.

FIG. 45 is a flowchart illustrating transmission of a repetition PDCCH according to an embodiment of the present disclosure.

With reference to FIG. 45, a method for transmitting a repetition PDCCH including the same DCI having been described above with reference to FIGS. 1 to 44 will be described.

A UE may receive configuration information about a first CORESET from a base station, and may receive configuration information about a second CORESET from the base station (S4510, S4520).

The UE may receive a first PDCCH transmitted on the first CORESET from the base station, and may receive a second PDCCH transmitted on the second CORESET (S4530, S4540).

Here, the first PDCCH and the second PDCCH may each be repeatedly transmitted from the base station.

First DCI included in the first PDCCH and second DCI included in the second PDCCH may be identical to each other.

The first PDCCH and the second PDCCH may be configured at the same aggregation level (AL).

The first CORESET and the second CORESET may be resources on different time-frequency domains, and the first CORESET and the second CORESET may be resources on the same time-frequency domain.

The first PDCCH and the second PDCCH may be repeatedly transmitted while being included in the same slot, and the first PDCCH and the second PDCCH may be repeatedly transmitted on different slots.

The first DCI and the second DCI may be independently decoded, and the first DCI and the second DCI may be combined and decoded. In this case, when the UE fails to independently decode the first DCI and the second DCI, the UE may combine and decode the first DCI and the second DCI.

The UE may receive, from the base station, configuration information about a first search space and may receive configuration information about a second search space. The first search space may be associated with the first CORESET, and the second search space may be associated with the second CORESET. Here, the first search space and the second search space may be resources on different time domains. In addition, the first PDCCH may be received on the first search space, and the second PDCCH may be received on the second search space.

The configuration information on the first search space may include information on a periodicity of the first search space, and the configuration information on the second search space may include information on a periodicity of the second search space. Here, the periodicity of the first search space and the periodicity of the second search space may be the same.

The UE may transmit, to the base station, HARQ-ACK information for one of the first PDCCH and the second PDCCH. Here, the HARQ-ACK information may be HARQ-ACK information for a PDCCH transmitted on a search space of a lower index among an index of the first search space and an index of the second search space.

The UE may receive a third PDCCH in a third search space from the base station. The UE may transmit, to the base station, HARQ-ACK information for any one of the first PDCCH, the second PDCCH, and the third PDCCH. Here, the third PDCCH may include third DCI different from the first DCI and the second DCI. When the third search space overlaps with either the first search space or the second search space, the HARQ-ACK information may be HARQ-ACK information for a PDCCH transmitted through a search space of a lowest index among the indexes of the overlapping search spaces.

The type of the first search space and the type of the second search space may be the same. Here, the type of the first search space and the type of the second search space may be any one of a common search space and a UE specific search space.

The UE performing the method described with reference to FIG. 45 may be the UE described with reference to FIG. 11. Specifically, the UE may include a communication module for transmitting and receiving a wireless signal, and a processor configured to control the communication module. Here, the processor of the UE may be configured to perform the method for receiving the repetition PDCCH described in this specification.

In addition, the base station for transmitting the repetition PDCCH described in this specification may include a communication module for transmitting and receiving a radio signal, and a processor configured to control the communication module. Here, the base station may be the base station described with reference to FIG. 11. Here, the processor of the base station may be configured to perform the method for transmitting the repetition PDCCH described in this specification.

Although the method and system of the present disclosure have been described in connection with specific embodiments, some or all of their components or operations may be implemented using a computing system having a general-purpose hardware architecture.

The above description of the present disclosure is for illustrative purposes only, and those of ordinary skill in the art to which the present disclosure pertains will be able to understand that other specific forms can be easily modified without changing the technical spirit or essential features of the present disclosure. Therefore, it should be understood that the embodiments described above are illustrative and non-limiting in all respects. For example, each component described as a single type may be implemented in a distributed manner, and similarly, components described as being distributed may also be implemented in a combined form.

The scope of the present disclosure is indicated by the claims to be described later rather than the detailed description, and all changes or modified forms derived from the meaning and scope of the claims and their equivalent concepts should be construed as being included in the scope of the present disclosure.

The invention claimed is:

1. A terminal configured to operate in a wireless communication system, the terminal comprising:

a transceiver; and a processor configured to control the transceiver, wherein the processor is configured to:

receive first configuration information related to a plurality of control resource sets (CORESETs), receive second configuration information related to a plurality of search spaces, each associated with each of the plurality of CORESETs, receive first downlink control information (DCI) included in a first physical downlink control channel (PDCCH) on a first search space among the plurality of search spaces, receive second DCI included in a second PDCCH on a second search space among the plurality of search spaces, wherein the second configuration information includes linking information indicating that the first search space and the second search space are linked, wherein the first DCI and the second DCI are identical to each other, wherein the first search space and the second search space are configured in a same slot, transmit a physical uplink control channel (PUCCH) carrying hybrid automatic repeat request (HARQ)-acknowledgement (ACK) information on a resource, and wherein the resource is determined based on a PDCCH on a search space having a lower search space index among the first search space and the second search space, among the first PDCCH and the second PDCCH.

2. The terminal of claim 1, wherein the first PDCCH and the second PDCCH have a same aggregation level (AL).

3. The terminal of claim 1, wherein a first CORESET related to the first search space and a second CORESET related to the second search space are different time-frequency resources.

4. The terminal of claim 1, wherein the first DCI and the second DCI are each independently decoded.

5. The terminal of claim 1, wherein a periodicity of the first search space and a periodicity of the second search space are identical to each other.

6. The terminal of claim 1, wherein a type of the first search space and a type of the second search space are identical to each other, and wherein the type of the first search space and the type of the second search space are one of a common search space or a UE specific search space.

7. A method for use by a terminal in a wireless communication system, the method comprising:

receiving first configuration information related to a plurality of control resource sets (CORESETs);

receiving second configuration information related to a plurality of search spaces, each associated with each of the plurality of CORESETs;

receiving first downlink control information (DCI) included in a first physical downlink control channel (PDCCH) on a first search space among the plurality of search spaces;

receiving second DCI included in a second PDCCH on a second search space among the plurality of search spaces, wherein the second configuration information includes linking information indicating that the first search space and the second search space are linked, wherein the first DCI and the second DCI are identical to each other, wherein the first search space and the second search space are configured in a same slot; and transmitting a physical uplink control channel (PUCCH) carrying hybrid automatic repeat request (HARQ)-acknowledgement (ACK) information on a resource, and wherein the resource is determined based on a PDCCH on a search space having a lower search space index among the first search space and the second search space, among the first PDCCH and the second PDCCH.

8. The method of claim 7, wherein the first PDCCH and the second PDCCH have a same aggregation level (AL).

9. The method of claim 7, wherein the first CORESET and the second CORESET are different time-frequency resources.

10. The method of claim 7, wherein the first DCI and the second DCI are each independently decoded.

11. The method of claim 7, wherein a periodicity of the first search space and a periodicity of the second search space are identical to each other.

12. The method of claim 7, wherein a type of the first search space and a type of the second search space are identical to each other, and wherein the type of the first search space and the type of the second search space are one of a common search space or a UE specific search space.

13. A base station configured to operate in a wireless communication system, the base station comprising:

a transceiver; and a processor configured to control the transceiver, wherein the processor is configured to:

transmit first configuration information related to a plurality of control resource sets (CORESETs), transmit second configuration information related to a plurality of search spaces, each associated with each of the plurality of CORESETs, transmit first downlink control information (DCI) included in a first physical downlink control channel (PDCCH) on a first search space among the plurality of search spaces, transmit second DCI included in a second PDCCH on a second search space among the plurality of search spaces, wherein the second configuration information includes linking information indicating that the first search space and the second search space are linked, wherein the first DCI and the second DCI are identical to each other, wherein the first search space and the second search space are configured in a same slot, receive a physical uplink control channel (PUCCH) carrying hybrid automatic repeat request (HARQ)-acknowledgement (ACK) information on a resource, and wherein the resource is determined based on a PDCCH on a search space having a lower search space index among the first search space and the second search space, among the first PDCCH and the second PDCCH.

14. The base station of claim 13, wherein the first PDCCH and the second PDCCH have a same aggregation level (AL).

15. The base station of claim 13, wherein a first CORESET related to the first search space and a second CORESET related to the second search space are different time-frequency resources.

16. The base station of claim 13, wherein a periodicity of the first search space and a periodicity of the second search space are identical to each other.

17. A method for use by a base station in a wireless communication system, the method comprising:

transmitting first configuration information related to a plurality of control resource sets (CORESETs);

transmitting second configuration information related to a plurality of search spaces, each associated with each of the plurality of CORESETs;

transmitting first downlink control information (DCI) included in a first physical downlink control channel (PDCCH) on a first search space among the plurality of search spaces;

transmitting second DCI included in a second PDCCH on a second search space among the plurality of search spaces, wherein the second configuration information includes linking information indicating that the first search space and the second search space are linked, wherein the first DCI and the second DCI are identical to each other, wherein the first search space and the second search space are configured in a same slot; and receiving a physical uplink control channel (PUCCH) carrying hybrid automatic repeat request (HARQ)-acknowledgement (ACK) information on a resource, and wherein the resource is determined based on a PDCCH on a search space having a lower search space index among the first search space and the second search space, among the first PDCCH and the second PDCCH.

18. The method of claim 17, wherein the first PDCCH and the second PDCCH have a same aggregation level (AL).

* * * * *